US012475570B2

(12) United States Patent
Kitamura et al.

(10) Patent No.: US 12,475,570 B2
(45) Date of Patent: Nov. 18, 2025

(54) GENERATING TRIMAP FROM DISTANCE INFORMATION USING AN IMAGE PLANE PHASE DETECTION SENSOR

(71) Applicant: CANON KABUSHIKI KAISHA, Tokyo (JP)

(72) Inventors: Kazuya Kitamura, Kanagawa (JP); Tokuro Nishida, Kanagawa (JP); Akimori Hayashi, Kanagawa (JP); Hiroyuki Hasegawa, Chiba (JP); Koki Nakamura, Tokyo (JP); Kazuki Hosoi, Tokyo (JP); Norifumi Kashiyama, Tokyo (JP); Shunsuke Kawahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 17/686,530

(22) Filed: Mar. 4, 2022

(65) Prior Publication Data

US 2022/0292691 A1 Sep. 15, 2022

(30) Foreign Application Priority Data

Mar. 12, 2021 (JP) ................................ 2021-040695

(51) Int. Cl.
*G06T 7/194* (2017.01)
*G06T 5/20* (2006.01)
(Continued)

(52) U.S. Cl.
CPC ................ *G06T 7/194* (2017.01); *G06T 5/20* (2013.01); *G06T 5/40* (2013.01); *G06T 7/11* (2017.01); *G06T 2207/20132* (2013.01)

(58) Field of Classification Search
CPC ... G06T 7/194; G06T 7/11; G06T 5/20; G06T 5/40; G06T 2207/20132
See application file for complete search history.

(56) References Cited

U.S. PATENT DOCUMENTS 5,995,516 A * 11/1999 Iwasaki ............ H04N 21/23602 375/E7.277
8,204,308 B2 6/2012 Yamada
(Continued)

FOREIGN PATENT DOCUMENTS

JP 2010-066802 A 3/2010
JP 2012-123716 A 6/2012
(Continued)

OTHER PUBLICATIONS

Jan. 31, 2025 Japanese Official Action in Japanese Patent Appln. No. 2021-040695.
(Continued)

*Primary Examiner* — Stephen S Hong
*Assistant Examiner* — Carl E Barnes, Jr.
(74) *Attorney, Agent, or Firm* — Venable LLP

(57) ABSTRACT

A generation unit generates a background separation image in which regions of a captured image are classified as a foreground region, a background region, and an unknown region, based on distance distribution information obtained from a plurality of parallax images. An output unit outputs the captured image and the background separation image. A region in which a distance in the distance distribution information is within a first range is classified as the foreground region. A region in which a distance in the distance distribution information is outside a second range broader than the first range is classified as the background region. A region in which a distance in the distance distribution information is outside the first range and inside the second range is classified as the unknown region.

22 Claims, 75 Drawing Sheets

(51) Int. Cl.
*G06T 5/40* (2006.01)
*G06T 7/11* (2017.01)

(56) References Cited

U.S. PATENT DOCUMENTS

| | | | | |
|---|---|---|---|---|
| 8,744,174 | B2 | 6/2014 | Hamada | |
| 9,652,855 | B2 | 5/2017 | Dai | |
| 2010/0061658 | A1 | 3/2010 | Yamada | |
| 2012/0148151 | A1 | 6/2012 | Hamada | |
| 2012/0170863 | A1* | 7/2012 | Kim | G06T 5/70 382/263 |
| 2015/0213611 | A1 | 7/2015 | Dai | |
| 2016/0021298 | A1* | 1/2016 | Tsutsumi | H04N 23/635 348/349 |
| 2016/0335780 | A1* | 11/2016 | Tsuji | G06T 7/248 |
| 2017/0068843 | A1* | 3/2017 | Tian | G06T 7/136 |
| 2017/0374272 | A1* | 12/2017 | Tsuji | H04N 23/672 |
| 2020/0020108 | A1* | 1/2020 | Pao | G06T 7/90 |
| 2020/0311946 | A1* | 10/2020 | Price | G06T 7/136 |

FOREIGN PATENT DOCUMENTS

| | | |
|---|---|---|
| JP | 2012-235333 A | 11/2012 |
| JP | 2015-141633 A | 8/2015 |

OTHER PUBLICATIONS

Ichiro Onuki, "Camera Using an Imaging Plane Phase Difference Sensor," Journal of the Institute of Image Information and Television Engineers, Japan, Society of Image Information and Media Engineers, 2014, vol. 68, No. 3, https://doi.org/10.3169/itej.68.203, pp. 203-207.

* cited by examiner

FIG. 2A

NON-IMAGE PLANE PHASE DETECTION METHOD - PIXEL CONFIGURATION

| | | | | | | | | | |
|---|---|---|---|---|---|---|---|---|---|
| R | Gr | R | Gr | R | Gr | R | Gr | R | Gr |
| Gb | B | Gb | B | Gb | B | Gb | B | Gb | B |

FIG. 2B

IMAGE PLANE PHASE DETECTION METHOD - PIXEL CONFIGURATION

| | | | | | | | | | | | | | | | | | | | |
|---|---|---|---|---|---|---|---|---|---|---|---|---|---|---|---|---|---|---|---|
| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

FIG. 8

| FOREGROUND THRESHOLD REFERENCE VALUE | RANGE OF VALUES DETERMINED AS FOREGROUND |
|---|---|
| 1 | −25~25 |
| 2 | −50~50 |
| 3 | −75~75 |
| 4 | −100~100 |
| 5 | −125~125 |

| BACKGROUND THRESHOLD REFERENCE VALUE | RANGE OF VALUES DETERMINED AS BACKGROUND |
|---|---|
| 1 | −128~−26, 26~127 |
| 2 | −128~−51, 51~127 |
| 3 | −128~−76, 76~127 |
| 4 | −128~−101, 101~127 |
| 5 | −128~−126, 126~127 |

FIG. 70A

| | 9 | 8 | 7 | 6 | 5 | 4 | 3 | 2 | 1 | 0 |
|---|---|---|---|---|---|---|---|---|---|---|
| Y (C) DATA | Tri4 [1] | Tri4 [0] | Tri3 [1] | Tri3 [0] | Tri2 [1] | Tri2 [0] | Tri1 [1] | Tri1 [0] | Tri0 [1] | Tri0 [0] |

FIG. 70B

| | 9 | 8 | 7 | 6 | 5 | 4 | 3 | 2 | 1 | 0 |
|---|---|---|---|---|---|---|---|---|---|---|
| Y (C) DATA | ~ep | ep | Tri3 [1] | Tri3 [0] | Tri2 [1] | Tri2 [0] | Tri1 [1] | Tri1 [0] | Tri0 [1] | Tri0 [0] |

FIG. 71A

| | |
|---|---|
| ADF | 0x000 |
| | 0x3FF |
| | 0x3FF |
| | DID |
| | SDID |
| | DC |
| | LN0 |
| | LN1 |
| | Status0 |
| | Status1 |
| | TrimapData0 |
| | ⋮ |
| | TrimapData191 |
| | CS |

FIG. 71B

| | 9 | 8 | 7 | 6 | 5 | 4 | 3 | 2 | 1 | 0 |
|---|---|---|---|---|---|---|---|---|---|---|
| LN0 | ~B8 | Line [6] | Line [5] | Line [4] | Line [3] | Line [2] | Line [1] | Line [0] | reserved | reserved |
| LN1 | ~B8 | reserved | reserved | reserved | Line [10] | Line [9] | Line [8] | Line [7] | reserved | reserved |

FIG. 71C

| | 9 | 8 | 7 | 6 | 5 | 4 | 3 | 2 | 1 | 0 |
|---|---|---|---|---|---|---|---|---|---|---|
| Status0 | ~ep | ep | Polarity | Invert | Gray [1] | Gray [0] | Black [1] | Black [0] | White [1] | White [0] |
| Status1 | ~ep | ep | reserved | reserved | reserved | reserved | reserved | PixNum [2] | PixNum [1] | PixNum [0] |

GENERATING TRIMAP FROM DISTANCE INFORMATION USING AN IMAGE PLANE PHASE DETECTION SENSOR

BACKGROUND OF THE INVENTION

Field of the Invention

The present invention relates to an image processing apparatus, an image processing method, and a storage medium.

Description of the Related Art

In a wide range of fields, there is demand for being able to crop desired subject regions from images. One technique for cropping a subject region is to create an AlphaMatte and use the AlphaMatte to crop the subject. "AlphaMatte" refers to an image in which the image is separated into a foreground region (the subject) and a background region.

A method of using intermediate data called a "Trimap" is often used to create a high-precision AlphaMatte. "Trimap" is an image divided into three regions, namely a foreground region, a background region, and an unknown region.

The technique of Japanese Patent Laid-Open No. 2010-066802, for example, is known as a technique for generating a Trimap. Japanese Patent Laid-Open No. 2010-066802 discloses a technique for generating an AlphaMatte, in which a binary image of a foreground and a background is generated from an input image using an object extraction technique, and a tri-level image is then generated by setting an undefined region of a predetermined width at a boundary between the foreground and background.

However, because Japanese Patent Laid-Open No. 2010-066802 does not use distance information, the accuracy of the Trimap worsens when, for example, the subject and background are the same color.

SUMMARY OF THE INVENTION

Having been achieved in light of such circumstances, the present invention provides a technique for generating a highly-accurate Trimap by using distance information obtained through shooting using an image plane phase detection sensor.

According to a first aspect of the present invention, there is provided an image processing apparatus comprising at least one processor and/or at least one circuit which functions as: an obtainment unit configured to obtain a captured image and a plurality of parallax images generated through shooting using an image sensor in which a plurality of photoelectric conversion units are arranged, each photoelectric conversion unit receiving a light flux passing through a different partial pupil region of an imaging optical system; a generation unit configured to generate a background separation image in which regions of the captured image are classified as a foreground region, a background region, and an unknown region, based on distance distribution information obtained from the plurality of parallax images; and an output unit configured to output the captured image and the background separation image, wherein the generation unit generates the background separation image such that a region in which a distance in the distance distribution information is within a first range is classified as the foreground region, a region in which a distance in the distance distribution information is outside a second range broader than the first range is classified as the background region, and a region in which a distance in the distance distribution information is outside the first range and inside the second range is classified as the unknown region.

According to a second aspect of the present invention, there is provided an image processing method executed by an image processing apparatus, comprising: obtaining a captured image and a plurality of parallax images generated through shooting using an image sensor in which a plurality of photoelectric conversion units are arranged, each photoelectric conversion unit receiving a light flux passing through a different partial pupil region of an imaging optical system; generating a background separation image in which regions of the captured image are classified as a foreground region, a background region, and an unknown region, based on distance distribution information obtained from the plurality of parallax images; and outputting the captured image and the background separation image, wherein the background separation image is generated such that a region in which a distance in the distance distribution information is within a first range is classified as the foreground region, a region in which a distance in the distance distribution information is outside a second range broader than the first range is classified as the background region, and a region in which a distance in the distance distribution information is outside the first range and inside the second range is classified as the unknown region.

According to a third aspect of the present invention, there is provided a non-transitory computer-readable storage medium which stores a program for causing a computer to execute an image processing method comprising: obtaining a captured image and a plurality of parallax images generated through shooting using an image sensor in which a plurality of photoelectric conversion units are arranged, each photoelectric conversion unit receiving a light flux passing through a different partial pupil region of an imaging optical system; generating a background separation image in which regions of the captured image are classified as a foreground region, a background region, and an unknown region, based on distance distribution information obtained from the plurality of parallax images; and outputting the captured image and the background separation image, wherein the background separation image is generated such that a region in which a distance in the distance distribution information is within a first range is classified as the foreground region, a region in which a distance in the distance distribution information is outside a second range broader than the first range is classified as the background region, and a region in which a distance in the distance distribution information is outside the first range and inside the second range is classified as the unknown region.

Further features of the present invention will become apparent from the following description of exemplary embodiments with reference to the attached drawings.

BRIEF DESCRIPTION OF THE DRAWINGS

FIGS. 2A and 2B are diagrams illustrating part of a light-receiving surface of an image capturing unit 107 serving as an image sensor.

FIG. 8 is a diagram illustrating an example of a relationship between a reference value for a threshold set by a user, and a range of values according to the reference value, according to Embodiment 10.

FIGS. 70A and 70B are diagrams illustrating the structure of data packing according to Embodiment C0.

FIGS. 71A to 71C are diagrams illustrating the structure of an ancillary packet according to Embodiment C0.

DESCRIPTION OF THE EMBODIMENTS

Figure 1:
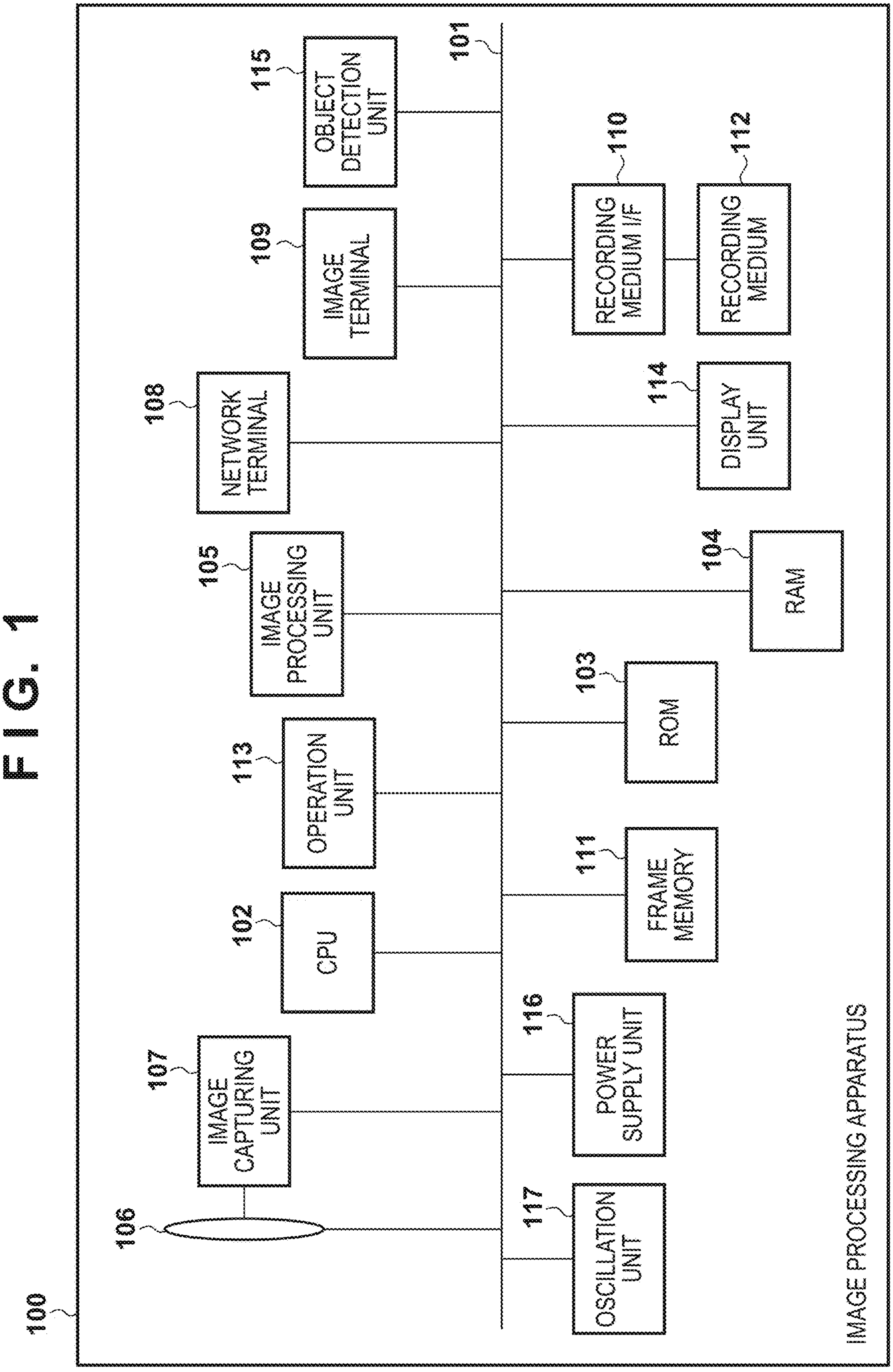
FIG. 1 is a block diagram illustrating the internal configuration of an image processing apparatus 100 used in each embodiment.

Hereinafter, embodiments of the present invention will be described with reference to the attached drawings. Elements that are given the same reference numerals throughout all of the attached drawings represent the same or similar elements, unless otherwise specified. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

Embodiment 1

First, the internal configuration of an image processing apparatus 100 used in each embodiment will be described with reference to FIG. 1. In FIG. 1, the image processing apparatus 100 can perform processing from image input to image output, as well as recording.

In FIG. 1, a CPU 102, ROM 103, RAM 104, an image processing unit 105, a lens unit 106, an image capturing unit 107, a network terminal 108, an image terminal 109, and a recording medium I/F 110 are connected to an internal bus 101. In addition, frame memory 111, an operation unit 113, a display unit 114, an object detection unit 115, a power supply unit 116, and an oscillation unit 117 are connected to the internal bus 101. A recording medium 112 is connected to the recording medium I/F 110. The various elements connected to the internal bus 101 are capable of exchanging data with one another via the internal bus 101.

The lens unit 106 (an imaging optical system) includes a lens group including a zoom lens and a focus lens, an aperture mechanism, and a drive motor. An optical image that passes through the lens unit 106 is received by the image capturing unit 107. The image capturing unit 107 uses a CCD, CMOS, or similar sensor which serves to replace an optical signal with an electrical signal. Because the electrical signal obtained here is an analog value, the image capturing unit 107 also has a function for converting the analog value into a digital value. The image capturing unit 107 is an image plane phase detection sensor, and will be described in detail.

The CPU 102 controls each unit of the image processing apparatus 100 according to programs stored in the ROM 103, using the RAM 104 as work memory. This control includes control of displays corresponding to the display unit 114 and control of recording into the recording medium 112. The ROM 103 is a non-volatile recording device, in which programs for causing the CPU 102 to operate, and various adjustment parameters, and the like are recorded. The RAM 104 is volatile memory that uses a semiconductor device, and is generally slower and lower in capacity than the frame memory 111.

The frame memory 111 is a device that can temporarily store image signals and read out those signals when necessary. Image signals contain huge amounts of data, and thus a high-bandwidth and high-capacity device is required. In recent years, Dual Data Rate 4-Synchronous Dynamic RAM (DDR4-SDRAM) is often used. By using this frame memory 111, it is possible, for example, to composite images that differ in time, or to cut out only the necessary regions from an image.

The image processing unit 105 performs various types of image processing on data from the image capturing unit 107 or image data stored in the frame memory 111 or the recording medium 112 under the control of the CPU 102. The image processing carried out by the image processing unit 105 includes image data pixel interpolation, encoding processing, compression processing, decoding processing, enlargement/reduction processing (resizing), noise reduction processing, color conversion processing, and the like. The image processing unit 105 also performs processing such as correction of performance variations of pixels in the image capturing unit 107, defective pixel correction, white balance correction, luminance correction, correction of distortion and peripheral light loss caused by lens characteristics, and the like. Note that the image processing unit 105 may be constituted by a dedicated circuit block for carrying out specific image processing. Depending on the type of the image processing, it is also possible for the CPU 102 to carry out image processing in accordance with a program, rather than using the image processing unit 105.

Based on calculation results obtained by the image processing unit 105, the CPU 102 can control the lens unit 106 to magnify the optical image, adjust the focal length, adjust the aperture and the like to adjust the amount of light, and so on. It is also possible to correct hand shake by moving part of the lens group in a plane orthogonal to the optical axis.

The operation unit 113 is one interface with the outside of the device, and receives user operations. The operation unit 113 uses devices such as mechanical buttons, switches, and the like, including a power switch and a mode changing switch.

The display unit 114 provides a function for displaying images. The display unit 114 is a display device that can be seen by the user, and can display, for example, images processed by the image processing unit 105, setting menus, and the like. The user can check the operation status of the image processing apparatus 100 by looking at the display unit 114. For the display unit 114, a compact and low-power-consumption device, such as a liquid crystal display (LCD) or an organic electroluminescence (EL) device, has been used as a display device in recent years. In addition, a resistive film-based or electrostatic capacitance-based thin-film device, called a "touch panel", can be provided to the display unit 114, and may also be used instead of the operation unit 113.

The CPU 102 generates character strings to inform the user of the setting state and the like of the image processing apparatus 100, menus for configuring the image processing apparatus 100, and the like, superimposes these items on the image processed by the image processing unit 105, and displays the result in the display unit 114. In addition to text information, shooting assistance displays such as a histogram, vectorscope, waveform monitor, zebra, peaking, false color, and the like can also be superimposed.

The image terminal 109 serves as another interface. Typical examples of such an interface include Serial Digital Interface (SDI), High Definition Multimedia Interface (HDMI, registered trademark), DisplayPort (registered trademark), and various other interfaces. Using the image terminal 109 makes it possible to display real-time images on an external monitor or the like.

The image processing apparatus 100 also includes the network terminal 108, which can transmit control signals as well as images. The network terminal 108 is an interface for inputting and outputting image signals, audio signals, and the like. The network terminal 108 can also communicate with external devices over the Internet or the like to send and receive various data such as files, commands, and the like.

The image processing apparatus 100 not only outputs images to the exterior, but also has a function for recording images internally. The recording medium 112 is capable of recording image data, various types of setting data, and the like, and uses a high-capacity storage device. For example, a Hard Disc Drive (HDD), a Solid State Drive (SSD), or the like is used as the recording medium 112. The recording medium 112 is mounted to the recording medium I/F 110.

The object detection unit 115 is a block for detecting objects using, for example, artificial intelligence, as represented by deep learning using neural networks. Taking object detection through deep learning as an example, the CPU 102 sends a program for the processing stored in the ROM 103, as well as a network structure, weighting parameters, and so on such as Single Shot Multibox Detector (SSD), You Only Look Once (YOLO), and the like, to the object detection unit 115. The object detection unit 115 performs processing to detect objects from image signals based on various parameters obtained from the CPU 102, and loads the processing results into the RAM 104.

Finally, to drive these systems, the image processing apparatus 100 also includes the power supply unit 116, the oscillation unit 117, and the like. The power supply unit 116 is a part that supplies power to each of the blocks described above, and has a function of converting and distributing power from a commercial power supply supplied from the outside, a battery, or the like to any desired voltage. The oscillation unit 117 is an oscillation device called a "crystal". The CPU 102 and the like generate a desired timing signal based on a periodic signal input from this oscillation device, and proceed through program sequences.

The foregoing has described an example of the overall system of the image processing apparatus 100.

FIGS. 2A and 2B illustrate part of a light-receiving surface of the image capturing unit 107 serving as an image sensor. The image capturing unit 107 includes pixel units arranged in an array, each pixel unit holding two photoelectric conversion units (photodiodes, which are light-receiving units) for a single microlens, to enable image capturing plane phase detection autofocus. This makes it possible for each pixel unit to receive a light flux that divides the exit pupil of the lens unit 106.

FIG. 2A is a schematic diagram of a part of the image sensor surface for an example of a red (R), blue (B), and green (Gb, Gr) Bayer array. FIG. 2B is an example of a pixel unit that holds two photodiodes serving as photoelectric conversion units for a single microlens, corresponding to the color filter arrangement in FIG. 2A.

The image sensor having the configuration illustrated in FIG. 2B is capable of outputting two signals for phase difference detection (also called an "A image signal" and a "B image signal" hereinafter) from each pixel unit. The image sensor having the configuration illustrated in FIG. 2B can also output an image capture signal that is the sum of the signals from the two photodiodes (A image signal+B image signal). This added signal is equivalent to the output of the image sensor in the Bayer array example outlined in FIG. 2A.

The image capturing unit 107 can output the signal for phase difference detection for each pixel unit, but can also output a value obtained by finding the arithmetic mean of the signals for phase difference detection for a plurality of pixel units in proximity to each other. By outputting the arithmetic mean, the time required to read out the signal from the image capturing unit 107 can be reduced, and the bandwidth of the internal bus 101 can be reduced.

Using the output signal from the image capturing unit 107 serving as an image sensor, the CPU 102 calculates the correlation between the two image signals to calculate a defocus amount, parallax information, various types of reliability information, and the like. The defocus amount at the image plane is calculated based on misalignment between the A image signal and the B image signal. The defocus amount has a positive or negative value, and whether the focus is front focus or rear focus can be determined by whether the defocus amount has a positive value or a negative value. The extent to which the subject is out of focus can be determined from the absolute value of the defocus amount, and the subject is determined to be in focus when the defocus amount is 0. In other words, the CPU 102 calculates information indicating front focus or rear focus based on the whether the defocus amount is positive or negative. Additionally, the CPU 102 calculates information indicating the degree of focus, corresponding to the degree to which the subject is out of focus, based on the absolute value of the defocus amount. The CPU 102 outputs the information as to whether the focus is front focus or rear focus when the defocus amount is greater than a predetermined value, and outputs information indicating that the subject is in focus when the absolute value of the defocus amount is within the predetermined value. The CPU 102 controls the lens unit 106 to adjust the focus according to the defocus amount.

Additionally, based on the parallax information and the lens information of the lens unit 106, the CPU 102 calculates a distance to the subject using the principle of triangulation. Furthermore, the CPU 102 generates a Trimap taking into account the distance to the subject, the lens information of the lens unit 106, and the setting status of the image processing apparatus 100. The method of generating a Trimap will be described in detail later.

Here, two signals are output from the image capturing unit 107 for each pixel, namely the (A image signal+B image signal) for image capturing, and the A image signal for phase difference detection. In this case, the B image signal for phase difference detection can be calculated by subtracting the A image signal from the (A image signal+B image signal) after the output. The method is not limited thereto, however, and the output from the image capturing unit 107 may be performed as the A image signal and the B image signal, in which case the (A image signal+B image signal) for image capturing can be calculated by adding the A image signal and the B image signal.

FIGS. 2A and 2B illustrate an example in which the pixel units, each holding two photodiodes as photoelectric conversion units for a single microlens, are arranged in an array. With respect to this point, pixel units, each holding at least three photodiodes as photoelectric conversion units for a single microlens, may be arranged in an array. Furthermore, a plurality of pixel units may be provided in which the opening positions of the light-receiving units are different relative to the microlenses. In other words, it is sufficient to obtain two signals for phase difference detection that can detect a phase difference, such as the A image signal and the B image signal, as a result.

The image processing apparatus 100 has the above configuration, and it is therefore possible to obtain a captured image and a plurality of parallax images generated by shooting using an image sensor in which a plurality of photoelectric conversion units, each receiving a light flux passing through different partial pupil regions of the imaging optical system, are arranged.

In each of the following embodiments, the image processing apparatus 100 described above is used unless otherwise noted. Additionally, the configurations in each of the following embodiments can be combined as appropriate.

Embodiment 10

Embodiment 10 describes an example of processing for generating a Trimap (a background separation image).

Figure 3:
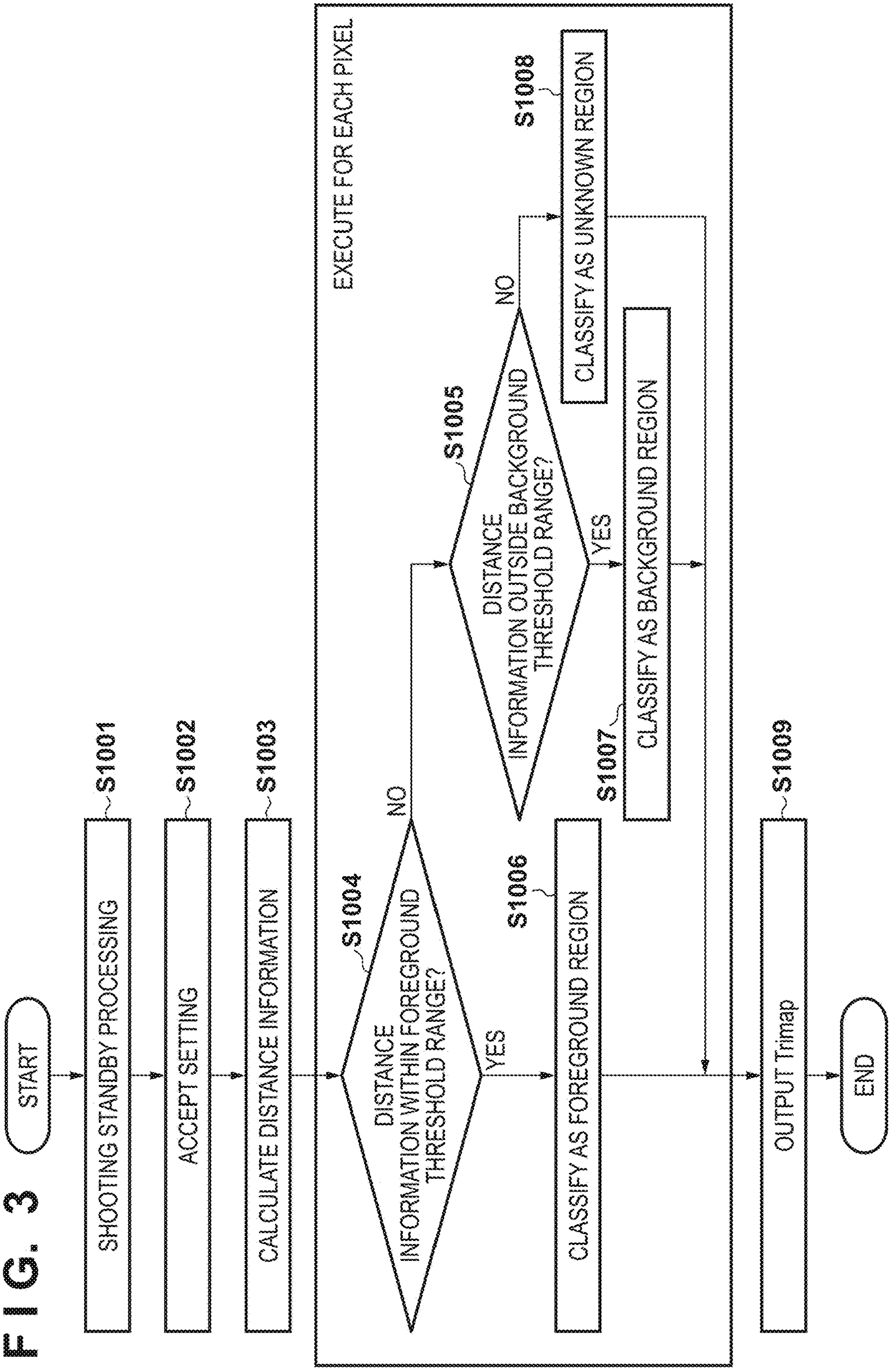
FIG. 3 is a flowchart illustrating Trimap generation processing according to Embodiment 10.

FIG. 3 is a flowchart illustrating Trimap generation processing according to Embodiment 10. Each process in this flowchart is realized by the CPU 102 loading a program stored in the ROM 103 into the RAM 104 and executing that program.

When the power is turned on to the power supply unit 116 by the user operating the operation unit 113, the CPU 102 performs shooting standby processing in step S1001. In the shooting standby processing, the CPU 102 displays, in the display unit 114, an image captured by the image capturing unit 107 and processed by the image processing unit 105, such as that illustrated in FIG. 4, as well as a menu for configuring the image processing apparatus 100.

In step S1002, the user operates the operation unit 113 while looking at the display unit 114. The CPU 102 performs settings and processing in response to the above operations for each processing unit of the image processing apparatus 100.

Figure 5:
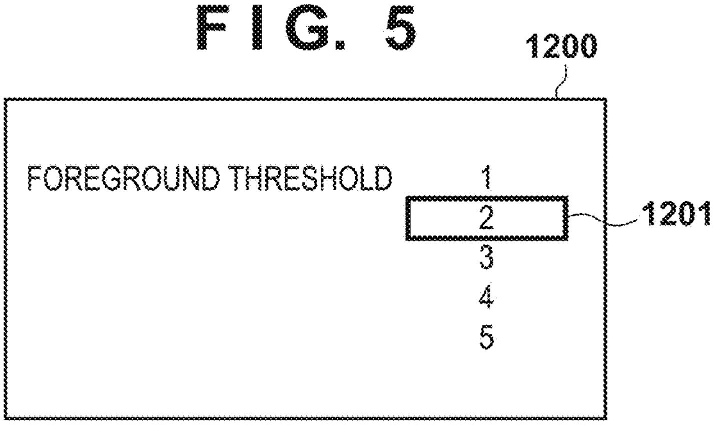
FIG. 5 is a diagram illustrating an example of the display of a setting menu for a reference value of a foreground threshold used when generating a Trimap according to Embodiment 10.

FIG. 5 is a diagram illustrating an example of the display of a setting menu for a reference value of a foreground threshold used when generating the Trimap. A specific example of the reference value for the foreground threshold will be described below. First, in response to the user operating the operation unit 113, the CPU 102 displays a foreground threshold setting menu screen 1200 in the display unit 114, and accepts the setting of the reference value for the foreground threshold. The user moves a cursor 1201 displayed in the foreground threshold setting menu screen 1200 by operating the operation unit 113, and sets the reference value for the foreground threshold.

Figure 6:
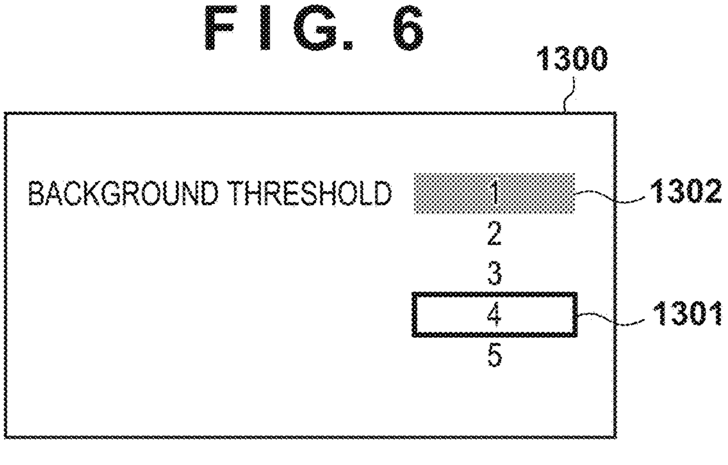
FIG. 6 is a diagram illustrating an example of the display of a setting menu for a reference value of a background threshold used when generating a Trimap according to Embodiment 10.

FIG. 6 is a diagram illustrating an example of the display of a setting menu for a reference value of a background threshold used when generating the Trimap. A specific example of the reference value for the background threshold will be described below. In response to the user operating the operation unit 113, the CPU 102 displays a background threshold setting menu screen 1300 in the display unit 114, and accepts the setting of the reference value for the background threshold. The user moves a cursor 1301 displayed in the background threshold setting menu screen 1300 by operating the operation unit 113, and sets the reference value for the background threshold.

Here, the CPU 102 displays the background threshold setting menu screen 1300 in such a manner that the user cannot set a value smaller than the value set as the reference value for the foreground threshold. For example, if 2 is set as the reference value for the foreground threshold, the CPU 102 performs a display such as a gray display 1302 illustrated in FIG. 6, and performs control such that 1 cannot be set as the background threshold.

The CPU 102 also determines the foreground threshold and the background threshold according to the reference values for the foreground threshold and the background threshold set in step S1002, respectively.

In step S1003, the CPU 102 calculates distance information to the subject for each pixel based on the parallax information and lens information of the lens unit 106 (i.e., distance distribution information is obtained).

Figure 4:
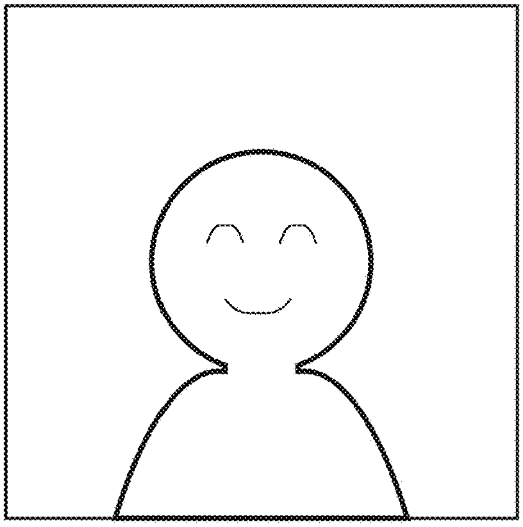
FIG. 4 is a diagram illustrating an example of an image displayed in shooting standby processing (step S1001 of FIG. 3) of Embodiment 10.
Figure 7:
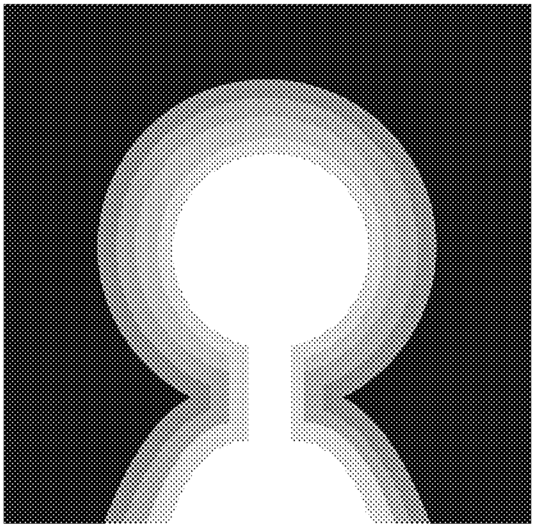
FIG. 7 is a diagram illustrating an example of distance information calculated by a CPU 102 when the image capturing unit 107 captures the image illustrated in FIG. 4, according to Embodiment 10.

FIG. 7 is a diagram illustrating an example of the distance information calculated by the CPU 102 when the image capturing unit 107 captures the image illustrated in FIG. 4. In FIG. 7, pixels at a position where the defocus amount is 0 are indicated by white, and pixels are illustrated in darker shades of gray as the defocus amount becomes larger or smaller than 0.

In step S1004, the CPU 102 determines, for each pixel, whether the distance information to the subject is within the range of the foreground threshold determined in step S1002. If the distance information is within the range of the foreground threshold, the processing moves to step S1006, whereas if the distance information is outside the range of the foreground threshold, the processing moves to step S1005.

In step S1005, the CPU 102 determines, for each pixel, whether the distance information to the subject is outside the range of the background threshold determined in step S1002. If the distance information is outside the range of the background threshold, the processing moves to step S1007, whereas if the distance information is within the range of the background threshold, the processing moves to step S1008.

In step S1006, the CPU 102 classifies a region of pixels for which the distance information is determined to be within the range of the foreground threshold in step S1004 as a foreground region, and performs processing for replacing the pixel values in that region with white data.

In step S1007, the CPU 102 classifies a region of pixels for which the distance information is determined to be outside the range of the background threshold in step S1005 as a background region, and performs processing for replacing the pixel values in that region with black data.

In step S1008, the CPU 102 classifies a region of pixels for which the distance information is determined to be within the range of the background threshold in step S1005 as an unknown region, and performs processing for replacing the pixel values in that region with gray data.

Specifically, assume that, for example, the distance information calculated by the CPU 102 in step S1003 takes a value in the range of from −128 to +127, and that the value of the distance information at the position where the defocus amount is 0 is 0. Furthermore, assume that the reference value of the threshold set by the user in step S1002 and a range of values according to the reference value are in the relationship illustrated in FIG. 8. If the reference value for the foreground threshold set in step S1002 is 2 and the reference value for the background threshold is 4, the CPU 102 classifies a region in which the distance information is from −50 to +50 as the foreground region, regions of from −128 to −101 and from +101 to +127 as the background region, and regions from −100 to −51 and from +51 to +100 as the unknown region. The CPU 102 then performs processing for replacing the pixel values in the foreground region with white data, the pixel values in the background region with black data, and the pixel values in the unknown region with gray data.

Figure 9:
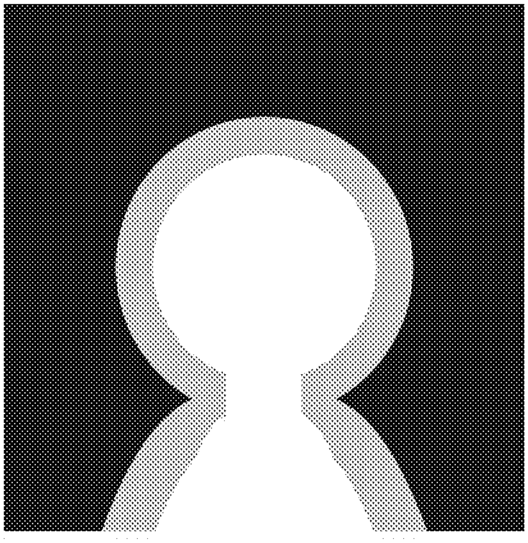
FIG. 9 is a diagram illustrating an example of a Trimap generated based on the distance information in FIG. 7, according to Embodiment 10.

Through the above processing, the CPU 102 generates a Trimap divided into three regions, namely the foreground region, the background region, and the unknown region. FIG. 9 is a diagram illustrating an example of a Trimap generated based on the distance information in FIG. 7.

In step S1009, the CPU 102 performs processing for outputting the Trimap to the display unit 114, the image terminal 109, or the network terminal 108.

As described above, in the present embodiment, a Trimap can be generated easily, without calibration, by generating the Trimap using the distance information calculated from data from an image plane phase detection sensor.

Although the present invention describes a configuration in which the Trimap is displayed or output, the configuration may be such that the Trimap is recorded into the recording medium 112 via the recording medium I/F 110. The configuration may be such that the Trimap is displayed, output, or recorded as a single still image, or a plurality of sequential Trimaps are displayed, output, or recorded as a moving image.

Additionally, although the present embodiment describes a configuration in which the signals for phase difference detection are output for each pixel unit from the image capturing unit 107, the configuration may be such that values obtained by finding the arithmetic mean of the signals for phase difference detection from a plurality of pixel units in proximity to each other in the image capturing unit 107 are output and a reduced Trimap is generated using those values. The reduced Trimap may be displayed, output, or recorded at the original image size, or may be resized by the image processing unit 105 and displayed, output, or recorded at a different image size.

Additionally, although the present embodiment describes a configuration in which the Trimap is displayed using white data for the foreground region, black data for the background region, and gray data for the unknown region, the color data for each region may be replaced with color data different from that in the above example.

Embodiment 20

In Embodiment 10, it is difficult for the user to grasp a positional relationship between a shot image and the boundaries of each region of the Trimap. Therefore, Embodiment 20 will describe an example of processing of superimposing boundary lines of each region of the Trimap on the captured image.

Figure 10:
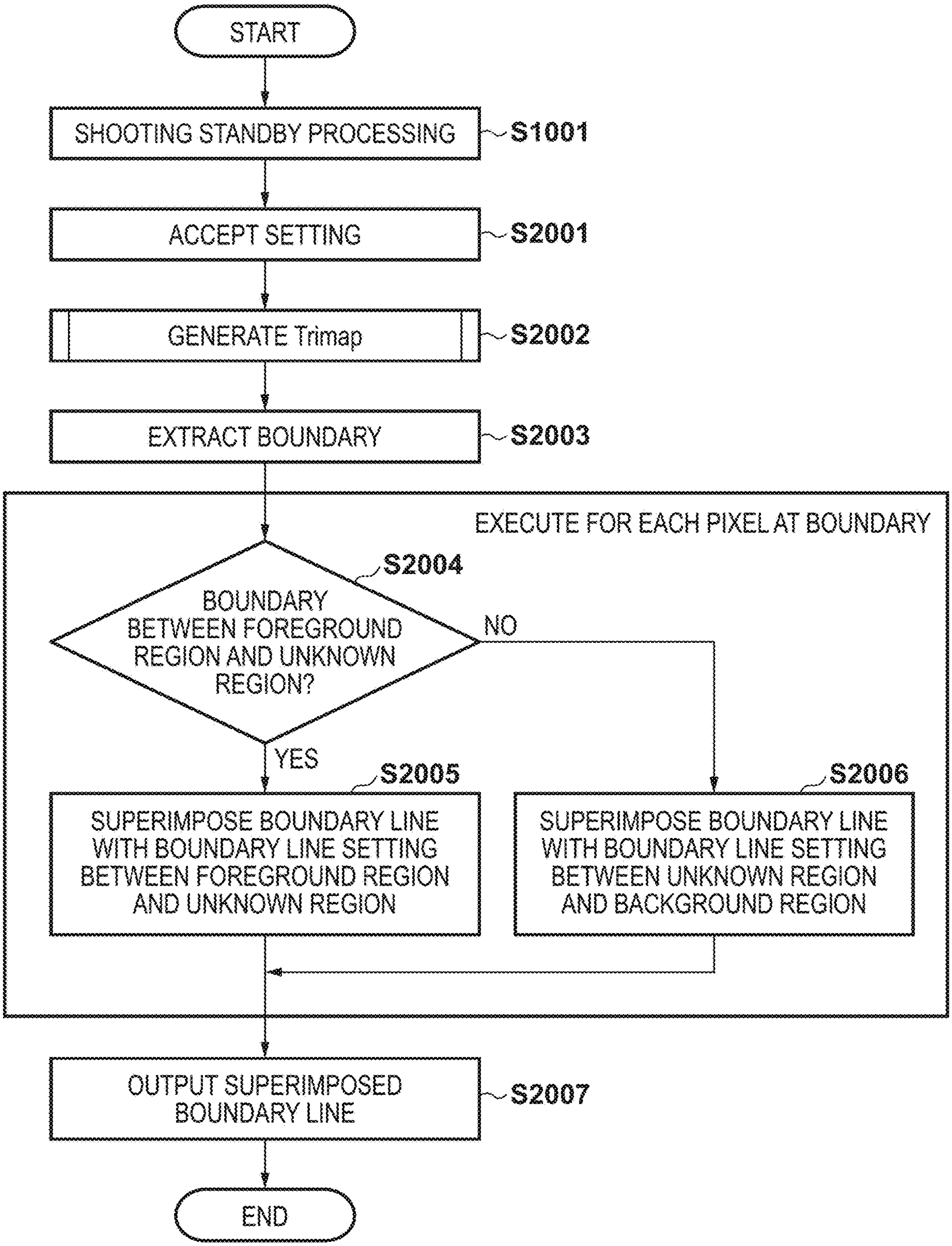
FIG. 10 is a flowchart illustrating processing for displaying boundary lines of each of regions in a Trimap superimposed over a captured image, according to Embodiment 20.

FIG. 10 is a flowchart illustrating processing for displaying boundary lines of each of the regions in the Trimap superimposed over the captured image, according to Embodiment 20. Each process in this flowchart is realized by the CPU 102 loading a program stored in the ROM 103 into the RAM 104 and executing that program. In the present embodiment, the same reference signs are given to the same or similar configurations and steps as in Embodiment 10, and redundant descriptions will not be given.

In step S2001 of FIG. 10, the user operates the operation unit 113 while looking at the display unit 114. The CPU 102 performs settings and processing in response to the above operations for each processing unit of the image processing apparatus 100.

Figure 11:
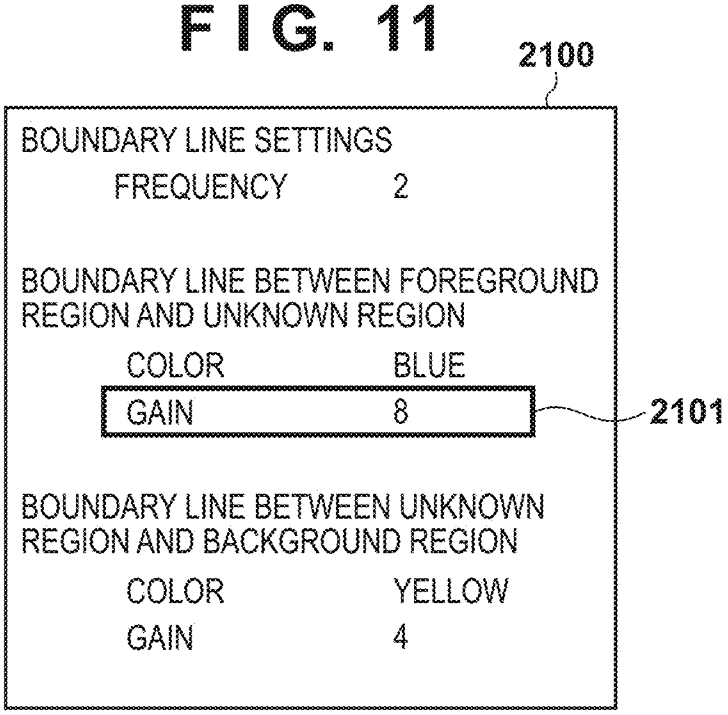
FIG. 11 is a diagram illustrating an example of the display of a setting menu pertaining to settings for each of boundary lines when displaying a boundary line between a foreground region and an unknown region, and a boundary line between the unknown region and a background region, in a Trimap, superimposed over a captured image, according to Embodiment 20.

FIG. 11 is a diagram illustrating an example of the display of a setting menu pertaining to settings for each of boundary lines when displaying a boundary line between a foreground region and an unknown region, and a boundary line between the unknown region and a background region, in a Trimap, superimposed over a captured image. By the user operating the operation unit 113, the CPU 102 displays a boundary line setting menu screen 2100 in the display unit 114, and accepts various settings related to the boundary line between the foreground region and the unknown region and the boundary line between the unknown region and the background region. Then, by moving a cursor 2101 displayed in the boundary line setting menu screen 2100 by operating the operation unit 113, and selecting each of setting items, the user makes various settings related to the boundary line between the foreground region and the unknown region and the boundary line between the unknown region and the background region. Each setting item will be described later.

Note that in step S2001, the user also sets the reference value for the foreground threshold and the reference value for the background threshold, in the same manner as in step S1002.

In step S2002, the CPU 102 generates the Trimap by performing the same processing as step S1003 to step S1008 described in Embodiment 10.

In step S2003, the CPU 102 extracts the boundaries of each region in the Trimap. Specifically, the boundaries of each region can be extracted by, for example, applying a high-pass filter with a predetermined cutoff frequency to luminance values of the Trimap in which the foreground region, the background region, and the unknown region are constituted by white data, black data, and gray data, respectively, and extracting high-frequency components. The cut-off frequency is determined by the CPU 102 according to the value of a frequency set by the user through the operation unit 113 in step S2001.

Furthermore, the CPU 102 can also determine whether a boundary is between white data and gray data, between gray data and black data, or between white data and black data, based on the positive/negative sign and magnitude of the values extracted by the aforementioned high-pass filter. For example, because the difference in luminance between white data and gray data is smaller than the difference in luminance between white data and black data, the magnitude of the value extracted by the high-pass filter can be used to determine whether a pixel in the white data region is on the boundary of the gray data or the boundary of the black data. When the gray data is used as a reference, the difference in luminance between the gray data and white data and the difference in luminance between the gray data and black data are opposite in terms of the positive/negative sign, and thus the positive/negative sign of the values extracted by the high-pass filter can be used to determine whether a pixel in the gray data region is on the boundary of the white data or on the boundary of the black data.

In this manner, it is possible to determine whether a boundary is between white data and gray data, between gray data and black data, or between white data and black data, i.e., whether a boundary is between the foreground region and the unknown region, between the unknown region and the background region, or between the foreground region and the background region.

In step S2004, the CPU 102 determines, for each pixel, whether the boundary extracted in step S2003 is a boundary between the foreground region and the unknown region. If the boundary is a boundary between the foreground region and the unknown region, the processing moves to step S2005, whereas when such is not the case, i.e., if the boundary is a boundary between the unknown region and the background region or between the foreground region and the background region, the processing moves to step S2006.

In step S2005, the CPU 102 superimposes color data, corresponding to the setting of the boundary line between the foreground region and the unknown region set in step S2001, on an output image signal from the image processing unit 105, at the same position as the pixel determined to be on the boundary between the foreground region and the unknown region in step S2004. Specifically, data in which the higher the gain value set in the boundary line setting menu screen 2100 is, the darker the color set as color appears, is superimposed on the output image signal from the image processing unit 105.

In step S2006, the CPU 102 superimposes color data, corresponding to the setting of the boundary line between the unknown region and the background region set in step S2001, on the output image signal from the image processing unit 105, at a boundary that is not the boundary between the foreground region and the unknown region in step S2004, i.e., at a position of a pixel determined to be on the boundary between the unknown region and the background region or the boundary between the foreground region and the background region. Specifically, data in which the higher the gain value set in the boundary line setting menu screen 2100 is, the darker the color set as color appears, is superimposed on the output image signal from the image processing unit 105.

Figure 12:
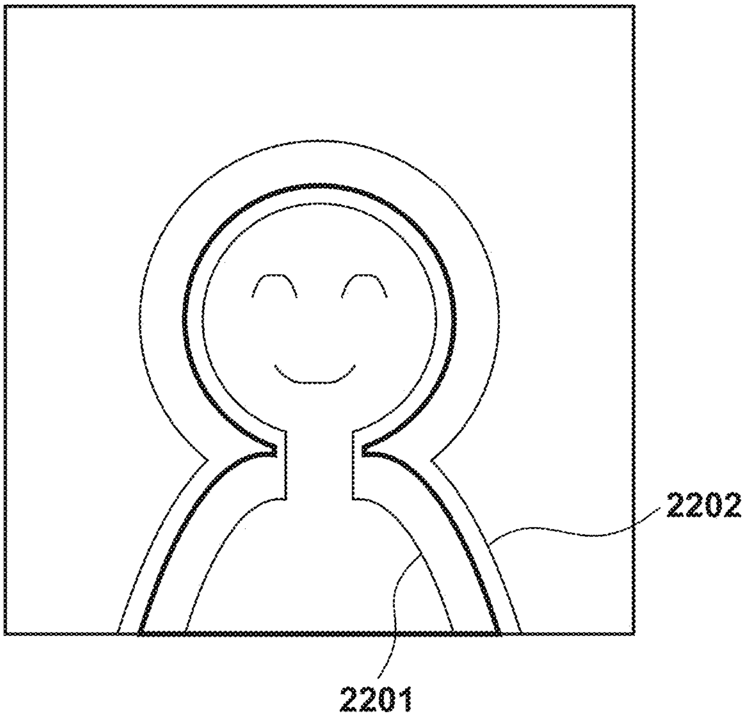
FIG. 12 is a diagram illustrating an example of a screen in which a boundary line 2201 between a foreground region and an unknown region, and a boundary line 2202 between the unknown region and a background region, are displayed superimposed over the image illustrated in FIG. 4, according to Embodiment 20.

In step S2007, the CPU 102 performs processing for outputting the image signal on which the boundary lines have been superimposed in step S2005 or step S2006 to the display unit 114, the image terminal 109, or the network terminal 108. FIG. 12 is a diagram illustrating an example of a screen displaying the image illustrated in FIG. 4 with a boundary line 2201 between the foreground region and the unknown region, and a boundary line 2202 between the unknown region and the background region, superimposed thereon. As illustrated in FIG. 12, the captured image is displayed in a way that enables the foreground region, the background region, and the unknown region to be identified.

As described above, the present embodiment makes it easier for the user to understand the relationship between the shot image and the boundaries between the regions of the Trimap by superimposing the boundary lines among the Trimap regions on the captured image.

Additionally, by making the setting of the boundary lines between the foreground region and the background region the same as the setting of the boundary lines between the unknown region and the background region, it can be made easier for the user to recognize that the subject is in the unknown region.

Embodiment 30

There is an issue in that when the image and the Trimap are displayed separately, it is difficult to check whether the foreground region and the unknown region of the Trimap cover the subject of the image. The present embodiment will describe a configuration that addresses this issue.

In the present embodiment, the image processing unit 105 illustrated in FIG. 1 sets a transparency a for each of the foreground region, the unknown region, and the background region of the Trimap in the image, and performs processing for superimposing the Trimap in which the transparencies are set onto the image. The CPU 102 then displays the image with the Trimap superimposed thereon in the display unit 114. Here, the transparency a represents an opaque state when the value thereof is 0, a transparent state when the value thereof is 1, and a translucent state when the value thereof is between 0 and 1. Then, only the image may be displayed, by setting $\alpha=1$ for all of the foreground region, the unknown region, and the background region of the Trimap, or only the Trimap may be displayed, by setting $\alpha=0$ for all the regions.

Figure 13:
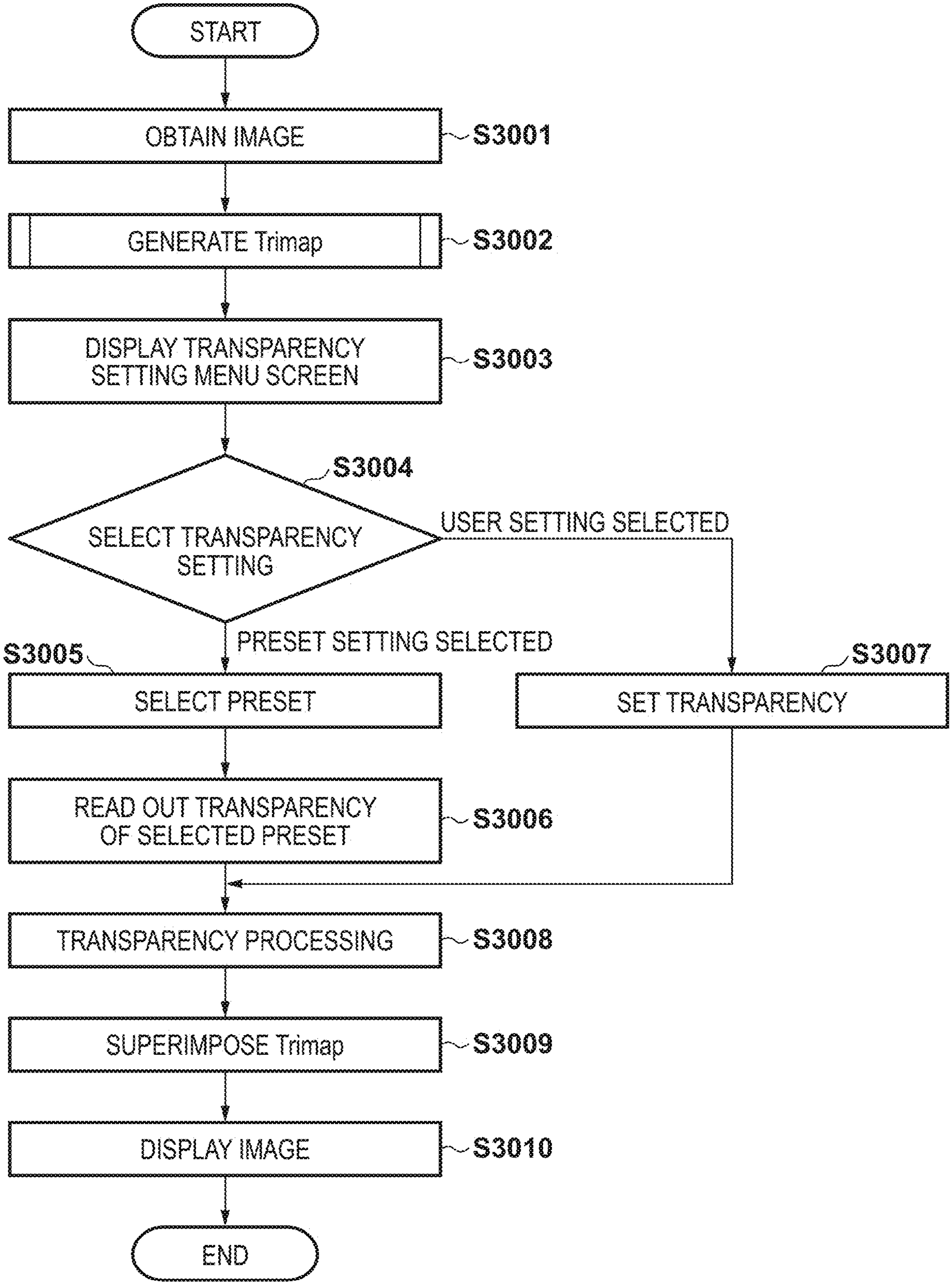
FIG. 13 is a flowchart illustrating processing of superimposing a Trimap over an image according to Embodiment 30 and Embodiment 31.

With reference to FIG. 13, an example of a user selecting a transparency setting for the Trimap from presets will be described. First, in step S3001, the CPU 102 obtains an image that has been processed by the image processing unit 105. In step S3002, the CPU 102 generates the Trimap by performing the same processing as step S1003 to step S1008 described in Embodiment 10.

Figure 14:
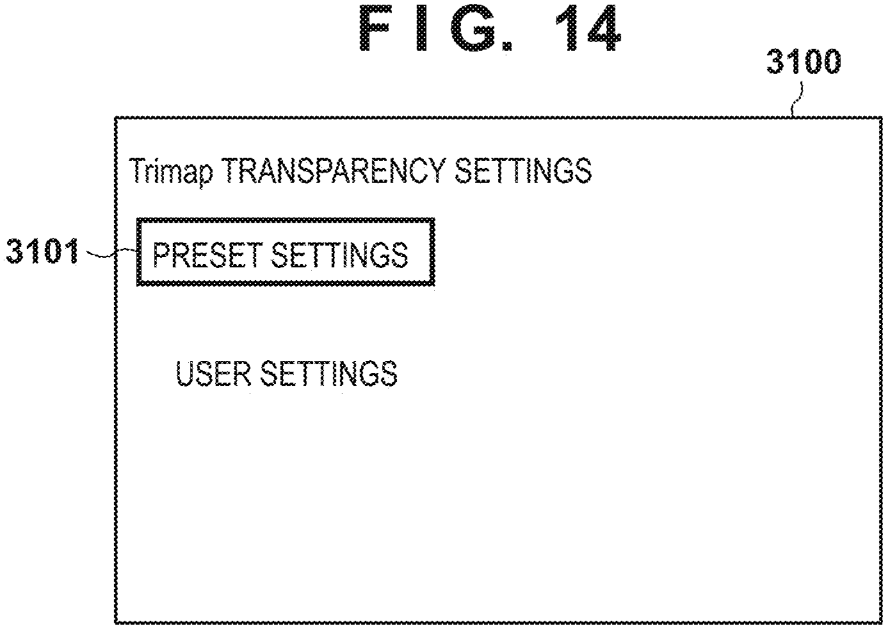
FIG. 14 is a descriptive diagram of a transparency setting menu screen for a Trimap according to Embodiment 30 and Embodiment 31.

In step S3003, by the user operating the operation unit 113, the CPU 102 displays a Trimap transparency setting menu screen 3100, illustrated in FIG. 14, in the display unit 114. Here, FIG. 14 illustrates an example of the Trimap transparency setting menu screen 3100 and a cursor 3101 displayed in the display unit 114 in step S3003.

In step S3004, the user moves the cursor 3101 displayed in the Trimap transparency setting menu screen 3100 and selects "preset setting" as the transparency setting of the Trimap by operating the operation unit 113. In response to the user operation, the CPU 102 displays a list of presets in the Trimap transparency setting menu screen 3100. In this case, the processing moves from step S3004 to step S3005. Here, the list of presets may be displayed when the Trimap transparency setting menu screen 3100 is displayed in step S3003. Note that a case where a user setting is selected (when the processing moves from step S3004 to step S3007) will be described in Embodiment 31.

Figure 15:
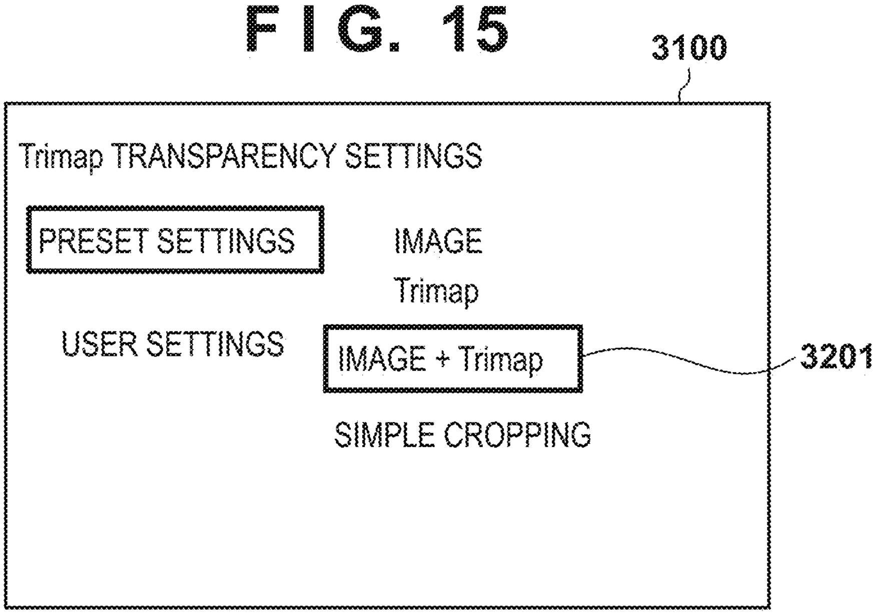
FIG. 15 is a descriptive diagram of the transparency setting menu screen for a Trimap according to Embodiment 30.
Figure 16:
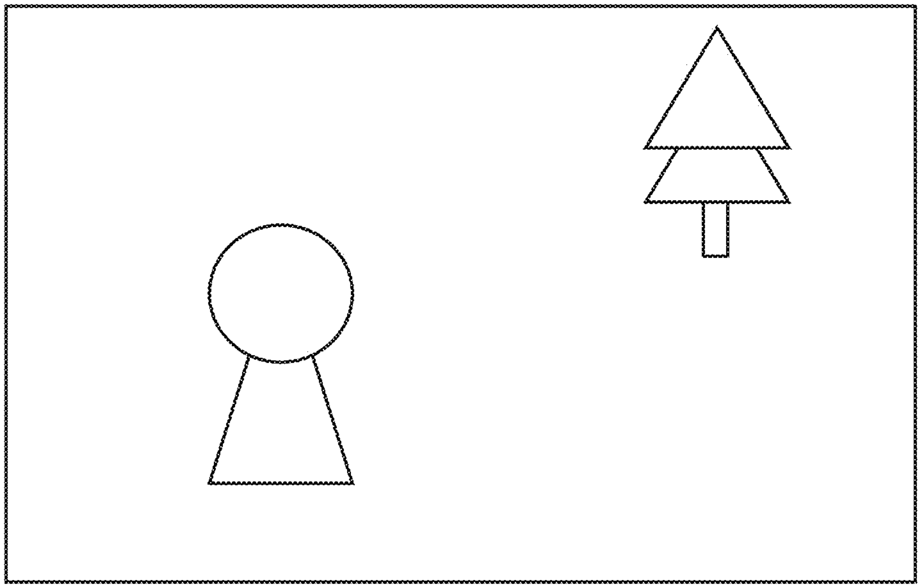
FIG. 16 is a diagram illustrating an example of a Trimap superimposed image according to Embodiment 30.
Figure 17:
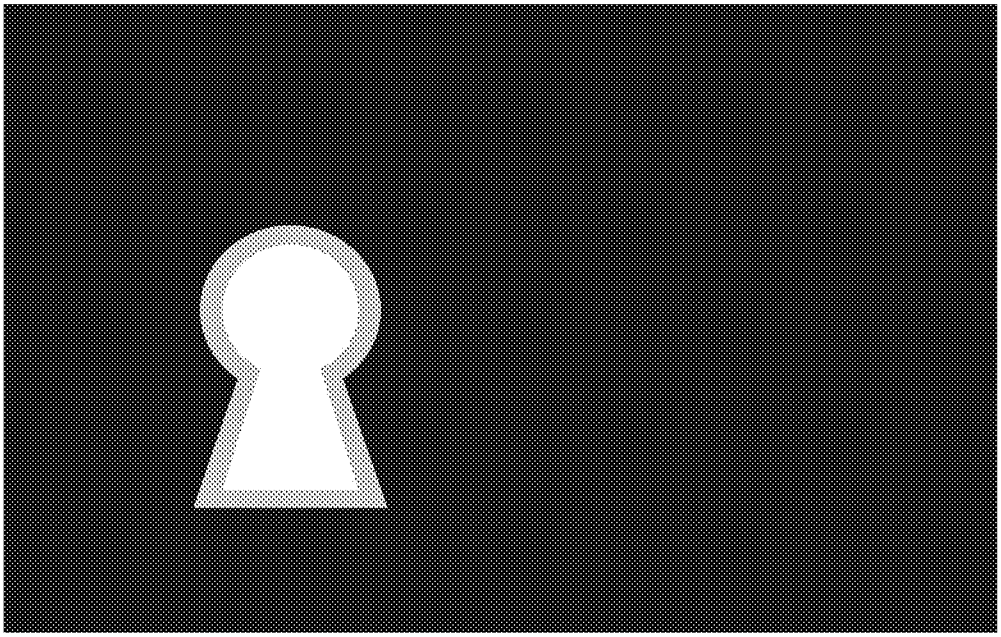
FIG. 17 is a diagram illustrating an example of a Trimap superimposed image according to Embodiment 30.
Figure 18:
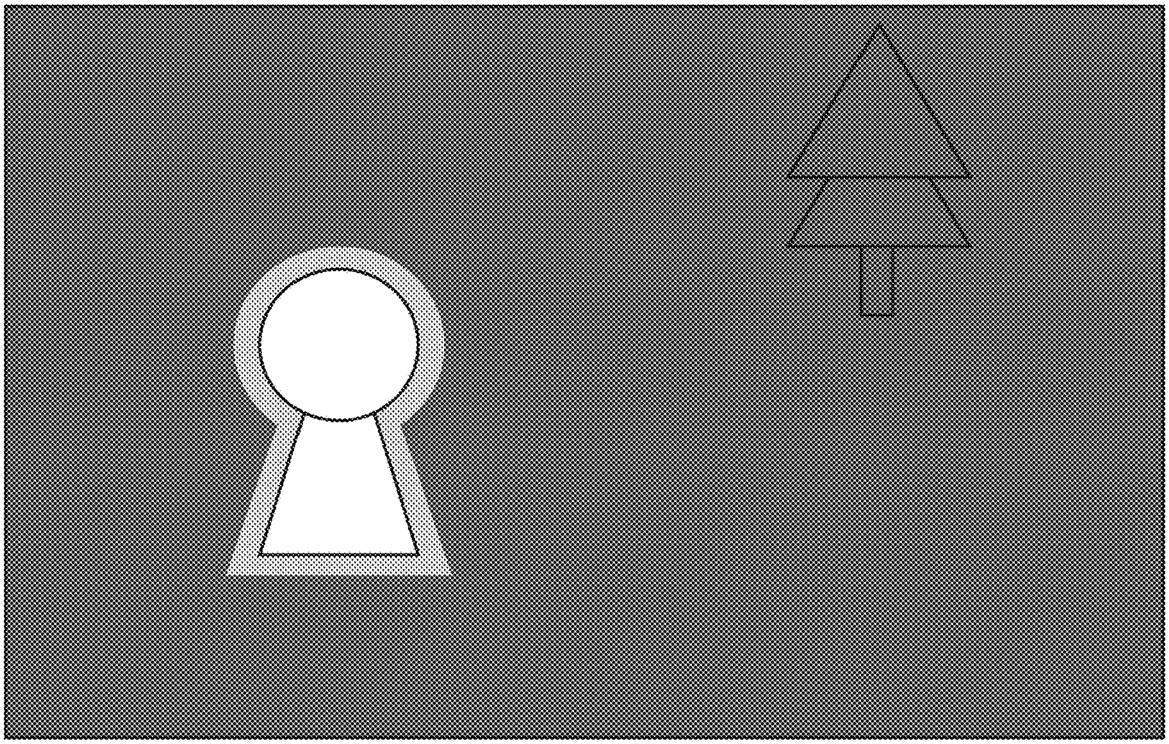
FIG. 18 is a diagram illustrating an example of a Trimap superimposed image according to Embodiment 30.
Figure 19:
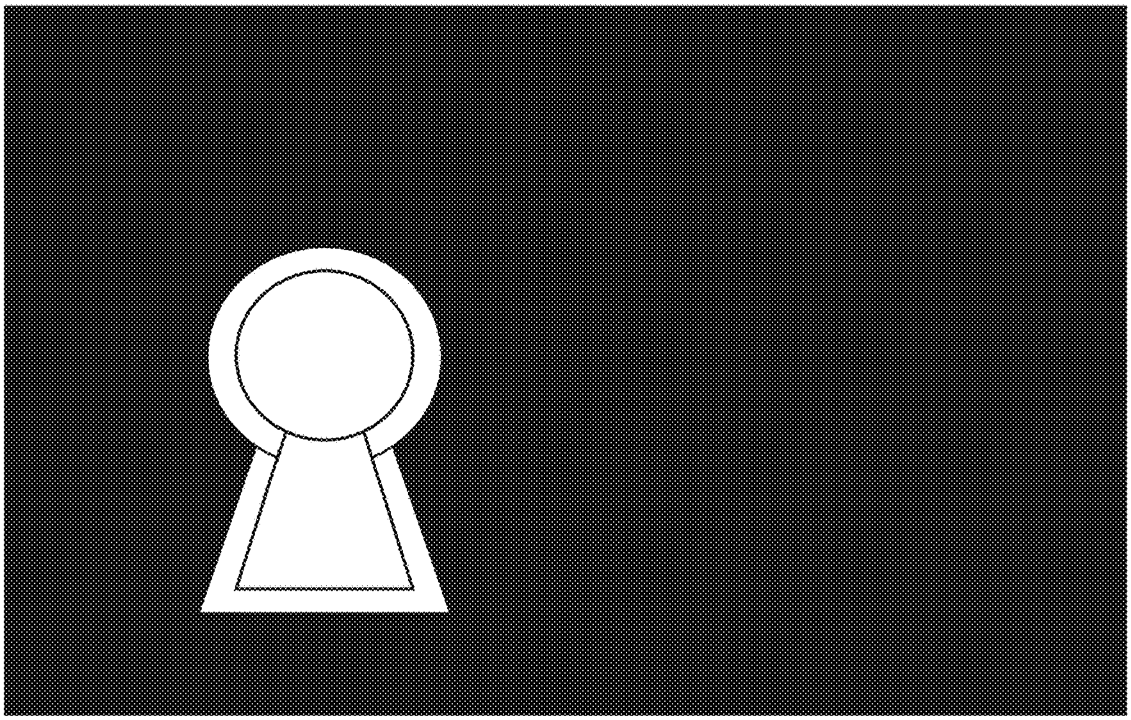
FIG. 19 is a diagram illustrating an example of a Trimap superimposed image according to Embodiment 30.

In step S3005, the user moves a cursor 3201 displayed in the Trimap transparency setting menu screen 3100 and selects a desired preset as the transparency setting of the Trimap by operating the operation unit 113. Here, FIG. 15 illustrates an example of the Trimap transparency setting menu screen 3100 and the cursor 3201 displayed in the display unit 114 in step S3005. The Trimap transparency setting presets represent settings that define a combination of transparencies for the foreground region, the unknown region, and the background region of the Trimap, respectively. For example, ROM 103 holds, as presets, Trimap transparency settings such as (a) image (foreground region: $\alpha$=0, unknown region: $\alpha$=0, background region: $\alpha$=0), (b) Trimap (foreground region: $\alpha$=1, unknown region: $\alpha$=1, background region: $\alpha$=1), (c) image+Trimap (foreground region: $\alpha$=0.3, unknown region: $\alpha$=0.5, background region: $\alpha$=0.7), (d) simple crop (foreground region: $\alpha$=0, unknown region: $\alpha$=0, background region: $\alpha$=1). In step S3006, the CPU 102 reads out the transparencies of the preset selected in step S3005 from the ROM 103.

In step S3008, the CPU 102 performs transparency processing on the Trimap based on the transparencies read out in step S3006. Here, the transparency processing may be realized by applying a different degree of transparency to each region in a single instance of processing for the entire Trimap, based on region information of the Trimap. Alternatively, the transparency processing may be realized by performing the transparency processing on each region of the Trimap in order, temporarily recording the intermediate data into the frame memory 111, and reading the data out when the transparency processing is performed on the next region.

Figure 20:
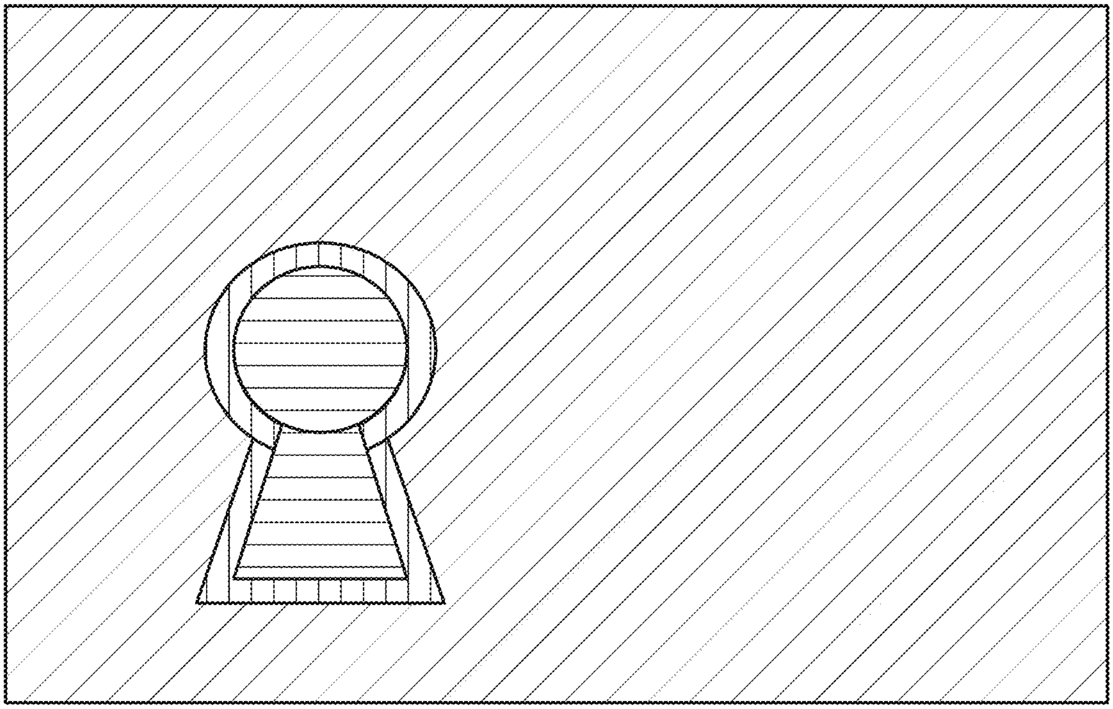
FIG. 20 is a diagram illustrating an example of a Trimap superimposed image according to Embodiment 30.

In step S3009, the CPU 102 superimposes the Trimap, which has undergone the transparency processing in step S3008, on the image obtained in step S3001. In step S3010, the CPU 102 loads the Trimap superimposed image into the frame memory 111 and displays that image in the display unit 114. The Trimap superimposed image may be displayed in picture-in-picture format, or the image may be output from the image terminal 109, or may be recorded into the recording medium 112. The CPU 102 may also record the Trimap superimposed image and the Trimap region information and then change the transparency during playback, or display the recorded Trimap superimposed image in the display unit 114 only during REC review. Here, FIGS. 16, 17, 18, and 19 are examples of the Trimap superimposed image displayed in the display unit 114 in step S3010. The "(a) image", "(b) Trimap", "(c) image+Trimap", and "(d) simple crop" in the example of the transparency setting in step S3005 correspond to FIGS. 16, 17, 18, and 19, respectively. Although the present embodiment describes a configuration in which a Trimap having white data for the foreground region, gray data for the unknown region, and black data for the background region is superimposed, an image representing each region with horizontal lines, vertical lines, and diagonal lines, respectively, may also be superimposed and displayed. An example of such a display is illustrated in FIG. 20.

As described above, according to Embodiment 30, the image and the Trimap can easily be checked at the same time.

Embodiment 31

Embodiment 30 described an example where the user selects the transparency setting for the Trimap from presets, but an example where the user manually sets the transparency setting of the Trimap is conceivable as another embodiment.

Embodiment 31 will describe an example of a user manually setting the transparency setting of the Trimap with reference to the flowchart in FIG. 13. The following will focus on points that differ from Embodiment 30, and configurations, processing, and the like that are the same as in Embodiment 30 will not be described.

Figure 21:
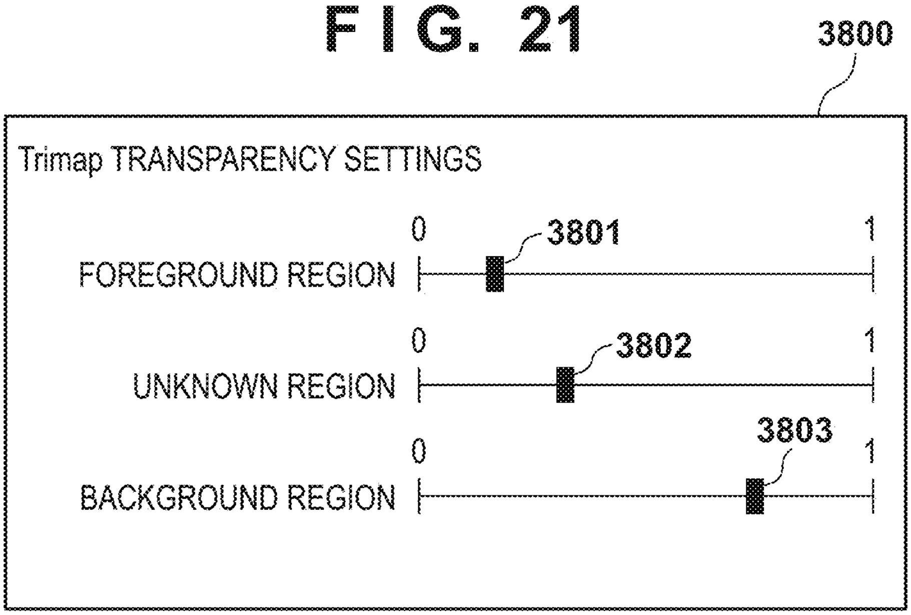
FIG. 21 is a descriptive diagram of the transparency setting menu screen for a Trimap according to Embodiment 31.

First, step S3001 to step S3003 are the same as in Embodiment 30 and will therefore be omitted. Next, in step S3004, the user operates the menu in the same manner as in Embodiment 30, and selects "user setting" as the transparency setting for the Trimap. In response to the user operation, the CPU 102 displays a Trimap transparency setting screen 3800 in the display unit 114. In this case, the processing moves from step S3004 to step S3007. Here, FIG. 21 is an example of the Trimap transparency setting screen 3800, a scroll bar 3801, a scroll bar 3802, and a scroll bar 3803 displayed in the display unit 114 in step S3004.

In step S3007, the user moves the scroll bar 3801, the scroll bar 3802, and the scroll bar 3803 displayed in the Trimap transparency setting screen 3800 by operating the operation unit 113. In response to the user operation, the CPU 102 sets the transparency a for each of the foreground region, the unknown region, and the background region of the Trimap. Here, the transparency setting of Trimap may be realized not only by using a Graphical User Interface (GUI) such as a scroll bar, but also by using a physical interface such as a volume knob that can change the setting value as desired. Next, step S3008 to step S3010 are the same as in Embodiment 30 and will therefore be omitted.

As described above, according to Embodiment 31, the image and the Trimap can easily be checked at the same time.

Embodiment 32

In Embodiment 30 and Embodiment 31, there is an issue in that it is difficult to check the image or the Trimap when a state that affects the image or the Trimap regions arises, or when an operation that affects the image or the Trimap regions is performed. The present embodiment will describe a configuration that addresses this issue.

Figure 22:
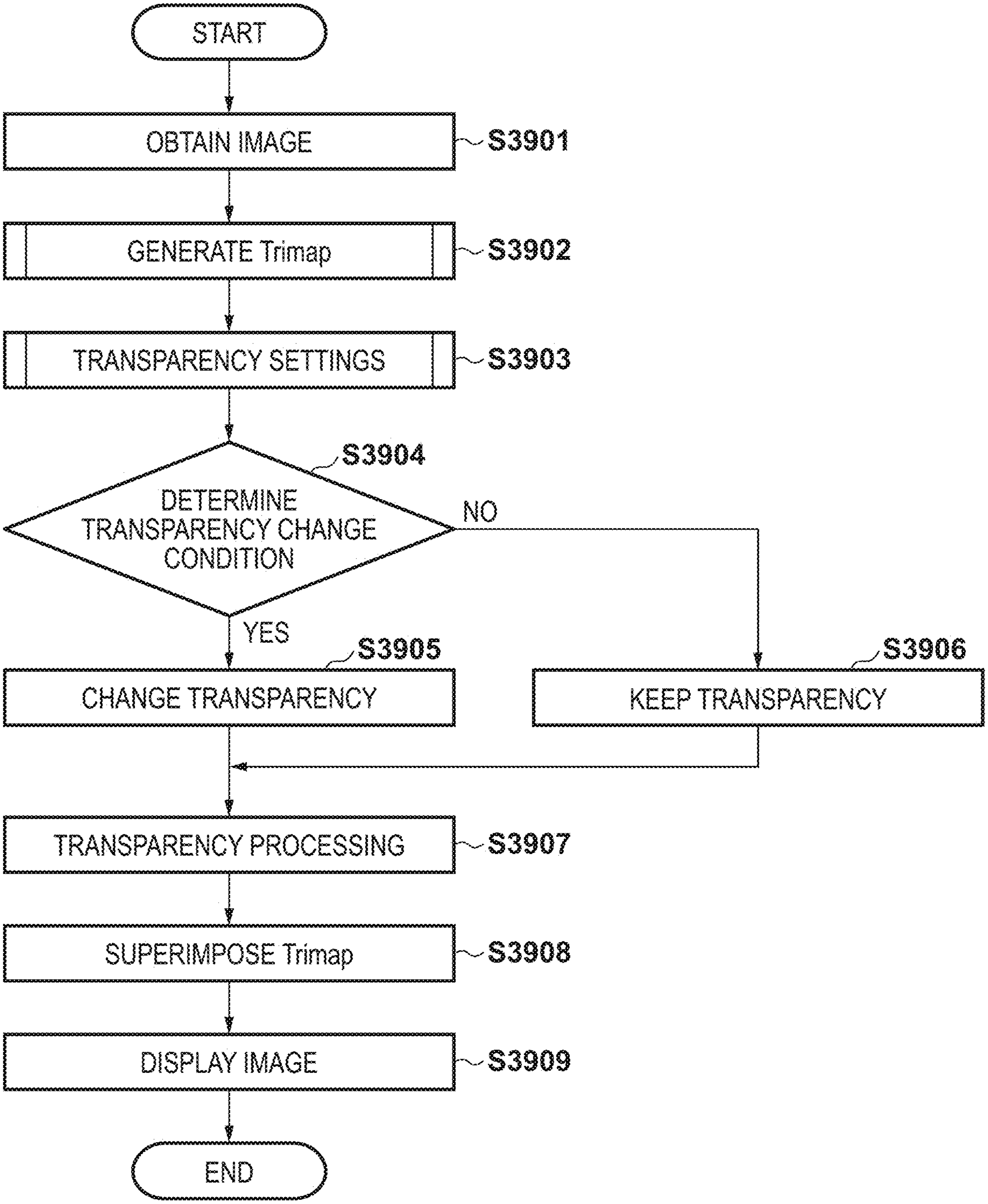
FIG. 22 is a flowchart illustrating processing for changing a transparency according to Embodiment 32.

Embodiment 32 will describe an example of automatically setting the transparency of the Trimap with reference to the flowchart in FIG. 22. The following will focus on points that differ from Embodiment 30 and Embodiment 31, and configurations, processing, and the like that are the same as in Embodiment 30 and Embodiment 31 will not be described.

First, step S3901 and step S3902 are the same as step S3001 and step S3002 in FIG. 13 and will therefore not be described. In step S3903, the same processing as that of step S3003 to step S3007 in FIG. 13 is performed.

Next, in step S3904, the CPU 102 determines whether a Trimap transparency change condition, which is held in the ROM 103, is satisfied. Here, "transparency change condition" refers to whether a state, operation, or the like that affects the image or the Trimap regions is detected, e.g., when a subject enters from outside the angle of view and an additional foreground region is detected, when a lens operation is detected, or the like. If the transparency change condition is satisfied, the processing moves to step S3905, whereas if the transparency change condition is not satisfied, the processing moves to step S3906.

Note that to improve the visibility by preventing continuous changes in the transparency, a configuration may be employed in which the processing moves to step S3905 and the transparency is changed even when the transparency change condition is not satisfied, as long as the frame is within a predetermined number of frames after the transparency change condition is satisfied. In addition to the presence or absence of detection, other conditions may be used as the transparency change condition.

In step S3905, the CPU 102 reads out a transparency according to the transparency set in step S3903 and the transparency change condition from the ROM 103, and changes the transparency. For example, during lens operation, the user will wish to prioritize checking the image, and thus the CPU 102 reads out the setting value of $\alpha=1$ for all of the foreground region, the unknown region, and the background region as the transparency of the Trimap during lens operation detection, and changes the transparency. In this case, during lens operation, only the image is displayed in the display unit 114, and after the lens operation is completed, the image is displayed in the display unit 114 having been subjected to the transparency processing reflecting the transparency set in step S3903. Here, the transparency according to the transparency change condition may be set as desired by the user. Additionally, when using a transparency change condition aside from the presence or absence of the detection of a state or operation that affects the image or the Trimap regions, a configuration may be employed in which a transparency corresponding to each condition is held in the ROM 103, the transparency setting value corresponding to the condition is read out, and the transparency is changed.

A case where the transparency change condition is not satisfied in step S3904 and the processing moves to step S3906 will be described next. In step S3906, the CPU 102 maintains the transparency set in step S3903 without change.

Step S3907, step S3908, and step S3909 following the processing of step S3905 or step S3906 are the same as step S3008, step S3009, and step S3010 in FIG. 13, and will therefore not be described.

As described above, according to Embodiment 32, the image and the Trimap can be easily checked at the same time, and the image or the Trimap can be easily checked when a state or operation that affects the image or the Trimap regions occurs.

Embodiment 40

A configuration that makes it easy for the user to recognize a relationship between the thresholds used when generating the Trimap and the distance information of the subject to be shot, for the Trimap output by the image processing apparatus 100, will be described next. The present embodiment will describe an example of generating and outputting a distance distribution display histogram from a distribution of the distance information.

Figure 23:
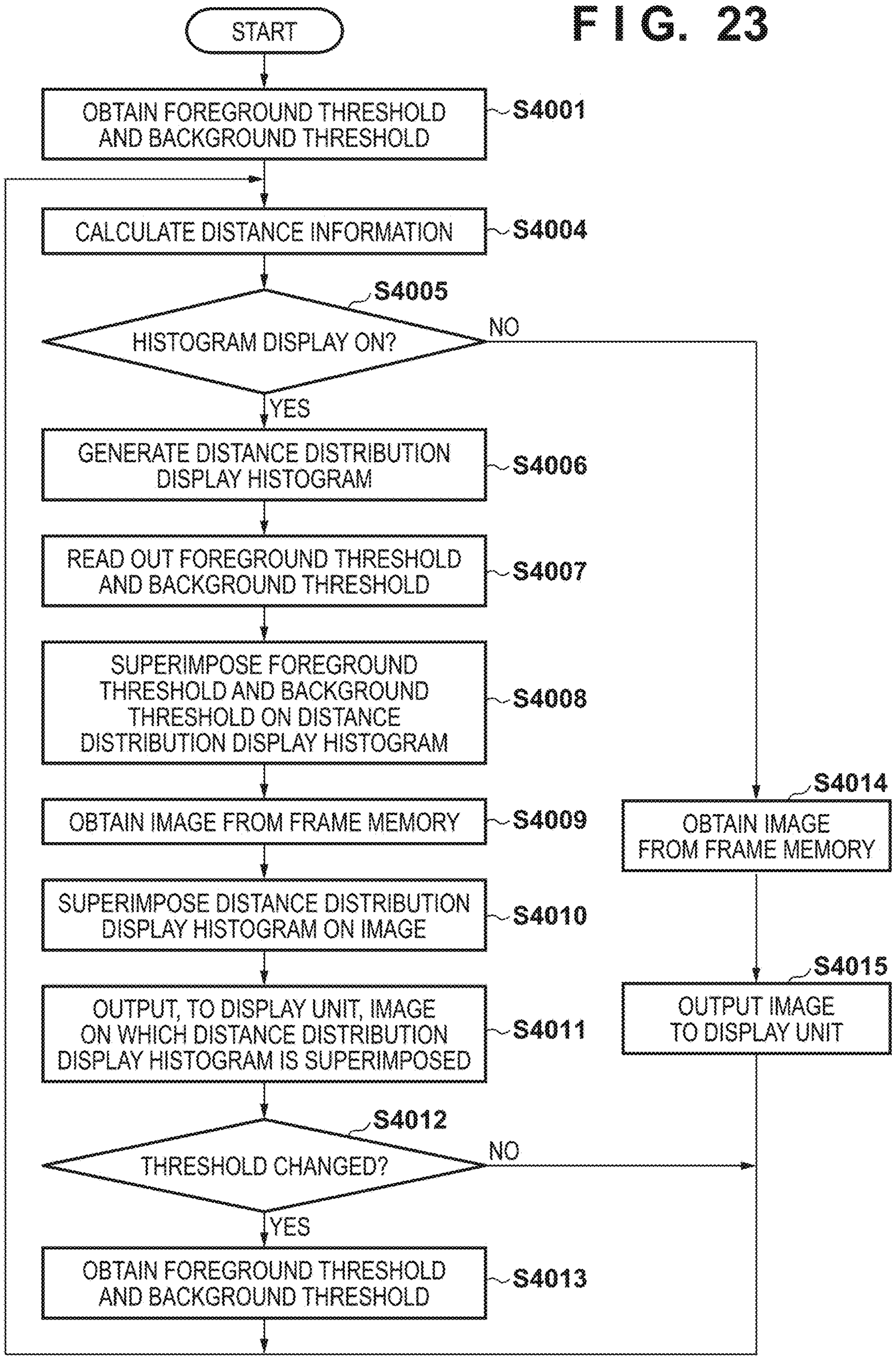
FIG. 23 is a flowchart illustrating processing for generating a distance distribution display histogram and displaying that histogram in a display unit 114, according to Embodiment 40.

FIG. 23 is a flowchart illustrating processing for generating a distance distribution display histogram from the distribution of the distance information and displaying the histogram in the display unit 114. The processing of this flowchart is executed when the user selects a histogram generation mode by operating the operation unit 113. Each process in this flowchart is realized by the CPU 102 loading a program stored in the ROM 103 into the RAM 104 and executing that program.

In step S4001, the CPU 102 obtains the foreground threshold and the background threshold set in step S1002 of Embodiment 10, and stores the thresholds in the RAM 104. Step S4004 is the same as step S1003 in FIG. 3 and will therefore not be described.

In step S4005, the CPU 102 determines whether a display setting for the distance distribution display histogram is on or off. The display setting of the distance distribution display histogram is set by the user by operating the menu using the operation unit 113. If the display setting is on, the processing moves to step S4006, whereas if the display setting is off, the processing moves to step S4014.

In step S4006, the CPU 102 generates a distance distribution display histogram based on the distance information obtained in step S4004. In the present embodiment, the CPU 102 obtains the distance information of corresponding pixels in the image obtained from the frame memory 111 in step S4004, and generates a distance distribution display histogram expressing the distribution of the distance information.

The distance distribution display histogram takes the horizontal axis as the distance, and takes the position where the distance information is 0 as a center value. The distance has a range of ±direction, with the positive direction being the direction away from the image processing apparatus. For example, the actual distance (meters) is normalized to a real number from −128 to 127, and an in-focus position is expressed as 0. Furthermore, the number of pixels in the image having each distance value is expressed as a frequency on the vertical axis.

Figure 24A:
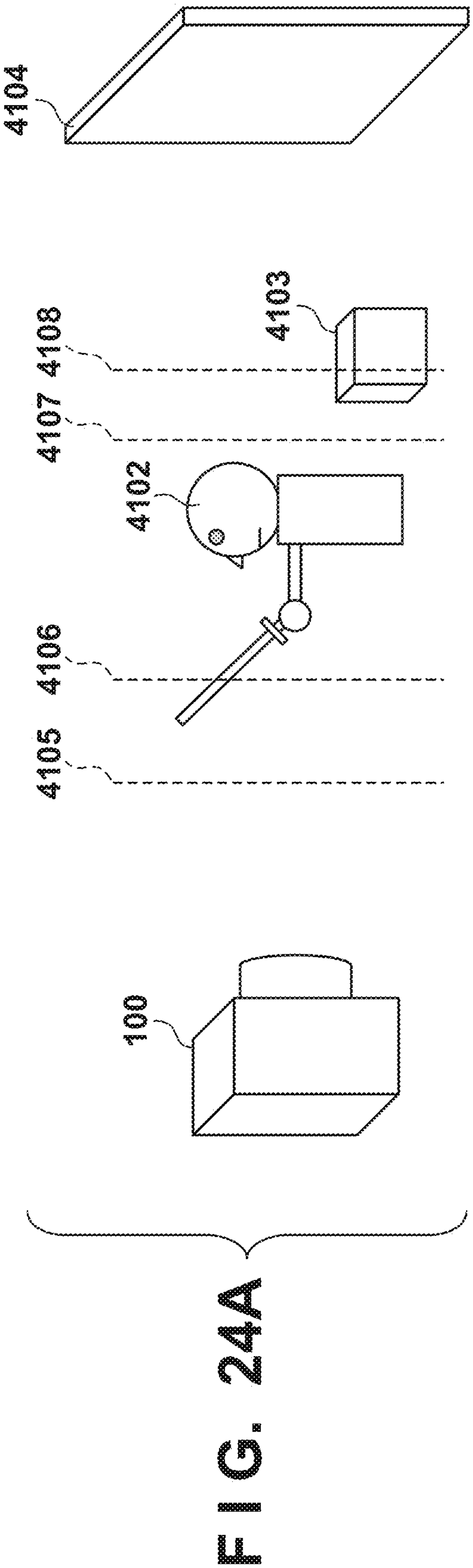
FIGS. 24A and 24B are descriptive diagrams illustrating a relationship between an overall scene and the distance distribution display histogram according to Embodiment 40.
Figure 24B:
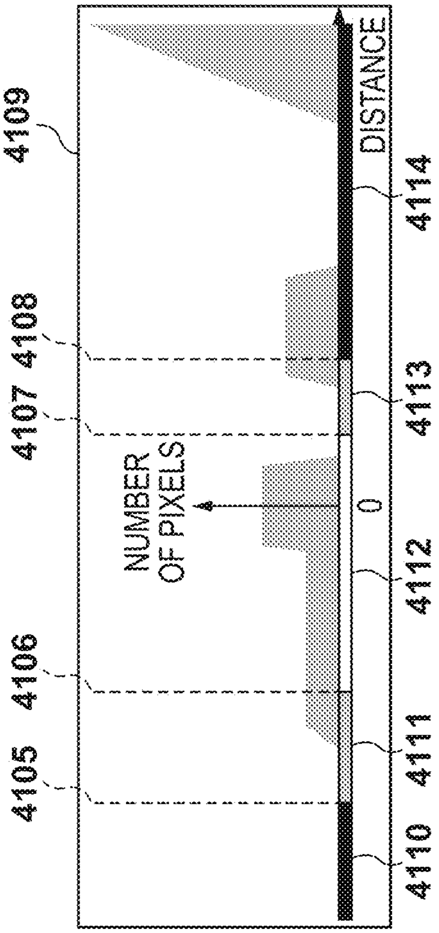

FIGS. 24A and 24B illustrate an example of a relationship between an overall scene that has been shot and the distance distribution display histogram. FIG. 24A illustrates a scene in which a subject 4102 to be cropped, an object 4103 that is not to be cropped, and a background 4104 are located in front of the image processing apparatus 100. Consider a case where in this scene, the image processing apparatus 100 focuses on the subject 4102, shoots an image, and then attempts to crop only the subject 4102. When the image processing apparatus 100 shoots this scene, the CPU 102 generates a distance distribution display histogram 4109, as illustrated in FIG. 24B, from a distribution corresponding to the distances at which the subject 4102, the object 4103, and the background 4104 are located.

In step S4007, the CPU 102 reads out the foreground threshold and the background threshold stored in the RAM 104. The foreground threshold is constituted by a first foreground threshold having a negative value and a second foreground threshold having a positive value. The background threshold is constituted by a first background threshold having a negative value and a second background threshold having a positive value.

In step S4008, the CPU 102 superimposes the foreground threshold and the background threshold read out in step S4007 on the distance distribution display histogram generated in step S4006. Specifically, the CPU 102 superimposes a vertical dotted line 4106 at a position that matches the first foreground threshold and a vertical dotted line 4107 at a position that matches the second foreground threshold on the horizontal axis of the distance distribution display histogram 4109, as illustrated in FIG. 24B. Next, the CPU 102 superimposes a vertical dotted line 4105 at a position that matches the first background threshold and a vertical dotted line 4108 at a position that matches the second background threshold. This makes it possible to indicate the positional relationship between the subject to be cut out and the thresholds. Note that the method of superimposing the foreground threshold and the background threshold on the distance distribution display histogram is not limited thereto. Another superimposing method may be used as long as the positions of the foreground threshold and the background threshold can be recognized and a distinction between the foreground region, the background region, and the unknown region can be made. For example, color-coding the background of the distance distribution display histogram according to the foreground region, the background region, and the unknown region can be given as an example.

Additionally, as illustrated in FIG. 24B, the CPU 102 may color a foreground region 4112 white, a background region 4110 and a background region 4114 black, and an unknown region 4111 and an unknown region 4113 gray on the horizontal axis of the distance distribution display histogram. This enables a display in which it is easy to recognize whether each distribution in the distance distribution display histogram belongs to the foreground region, the background region, or the unknown region. Note that the method of indicating the foreground region, the background region, and the unknown region in the distance distribution display histogram is not limited thereto, and another method may be used as long as the display makes it possible to easily recognize the foreground region, the background region, and the unknown region.

In step S4009, the CPU 102 obtains an image from the frame memory 111. In step S4010, the CPU 102 superimposes the distance distribution display histogram generated in step S4008 onto the image obtained in step S4009.

Figure 25:
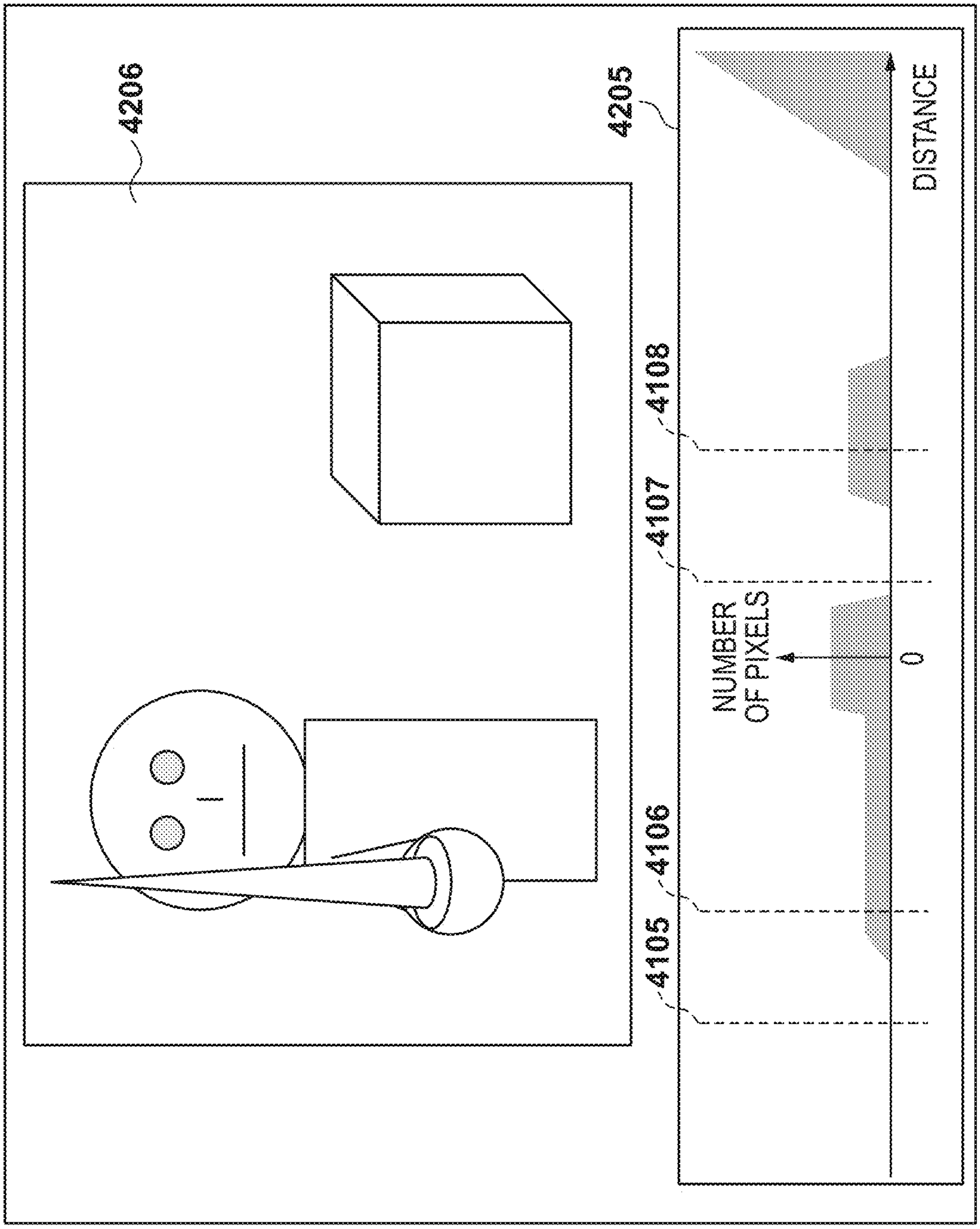
FIG. 25 is a diagram illustrating an example of the display of the distance distribution display histogram according to Embodiment 40.

FIG. 25 is a diagram illustrating an example in which a distance distribution display histogram 4205 is superimposed on a lower part of an image 4206 obtained in step S4009. This makes it possible for the user to check the image and the distance distribution display histogram at the same time. Note that when superimposing the image and the distance distribution display histogram, these items are not limited to being arranged vertically, and another superimposing method may be used as long as the image and the distance distribution display histogram can be checked at the same time. For example, the image and the distance distribution display histogram may be displayed side by side on the left and right, or the distance distribution display histogram may have transparency and be superimposed on part of the image.

In step S4011, the CPU 102 outputs an image such as that illustrated in FIG. 25, composited in step S4010, to the display unit 114, and causes the display unit 114 to display that image. In step S4012, the CPU 102 determines whether at least one of the foreground threshold and the background threshold set by operating the menu using the operation unit 113, as illustrated in FIGS. 5 and 6 of Embodiment 10, has been changed. The CPU 102 determines whether a change has been made by comparing the foreground threshold and the background threshold stored in the RAM 104 with the foreground threshold and the background threshold set by operating the menu using the operation unit 113. If a threshold has been updated (at least one of the foreground threshold and the background threshold has been changed), the processing moves to step S4013, whereas if a threshold has not been updated, the processing moves to step S4004. The process of step S4013 is the same as step S4001 and will therefore not be described. This makes it possible for the user to adjust each threshold while checking the distance distribution display histogram and the image.

A case where the processing has moved from step S4005 to step S4014 will be described next. The process of step S4014 is the same as step S4009 and will therefore not be described. In step S4015, the CPU 102 outputs the image obtained in step S4014 to the display unit 114 and causes the image to be displayed in the display unit 114. This makes it possible to display only the shot image in the display unit 114 when the distance distribution display histogram is set to be hidden.

As described above, according to the present embodiment, the distribution of the distance information in the image is represented by a distance distribution display histogram, which makes it easy for the user to recognize the relationship between the thresholds used when generating the Trimap and the distance information of the subject being shot. This also makes it possible for the user to make adjustments while visually checking the ranges of the thresholds.

Embodiment 41

Embodiment 40 described an example of generating a distance distribution display histogram from the distribution of distance information and displaying the histogram such that the positional relationship between the subject and the foreground and background thresholds can be easily recognized. The embodiment also described an example where by displaying the foreground threshold and the background threshold, the user can make adjustments while visually checking the ranges of the thresholds. However, in the above embodiment, if the subject moves or takes action, the user may not notice that the subject is out of the range of the background threshold, and it may not be possible to generate the Trimap as intended by the user and crop the subject in the intended shape.

In contrast, Embodiment 41 will describe a configuration that expresses the distance distribution display histogram and the image in an emphasized manner to reduce the possibility that the subject to be shot jumps out of the range of the background threshold and the cropping fails.

Figure 26A:
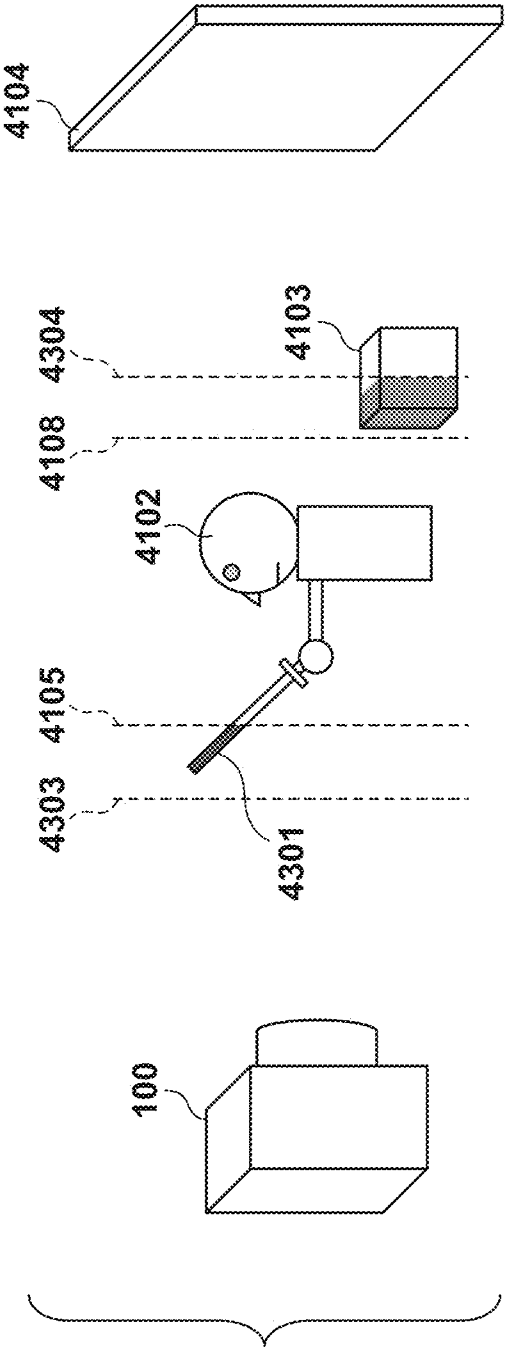
FIGS. 26A and 26B are descriptive diagrams illustrating a relationship between an overall scene and a distance distribution display histogram according to Embodiment 41.

FIG. 26A illustrates a state in which, in the same scene as that in FIG. 24A in Embodiment 40, a part of the subject 4102 (part 4301) jumps out of the vertical dotted line 4105 (the first background threshold). If the image is shot in this state, the image processing apparatus 100 will output a Trimap in which the part 4301 is the background region, making it necessary to shoot the image again. For example, if an external PC performs the cropping processing using a Trimap in which the part 4301 is the background region, the image will be one in which the part 4301 of the subject 4102 is lost (i.e., the cropping will fail). In the present embodiment, by indicating the part that jumps out of the range of the background threshold, such as the part 4301, in an emphasized manner for the user before and during shooting, the user can be prompted to adjust the position of the subject and the background threshold, which makes it possible to prevent the need to re-shoot the image due to the Trimap generation failing.

Figure 26B:
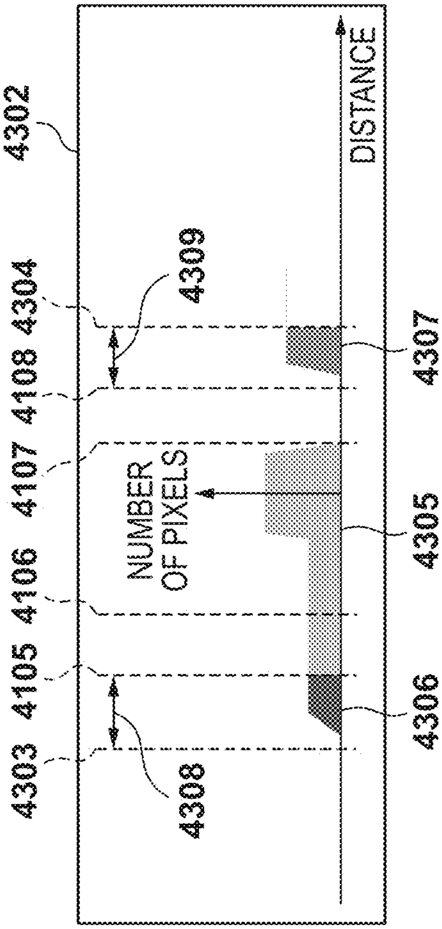

FIG. 26B illustrates the foreground threshold, background threshold, and a display threshold superimposed on a distance distribution display histogram 4302. The "display threshold" defines a range of the distance distribution display histogram to be displayed in the display unit 114. When the distance distribution display histogram is displayed for the entire scene being shot, as in FIG. 24B of Embodiment 40, the histogram of the background 4104 is also displayed at the same time. However, the histogram of the background 4104 is not necessary for adjusting the foreground threshold and the background threshold, and it is easier to recognize the relationship between the subject and the thresholds when that histogram is hidden. Accordingly, in the present embodiment, the display threshold is set so that unnecessary histograms can be hidden. The display threshold is calculated from the background threshold and a display range offset value, and is constituted by a first display threshold having a negative value and a second display threshold having a positive value. The image processing apparatus 100 displays only the distance distribution display histogram that belongs to a range from the first display threshold to the second display threshold, and hides the histogram outside that range.

FIGS. 27, 28A, 28B, 29A, and 29B are flowcharts for generating a distance distribution display histogram from a distribution of distance information and outputting, to the display unit 114, an image in which the subject jumping out into the background region is emphasized. These flowcharts are executed when the user selects a mode in which the histogram is generated and the image is emphasized by operating the operation unit 113. Each process in these flowcharts is realized by the CPU 102 loading a program stored in the ROM 103 into the RAM 104 and executing that program.

Figure 27:
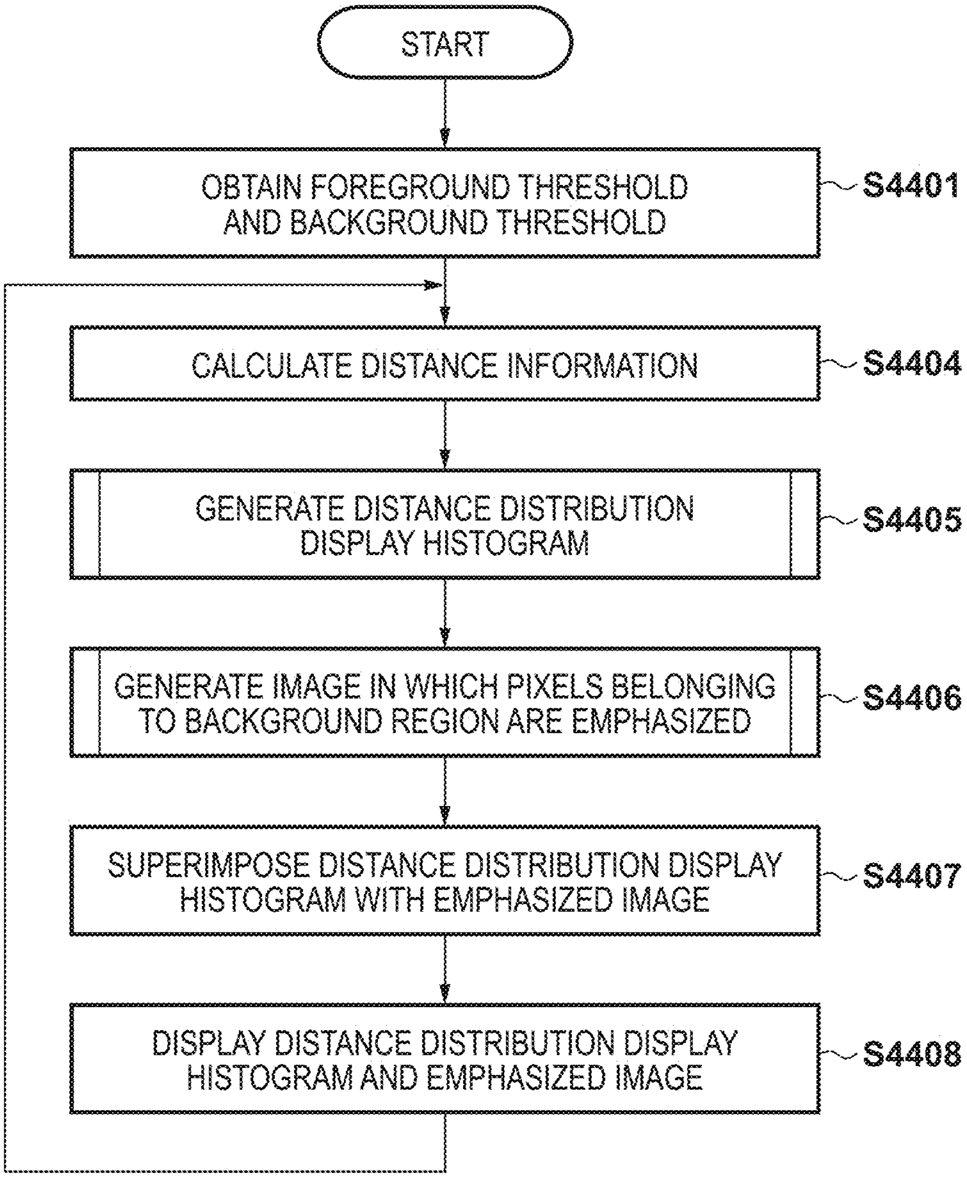
FIG. 27 is a flowchart illustrating overall processing according to Embodiment 41.

In FIG. 27, the processing of step S4401 and step S4404 is the same as step S4001 and step S4004 in Embodiment 40, and will therefore not be described. In step S4405, the CPU 102 generates a distance distribution display histogram based on the distance information obtained in step S4404.

Figure 28A:
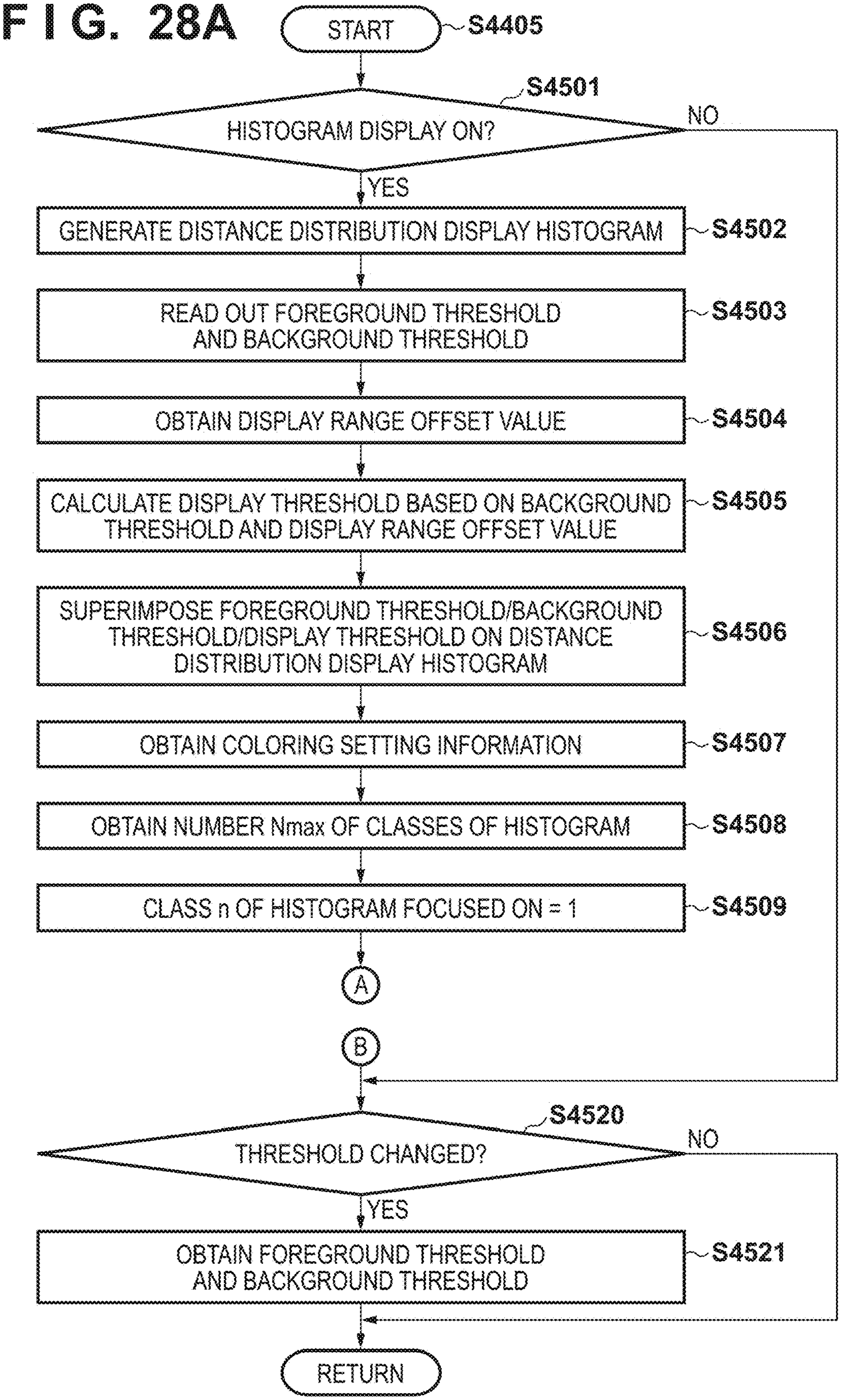
FIG. 28A is a flowchart illustrating details of the processing of step S4405 according to Embodiment 41.
Figure 28B:
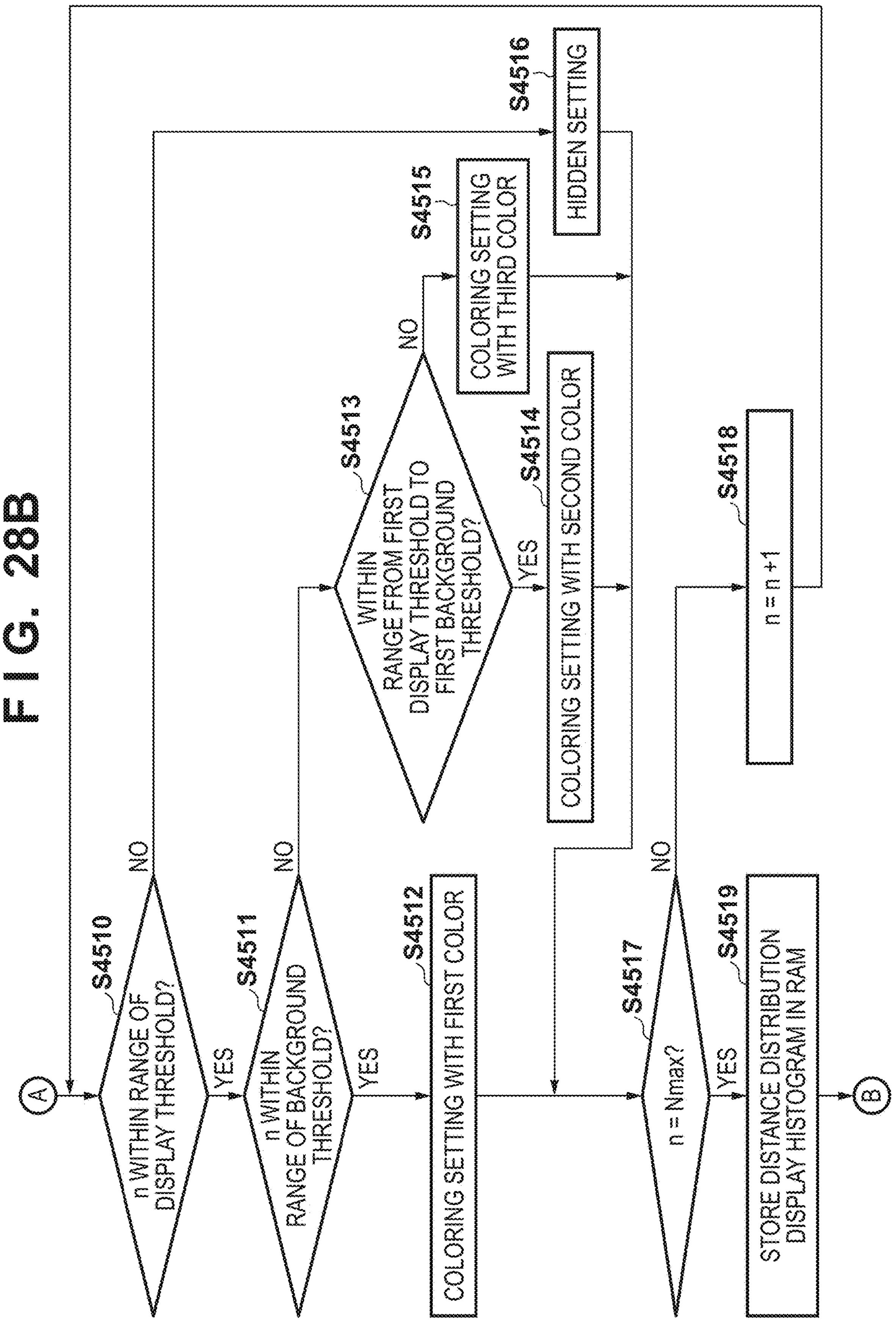
FIG. 28B is a flowchart illustrating details of the processing of step S4405 according to Embodiment 41.

FIGS. 28A and 28B are flowcharts illustrating the details of the processing of step S4405. In step S4501, the CPU 102 determines whether a display setting for the distance distribution display histogram is on or off. The display setting of the distance distribution display histogram is set by the user by operating the menu using the operation unit 113. If on, the processing moves to step S4502, whereas if off, the processing moves to step S4520.

The processing of step S4502 and step S4503 is the same as step S4006 and step S4007 in Embodiment 40, and will therefore not be described. In step S4504, the CPU 102 obtains the display range offset value stored in the ROM 103 in advance. Note that the storage location of the display range offset values is not limited to the ROM 103, and may instead be the recording medium 112 or the like. The user may also be able to change the display range offset value as desired. For example, the user selects the display range offset value by operating the menu using the operation unit 113, and the CPU 102 obtains the display range offset value from the operation unit 113.

In step S4505, the CPU 102 calculates the display threshold based on the background threshold read out in step S4503 and the display range offset value obtained in step S4504. A specific method for calculating the display threshold will be described with reference to FIG. 26B. First, the CPU 102 takes the result of subtracting a display range offset value 4308 from the vertical dotted line 4105 (the first background threshold) as the first display threshold (a vertical dotted line 4303). Next, the CPU 102 takes the result of adding a display range offset value 4309 to the vertical dotted line 4108 (the second background threshold) as the second display threshold (a vertical dotted line 4304). The two display threshold are determined as a result. Note that the calculation of the display threshold is not limited to the addition and subtraction of the display range offset values, and another calculation method may be used as long as the relationship in which the second display threshold is greater than the first display threshold is maintained within the range of the distance information. Additionally, for the display range offset values, the offset value used to calculate the first display threshold and the offset value used to calculate the second display threshold may be the same value, or may be different values.

In step S4506, the CPU 102 superimposes the foreground threshold and the background threshold read out in step S4503, as well as the display threshold calculated in step S4505, on the distance distribution display histogram generated in step S4502. The method of superimposing the foreground threshold and the background threshold on the distance distribution display histogram is the same as in step S4008 of Embodiment 40, and will therefore not be described. A method for superimposing the display threshold on the distance distribution display histogram will be described with reference to FIG. 26B. In the horizontal axis of the distance distribution display histogram 4302, the CPU 102 superimposes the vertical dotted line 4303 at a position that matches the first display threshold and the vertical dotted line 4304 at a position that matches the second display threshold. The method of superimposing the display threshold on the distance distribution display histogram is not limited thereto, and another method may be used as long as the position of the display threshold can be recognized. For example, the background of the distance distribution display histogram belonging to the range of the display threshold may be colored, or a single pattern such as a striped pattern or a lattice pattern may be superimposed.

In step S4507, the CPU 102 obtains coloring setting information stored in the ROM 103 in advance. The coloring setting information is information of colors specifying each region in order to color the distance distribution display histogram and the image such that the regions to which those items belong can be distinguished. In the present embodiment, an item is colored with a first color if the item belongs to the foreground region and the unknown region. The background region is colored with a second color if the distance information is negative, and with a third color if the distance information is positive. Note that the storage location of the coloring setting information is not limited to the ROM 103, and may instead be the recording medium 112 or the like. The user may also be able to change the coloring setting information as desired. For example, the user specifies the first color, the second color, and the third color by operating a menu using the operation unit 113, and the CPU 102 obtains the coloring setting information from the operation unit 113.

In step S4508, the CPU 102 obtains a number of classes in the distance distribution display histogram. The obtained number of classes is stored in the RAM 104 as a variable Nmax. For example, if the number of classes in the distance distribution display histogram is 256, then the variable Nmax is 256.

In step S4509, the CPU 102 focuses on the class, among the classes in the distance distribution display histogram, that has the shortest distance information. Specifically, the class in the distance distribution display histogram that is focused on is set as a variable n; n is then set to 1 and stored in the RAM 104. A higher variable n corresponds to a histogram in a class of a distance further away from the image processing apparatus.

In step S4510, the CPU 102 determines whether the variable n is within a range from the first display threshold to the second display threshold. If the variable n is within the range of the display thresholds, the processing moves to step S4511, whereas if the variable n is not within the range, the processing moves to step S4516.

In step S4511, the CPU 102 determines whether the variable n is within a range from the first background threshold to the second background threshold. If the variable n is within the range from the first background threshold to the second background threshold, the processing moves to step S4512, whereas if the variable n is not within the range from the first background threshold to the second background threshold, the processing moves to step S4513.

In step S4512, the CPU 102 sets the histogram of the class of the variable n to be colored using the first color.

In step S4513, the CPU 102 determines whether the variable n is within a range from the first display threshold to the first background threshold. If the variable n is within the range from the first display threshold to the first background threshold, the processing moves to step S4514, whereas if the variable n is not within the range of the first display threshold to the first background threshold, the processing moves to step S4515.

In step S4514, the CPU 102 sets the histogram of the class of the variable n to be colored using the second color.

In step S4515, the CPU 102 sets the histogram of the class of the variable n to be colored using the third color.

In step S4516, the CPU 102 sets the histogram of the class of the variable n to be hidden.

In step S4517, the CPU 102 determines whether the variable n is equal to the number of classes Nmax of the histogram. If these items are equal, the processing moves to step S4517, whereas if these items are not equal, the processing moves to step S4518.

In step S4518, the CPU 102 substitutes n+1 for the variable n and stores the result in the RAM 104. Through this, the CPU 102 raises the histogram being focused on by one class.

In step S4519, the CPU 102 stores the distance distribution display histogram subjected to the coloring settings in the RAM 104.

The processing of step S4520 and step S4521 is the same as step S4012 and step S4013 in Embodiment 40, and will therefore not be described. If a determination of "no" is made in step S4520, the processing moves to step S4406 of FIG. 27.

As described above, by executing the processing in the flowcharts in FIGS. 28A and 28B, the CPU 102 can generate a distance distribution display histogram that emphasizes distributions outside the range of the background threshold Refer again to FIG. 27. In step S4406, based on the distance information obtained in step S4404, the CPU 102 generates an image by adding emphasis to the image obtained by the image processing unit 105.

Figure 29A:
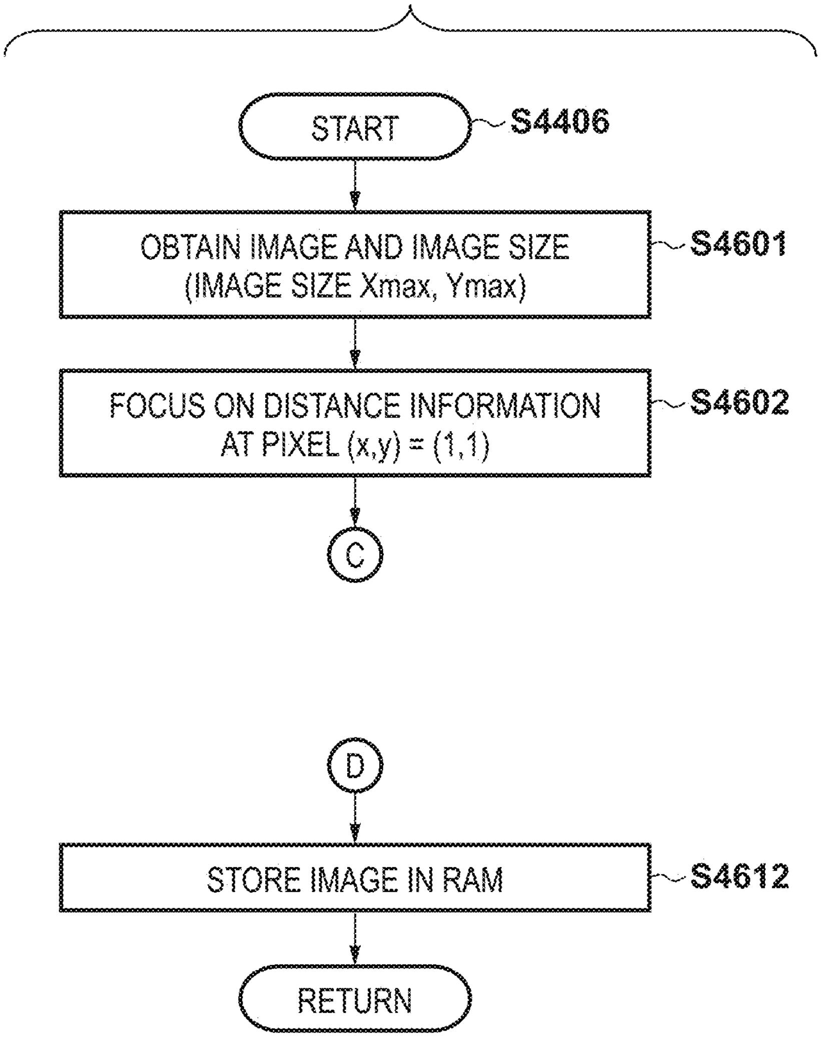
FIG. 29A is a flowchart illustrating details of the processing of step S4406 according to Embodiment 41.
Figure 29B:
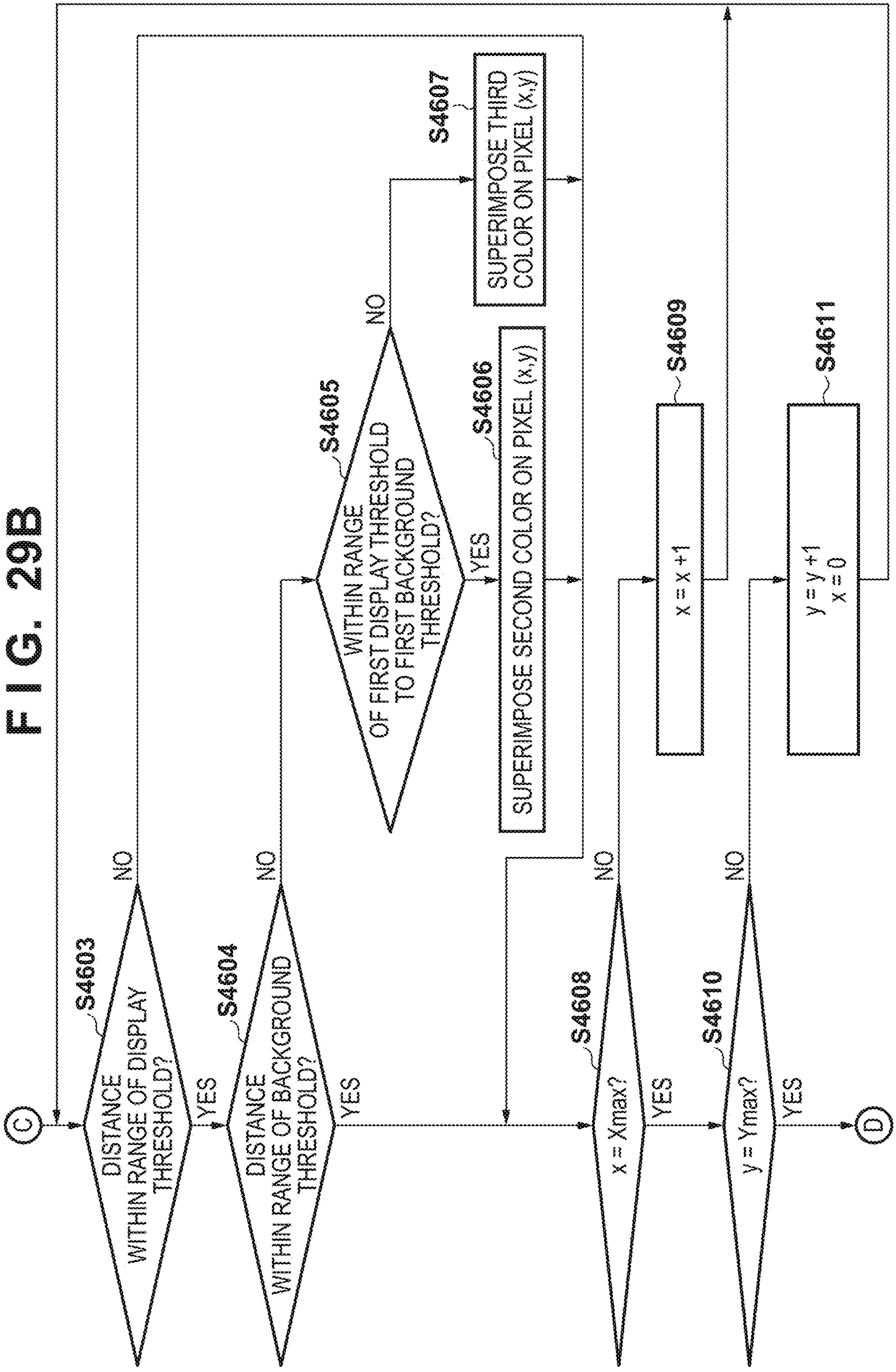
FIG. 29B is a flowchart illustrating details of the processing of step S4406 according to Embodiment 41.

FIGS. 29A and 29B are flowcharts illustrating the details of the processing of step S4406. In step S4601, the CPU 102 obtains the image and image size information from the image processing unit 105. Of the image size, the CPU 102 saves the horizontal size as Xmax and the vertical size as Ymax in the RAM 104.

In step S4602, of the distance information calculated in step S4404, the CPU 102 focuses on the distance information corresponding to a pixel (x,y). Note that the variable x represents a coordinate on the horizontal axis of the image, and the variable y represents a coordinate on the vertical axis of the image.

In step S4603, the CPU 102 determines whether the distance information of the pixel (x,y) being focused on in step S4602 is within the range from the first display threshold to the second display threshold. If the information is within the range of the display thresholds, the processing moves to step S4604, whereas if the information is not within the range, the processing moves to step S4608.

In step S4604, the CPU 102 determines whether the distance information of the pixel (x,y) being focused on in step S4602 is within the range from the first background threshold to the second background threshold. If the information is within the range of the background thresholds, the processing moves to step S4608, whereas if the information is not within the range, the processing moves to step S4605.

In step S4605, the CPU 102 determines whether the distance information of the pixel (x,y) being focused on in step S4602 is within the range from the first display threshold to the first background threshold. If the information is within the range from the first display threshold to the first background threshold, the processing moves to step S4606, whereas if the information is not within the range, the processing moves to step S4607.

In step S4606, the CPU 102 sets the pixel (x,y) of the image obtained in step S4601 such that the second color obtained in step S4507 is superimposed.

In step S4607, the CPU 102 sets the pixel (x,y) of the image obtained in step S4601 such that the third color obtained in step S4507 is superimposed.

In step S4608, the CPU 102 determines whether the variable x is equal to the horizontal size Xmax of the image. If these items are equal, the processing moves to step S4610, whereas if these items are not equal, the processing moves to step S4609.

In step S4609, the CPU 102 substitutes x+1 for the variable x and stores the result in the RAM 104. As a result, the CPU 102 focuses on the pixel one place to the right in the same line.

In step S4610, the CPU 102 determines whether the variable y is equal to the vertical size Ymax of the image. If these items are equal, the processing moves to step S4612, whereas if these items are not equal, the processing moves to step S4611.

In step S4611, 0 is substituted to the variable x and y+1 to the variable y, and the results are stored in the RAM 104. As a result, the CPU 102 focuses on the first pixel one line below.

In step S4612, the CPU 102 stores the image subjected to the processing illustrated in step S4603 to step S4611 to the RAM 104.

As described above, by executing the processing in the flowcharts in FIGS. 29A and 29B, the CPU 102 can generate an image in which the subject present outside the range of the background thresholds is emphasized.

Refer again to FIG. 27. In step S4407, the CPU 102 superimposes the distance distribution display histogram generated in step S4405 on the emphasized image generated in step S4406.

Figure 30:
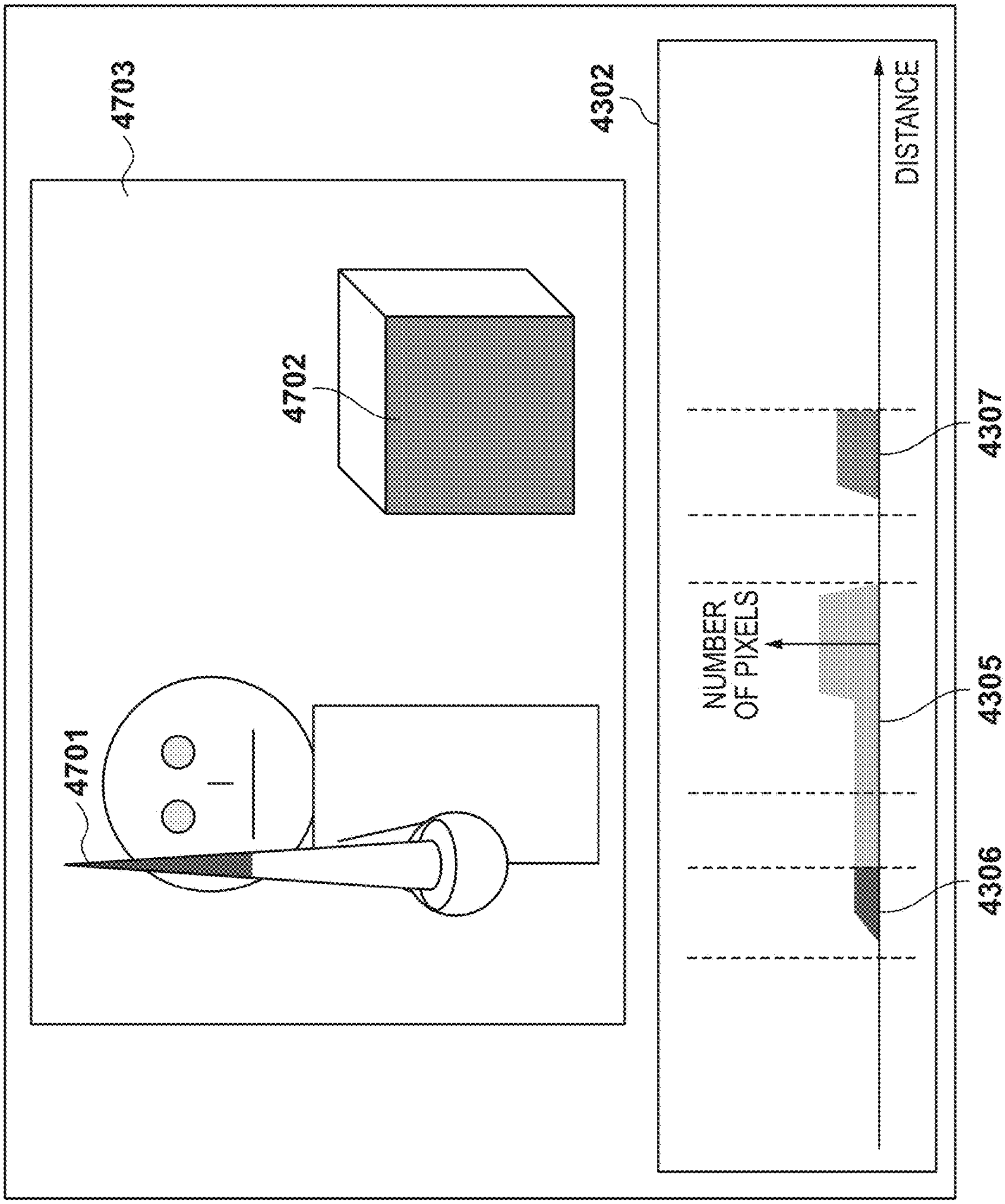
FIG. 30 is a diagram illustrating an example of the display of a distance distribution display histogram and an emphasized image according to Embodiment 41.

FIG. 30 illustrates an example of in which the distance distribution display histogram 4302 is superimposed on a lower part of an image 4703 processed by the image processing unit 105. A distribution 4305 of the distance distribution display histogram that is within the range from the first background threshold to the second background threshold is colored with the first color. A region 4701 of the image and a distribution 4306 of the distance distribution display histogram that are within the range from the first display threshold to the first background threshold are colored with the second color for emphasis. A region 4702 of the image and a distribution 4307 of the distance distribution display histogram that are within the range from the second background threshold to the second display threshold are colored with the third color for emphasis. Through this, the user can check the image and the distance distribution display histogram which, of the subject being shot, are outside the range of the background threshold, at the same time.

Furthermore, if the subject moves during shooting and a part of the subject jumps into the background threshold, the CPU 102 performs the same emphasis as the region 4701 and the region 4702 of the image and the distribution 4306 and the distribution 4307 of the distance distribution display histogram. This makes it possible to notify the user in real time that a part of the subject has jumped out, which makes it possible to prevent the need to re-shoot the image.

Note that when superimposing the image and the distance distribution display histogram, these items are not limited to being arranged vertically, and another superimposing method may be used as long as the image and the distance distribution display histogram can be checked at the same time. For example, the image and the distance distribution display histogram may be displayed side by side on the left and right, or the distance distribution display histogram may have transparency and be superimposed on part of the image.

In step S4408, the CPU 102 outputs the image generated in step S4407 to the display unit 114, and causes the image to be displayed.

As described above, according to the present embodiment, when the subject to be shot jumps out of the range of the background threshold, the user is notified by coloring the distance distribution display histogram and the image, which makes it possible to prevent re-shooting due to cropping failures.

Embodiment 42

Embodiment 40 described an example of generating a distance distribution display histogram from the distribution of distance information and displaying the histogram such that the positional relationship between the subject and the foreground and background thresholds can be easily recognized. The embodiment also described an example where by displaying the foreground threshold and the background threshold, the user can make adjustments while visually checking the ranges of the thresholds. In addition, Embodiment 41 described an example of adding emphasis to the distance distribution display histogram and the image and presenting these items to the user in order to prevent the subject to be shot from jumping out of the range of the background threshold and having to re-shoot due to a cropping failure.

Incidentally, it is unclear to the user which part of the image has distance information that is 0, and the user cannot fully grasp the relationship between the subject of the image and the distribution of the distance distribution display histogram.

Accordingly, Embodiment 42 will describe an example in which pixels having distance information of 0 are colored in an image and presented to the user along with the distance distribution display histogram.

According to the present embodiment, pixels for which the distance information is 0 can be clearly indicated, which makes it easier for the user to identify to which part of the subject being shot the distance distribution display histogram corresponds.

Figure 31A:
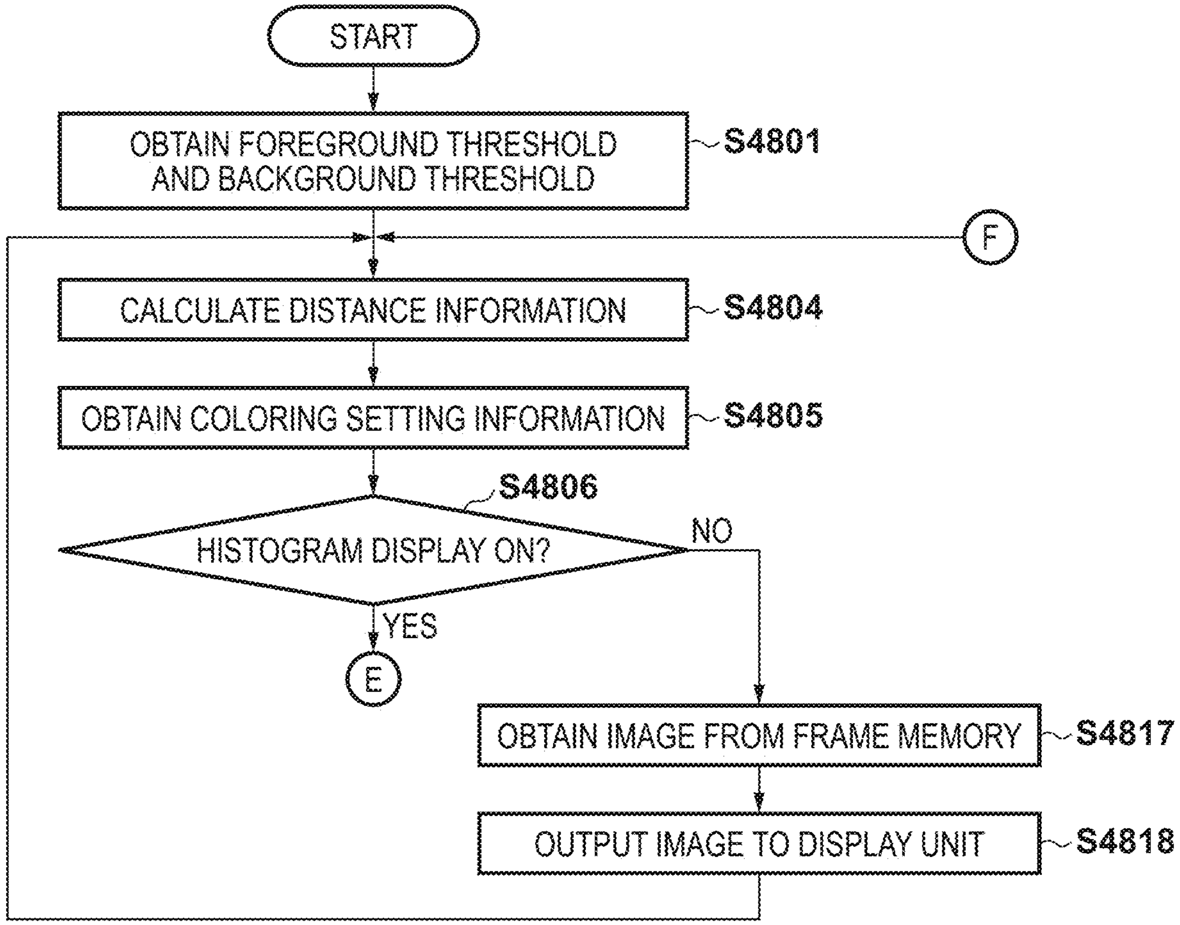
FIG. 31A is a flowchart illustrating processing for generating a distance distribution display histogram and displaying that histogram in the display unit 114, according to Embodiment 42.
Figure 31B:
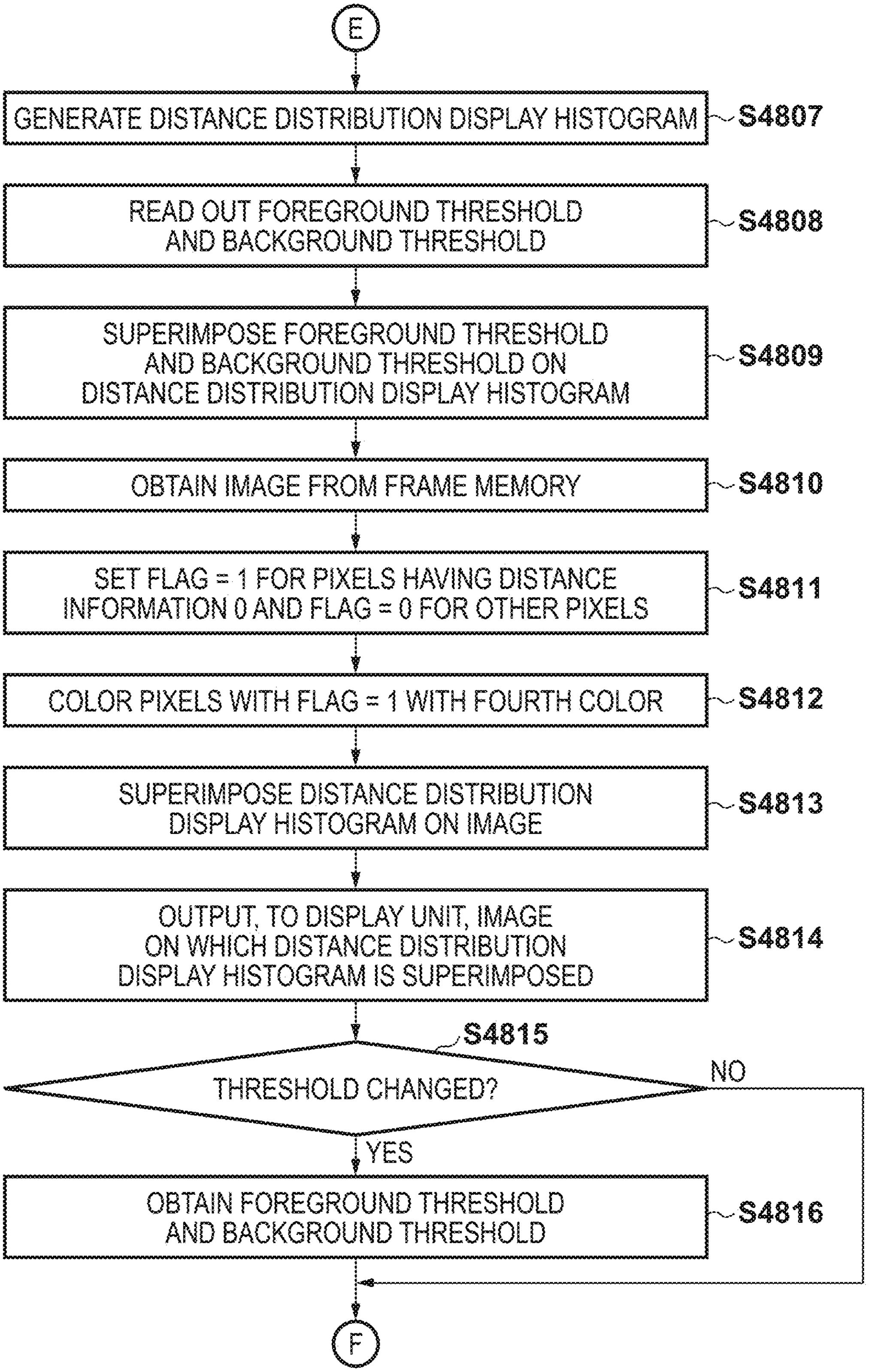
FIG. 31B is a flowchart illustrating processing for generating a distance distribution display histogram and displaying that histogram in the display unit 114, according to Embodiment 42.

FIGS. 31A and 31B are flowcharts for generating a distance distribution display histogram from the distribution of the distance information and displaying the histogram in the display unit 114. This flowchart is executed when the user selects a histogram generation mode by operating the operation unit 113. Each process in this flowchart is realized by the CPU 102 loading a program stored in the ROM 103 into the RAM 104 and executing that program.

The processing of step S4801 and step S4804 is the same as step S4001 and step S4004 in Embodiment 40, and will therefore not be described.

In step S4805, the CPU 102 obtains coloring setting information stored in the ROM 103 in advance. The coloring setting information has information of a fourth color with which the pixels having distance information of 0 are to be colored. Note that the storage location of the coloring setting information is not limited to the ROM 103, and may instead be the recording medium 112 or the like. The user may also be able to change the coloring setting information as desired. For example, the user specifies the fourth color by operating a menu using the operation unit 113, and the CPU 102 obtains the coloring setting information from the operation unit 113.

The processing of step S4806 to step S4809 is the same as step S4005 to step S4008 in Embodiment 40, and will therefore not be described.

In step S4810, the CPU 102 obtains an image from the frame memory 111. In step S4811, for the distance information obtained in step S4804, the CPU 102 sets a flag to 1 for pixels for which the distance information is 0, sets the flag to 0 for pixels for which the distance information is not 0, and stores the set flag in the frame memory 111.

In step S4812, the CPU 102 refers to the flag stored in the frame memory 111 in step S4811. For pixels having a flag of 1, the CPU 102 colors the corresponding pixels in the image obtained in step S4810 with the fourth color obtained in step S4805. For pixels having a flag of 0, the CPU 102 uses the pixels of the image obtained in step S4810 as-is. As a result, an image on which the fourth color is partially superimposed is generated.

In step S4813, the CPU 102 superimposes the distance distribution display histogram generated in step S4809 onto the image generated in step S4812.

Figure 32:
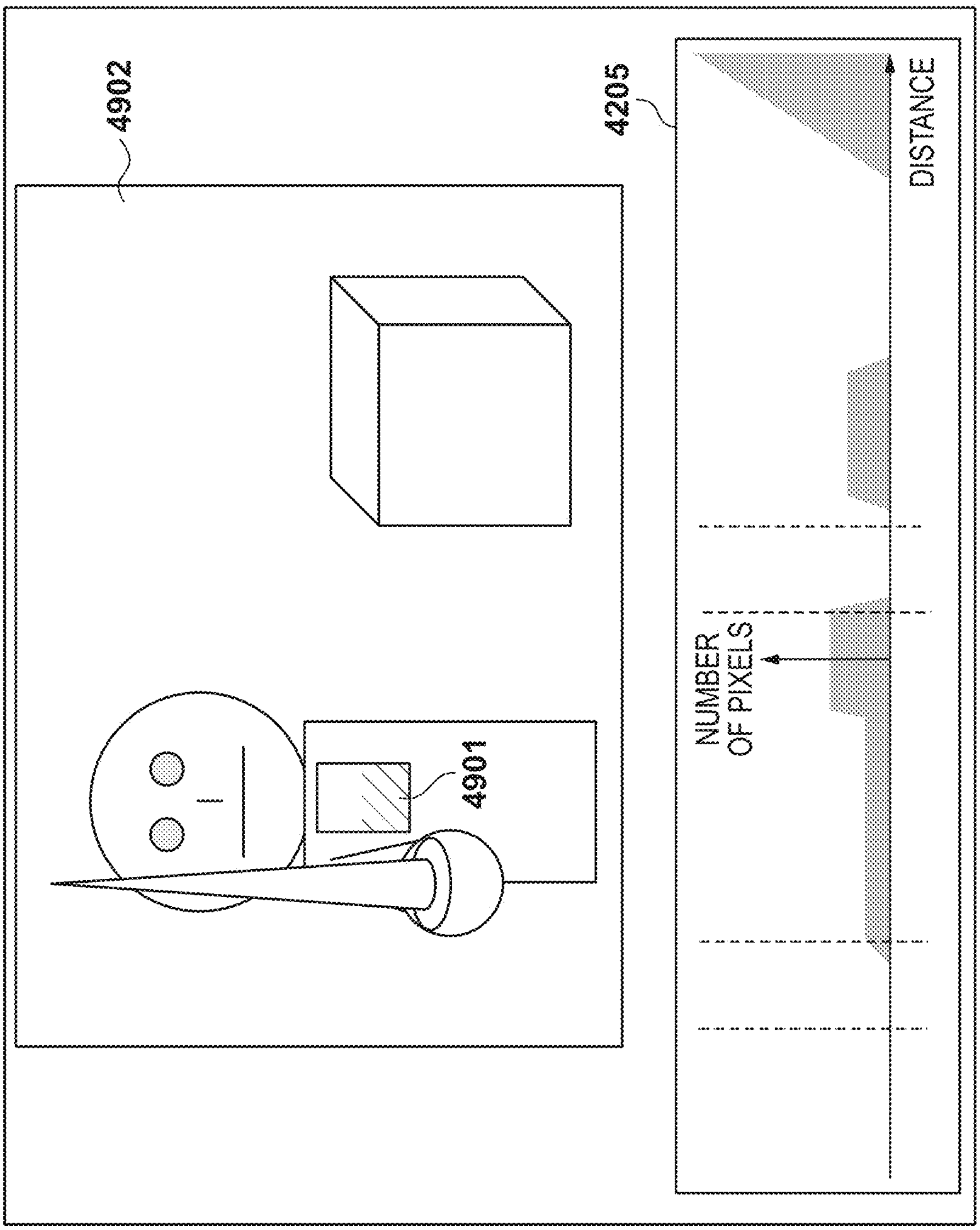
FIG. 32 is a diagram illustrating an example of the display of a distance distribution display histogram and a colored image according to Embodiment 42.

FIG. 32 is a diagram illustrating an example in which the distance distribution display histogram 4205 is superimposed on a lower part of an image 4902 processed in step S4812. Of the image 4902, the pixels corresponding to a part 4901 of the subject have distance information of 0, and are therefore colored using the fourth color through the processing of step S4812. This makes it possible for the user to confirm that the distance information of the part 4901 of the subject being shot is 0.

Note that when superimposing the image and the distance distribution display histogram, these items are not limited to being arranged vertically, and another superimposing method may be used as long as the image and the distance distribution display histogram can be checked at the same time. For example, the image and the distance distribution display histogram may be displayed side by side on the left and right, or the distance distribution display histogram may have transparency and be superimposed on part of the image.

In step S4814, the CPU 102 outputs the image generated in step S4813 to the display unit 114, and causes the image to be displayed.

The processing of step S4815 and step S4816 is the same as step S4012 and step S4013 in Embodiment 40, and will therefore not be described.

The processing of step S4817 and step S4818 is the same as step S4014 and step S4015 in Embodiment 40, and will therefore not be described. This makes it possible to display only the shot image in the display unit 114 when the distance distribution display histogram is set to be hidden.

As described above, according to the present embodiment, in an image of a subject, a subject region for which the distance information is 0 can be clearly indicated, to which part of the subject being shot the distance distribution display histogram corresponds can therefore be identified more easily.

Embodiment 50

As one embodiment, it is also possible to generate Trimap using parallax information, a defocus amount, and the like that can be calculated by CPU 102 based on the information obtained from the image plane phase detection sensor. There is an issue in that in actual shooting, it is not possible to check in real time whether the captured image and the foreground region in the Trimap match. The present embodiment will describe a configuration that addresses this issue by generating and outputting a bird's-eye view image from the distance information and clearly showing, in real time, an image serving as the foreground region.

The bird's-eye view image will be described with reference to FIGS. 34, 35A, and 35B. FIG. 35A illustrates an image obtained by the image processing apparatus 100. In FIG. 35A, the image processing apparatus 100 is assumed to be focused on a subject 5201. The image processing apparatus 100 calculates the distance information using the method described above.

Figure 35A:
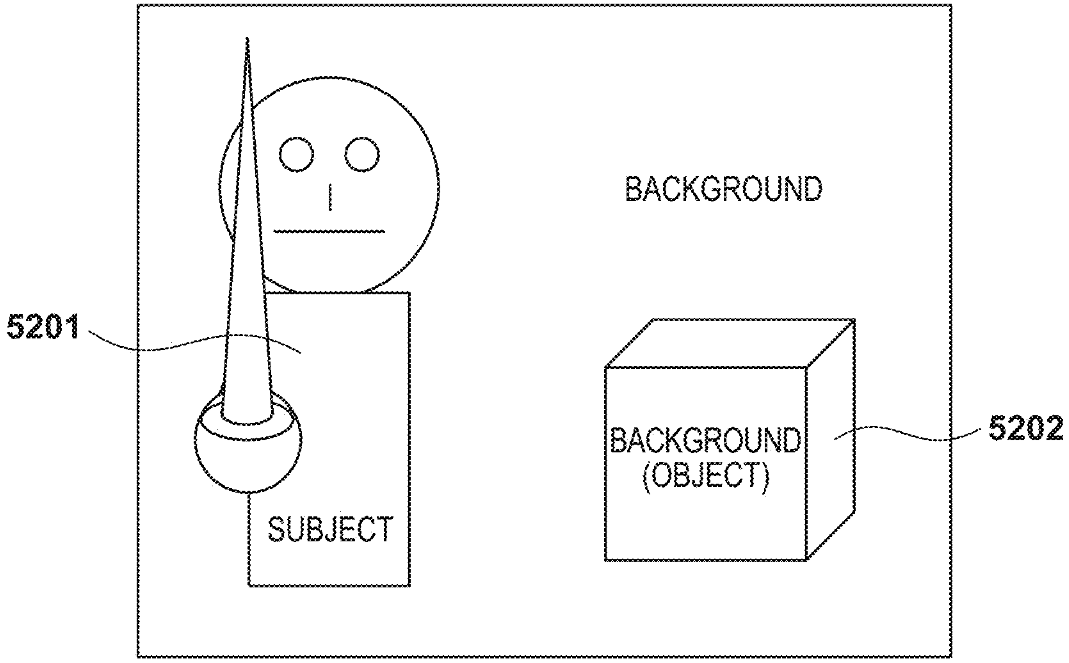
FIGS. 35A and 35B are descriptive diagrams illustrating display screens according to Embodiment 50.
Figure 35B:
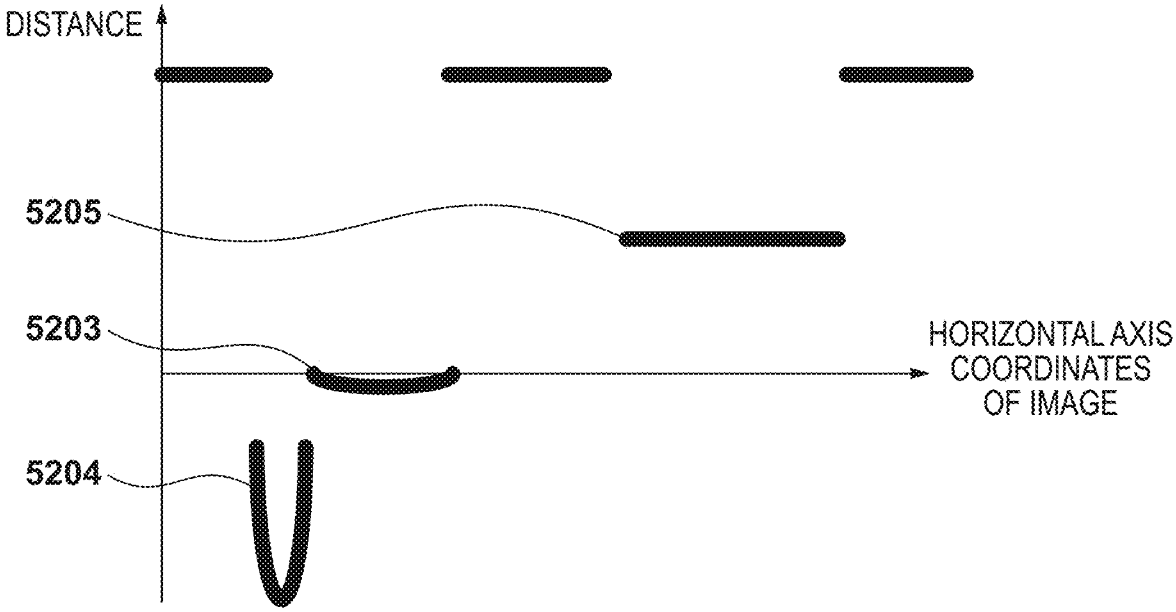

FIG. 35B is a bird's-eye view of the distribution of distance information for each pixel in the image, including a background 5202, with 0 for the distance information of the subject 5201 on which the image processing apparatus 100 is focusing in FIG. 35A. FIG. 35B is a graph in which the vertical axis represents the distance information obtained by the image processing apparatus 100 and the horizontal axis represents the coordinates of the image in the horizontal direction (horizontal coordinates), and is drawn by distributing the distance information in the image by dots or regions. FIG. 35B illustrates the content displayed in the display unit 114.

Figure 34:
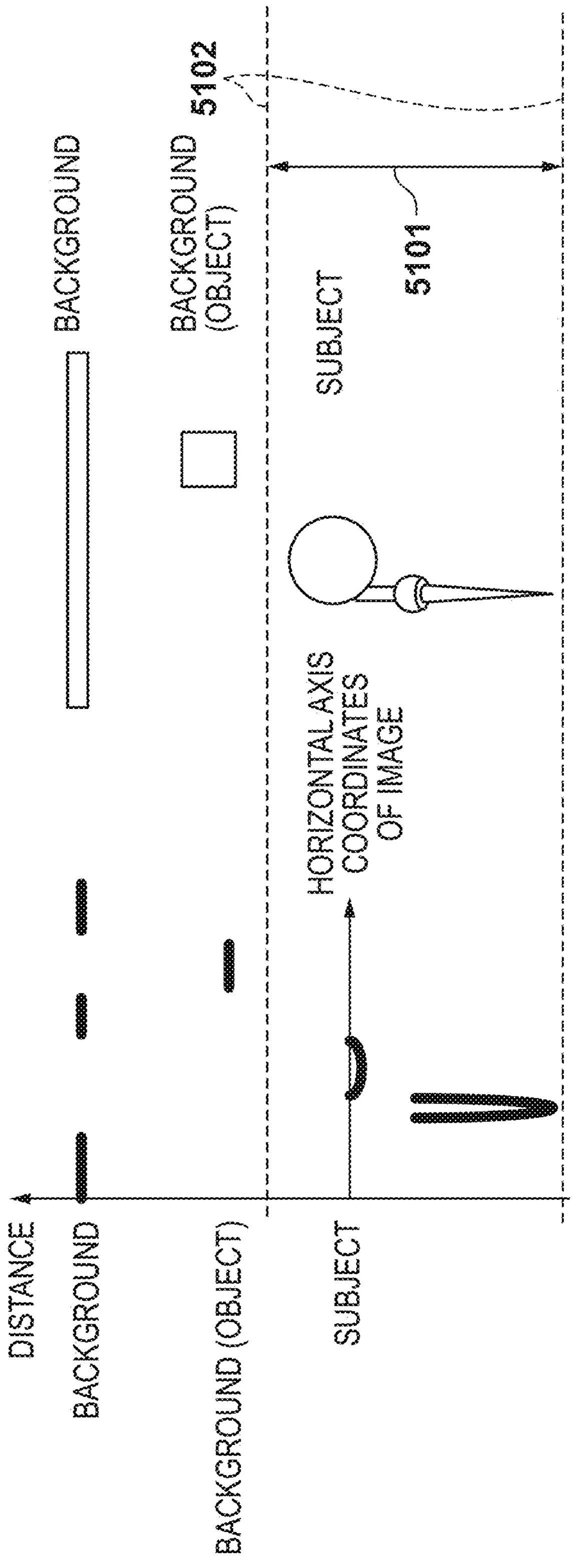
FIG. 34 is a descriptive diagram illustrating a relationship between an obtained image and a distance of an image subjected to superimposing processing in Embodiment 50.

FIG. 34 is a diagram illustrating a relationship between the subject in the image and the assumed distance of the background, assuming a bird's-eye view from above with respect to the image in FIG. 35A. A region 5101 is a range which the image processing apparatus 100 recognizes as the foreground region, and is determined by an upper limit and a lower limit of the distance information including the subject (the range of the foreground threshold). The region 5101 is displayed in the display unit 114, and is drawn with straight lines 5102 in the horizontal axis direction, representing the upper limit and the lower limit of the distance information. However, rather than using the straight lines 5102, this region can be drawn using a method that explicitly indicates that an item is within the range of the region 5101, e.g., by displaying the color of dots or regions corresponding to the distribution of the distance information within the region 5101 with a different color from the background. Although not illustrated in the drawing, FIG. 34 also displays the range of the background threshold.

Figure 33:
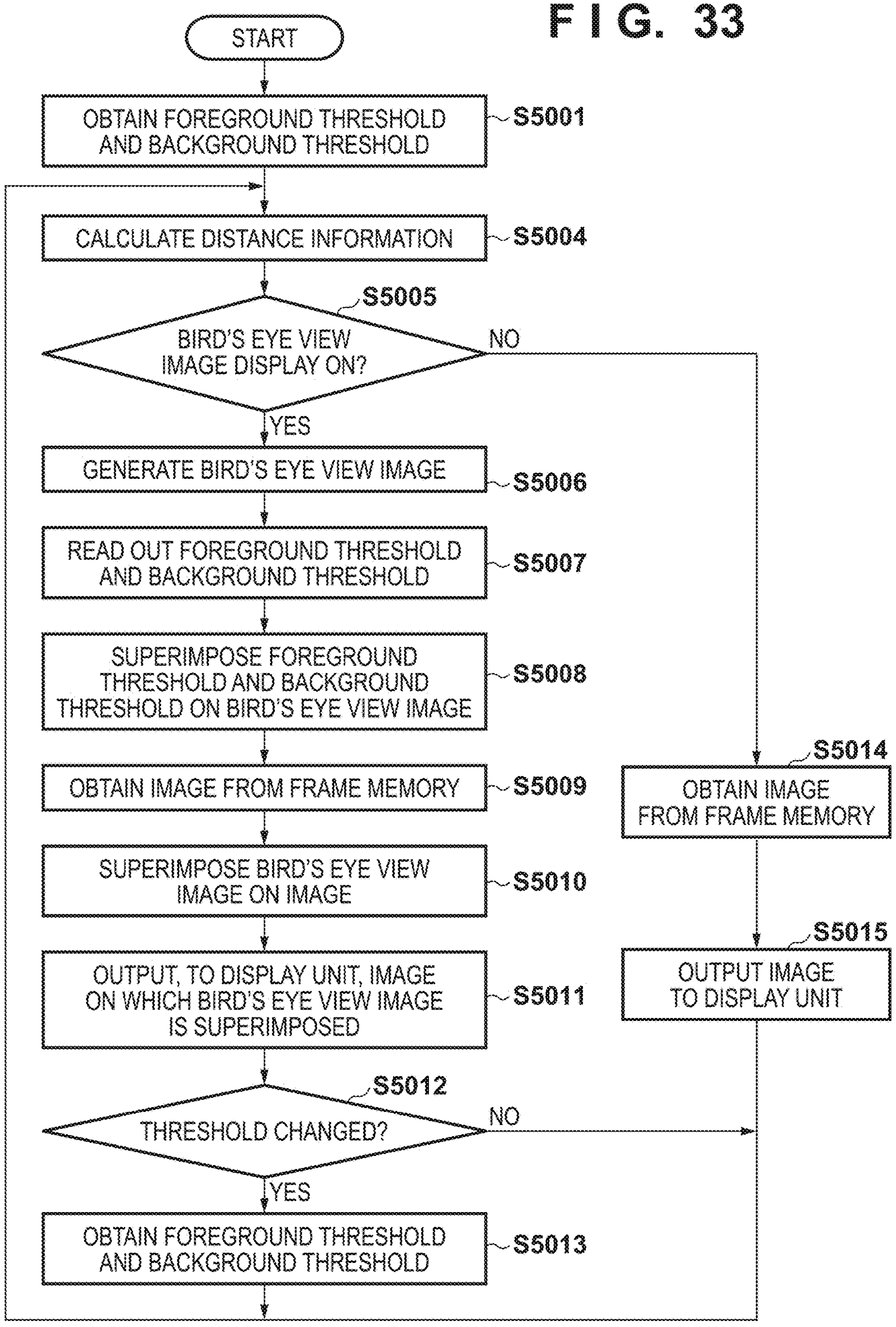
FIG. 33 is a flowchart illustrating processing for generating a bird's-eye view image and displaying that image in the display unit 114, according to Embodiment 50.

FIG. 33 is a flowchart illustrating processing for generating a bird's-eye view image from the distribution of the distance information and displaying the image in the display unit 114. Each process in this flowchart is realized by the CPU 102 loading a program stored in the ROM 103 into the RAM 104 and executing that program.

The processing of step S5001 and step S5004 is the same as step S4001 and step S4004 in Embodiment 40, and will therefore not be described.

In step S5005, the CPU 102 determines whether the display setting for the bird's-eye view image is on or off. The display setting of the bird's-eye view image is set by the user by operating the menu using the operation unit 113. If the setting is on, the processing moves to step S5006, whereas if the setting is off, the processing moves to step S5014.

In step S5006, the CPU 102 generates a bird's-eye view image such as that illustrated in FIG. 35B based on the distance information obtained in step S5004.

The processing of step S5007 is the same as step S4007 in Embodiment 40, and will therefore not be described.

In step S5008, the CPU 102 superimposes the foreground threshold and the background threshold on the bird's-eye view image.

The processing of step S5009 is the same as step S4009 in Embodiment 40, and will therefore not be described.

In step S5010, the CPU 102 combines the two images, i.e., the bird's-eye view image generated in step S5008 and the image obtained in step S5009, into a parallel or superimposed image. In step S5011, the CPU 102 outputs the image generated in step S5010 to the display unit 114.

The processing of step S5012 and step S5013 is the same as step S4012 and step S4013 in Embodiment 40, and will therefore not be described.

The processing of step S5014 and step S5015 is the same as step S4014 and step S4015 in Embodiment 40, and will therefore not be described.

As described above, according to the present embodiment, the image that will be the foreground region can be clearly indicated in real time by generating and outputting a bird's-eye view image from the distance information.

Embodiment 51

As described in Embodiment 50, the image that will be the foreground region can be clearly indicated in real time by generating and outputting a bird's-eye view image from the distance information.

On the other hand, with the method described in Embodiment 50, there is an issue in that it is difficult to check in real time whether the subject itself is outside a region of image separation when the subject requires a deep depth of field. The present embodiment will describe a method expected to provide an effect of making it easier to understand parts that are outside the stated region of image separation.

The present embodiment provides a configuration which performs processing on the captured image and the bird's-eye view image described in Embodiment 50, which is expected to provide the stated effect of making the parts easier to understand.

Figure 36A:
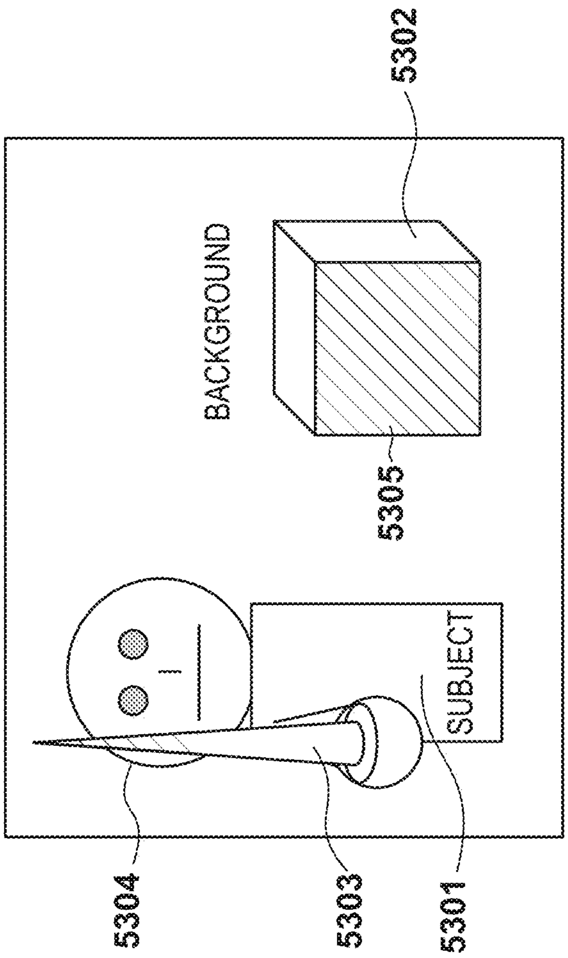
FIGS. 36A and 36B are descriptive diagrams illustrating display screens according to Embodiment 51.
Figure 36B:
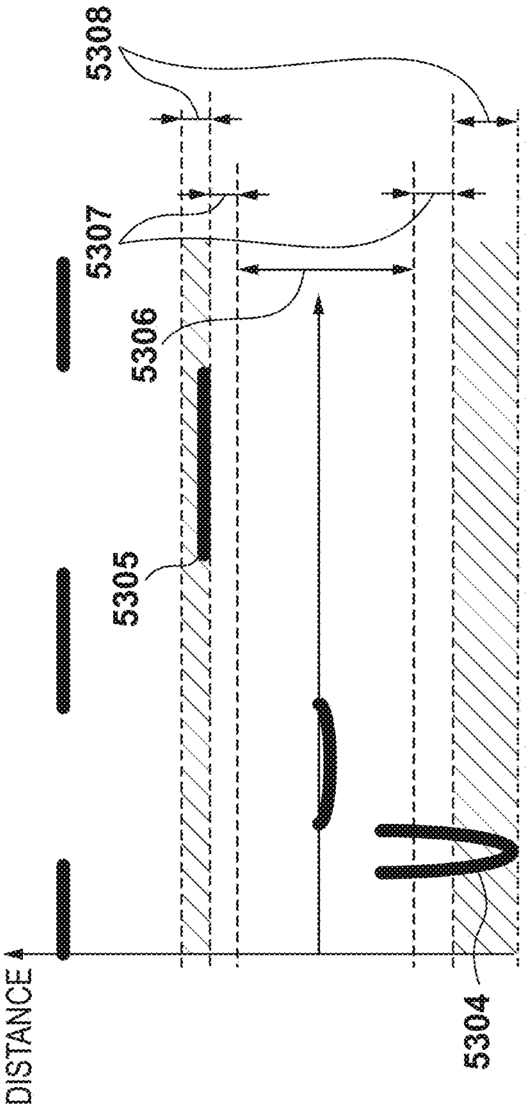

FIG. 36A illustrates an image obtained by the image processing apparatus 100, and FIG. 36B illustrates a bird's-eye view image generated by the process described in Embodiment 50 with reference to FIG. 33. A subject 5301 in FIG. 36A is present within the same image as a background 5302. The background 5302 is assumed to have a different relative distance from the subject 5301, which has a relative distance of zero, and is at a distance to be recognized as the background region when generating the Trimap.

A region 5306 in FIG. 36B represents a range between thresholds of distance information to be recognized as the foreground region when generating the Trimap, and is determined based on the foreground threshold. A region 5308 in FIG. 36B represents a range between thresholds of distance information to be recognized as the background region when generating the Trimap, and is determined based on the background threshold. A region 5307 in FIG. 36B represents a range between thresholds of distance information to be recognized as the unknown region when generating the Trimap, and is determined based on the foreground threshold and the background threshold.

The subject 5301 in FIG. 36A is holding a stick-shaped implement 5303. Assume that the image processing apparatus 100 obtains an image in this state. A region 5304 at the tip part of the implement 5303 is assumed to be distanced by a relative distance from the subject 5301, which is in focus, and the distance information of the region 5304 is assumed to be in the range recognized as the background region in FIG. 36B.

In the present embodiment, the CPU 102 performs processing of coloring a part where the implement 5303 overlaps with the region 5308 (i.e., the region 5304) with a predetermined color in each of the captured image and the bird's-eye view image. Additionally, in the present embodiment, the CPU 102 performs processing of coloring a part where the region 5308 and the background 5302 overlap (i.e., a region 5305) with a predetermined color in each of the captured image and the bird's-eye view image.

As described above, according to the present embodiment, it is possible to expect an effect in which parts outside the stated image separation area are made easy to understand.

Embodiment 52

As described in Embodiment 50 and Embodiment 51, the image that will be the foreground region can be clearly indicated in real time by generating and outputting a bird's-eye view image from the distance information. However, the method described in Embodiment 50 and Embodiment 51 has an issue in that it is difficult to check in real time whether the subject itself is in focus. The present embodiment will describe a method for checking, in an easy-to-understand manner, whether a region that is in focus, as mentioned above, is equivalent to the subject itself.

The present embodiment provides a configuration which performs processing on the captured image and the bird's-eye view image, which is expected to provide the stated effect of making the in-focus part easier to understand.

Figure 37A:
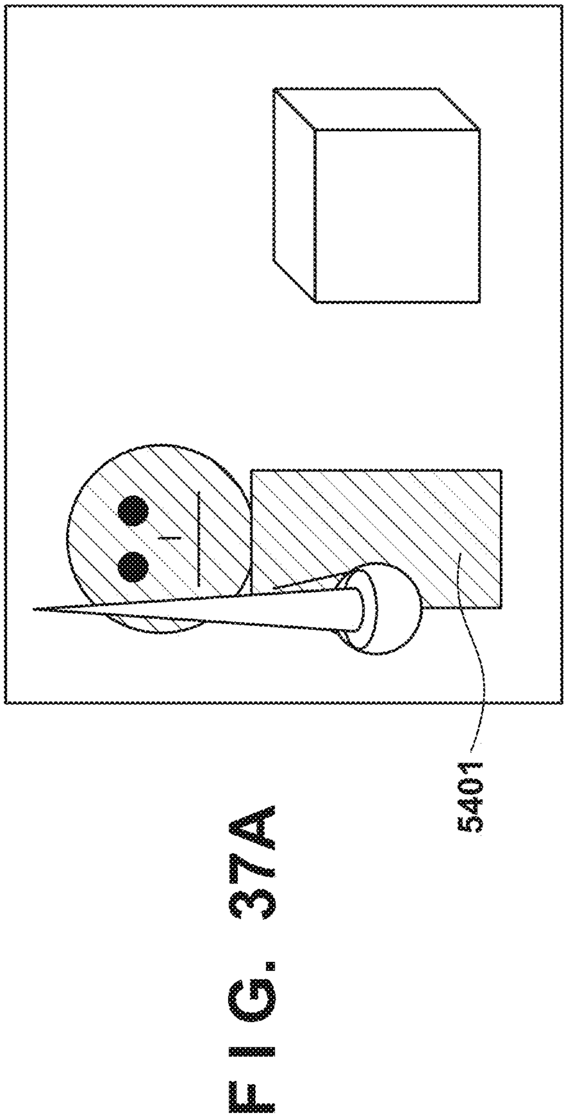
FIGS. 37A and 37B are descriptive diagrams illustrating display screens according to Embodiment 52.
Figure 37B:
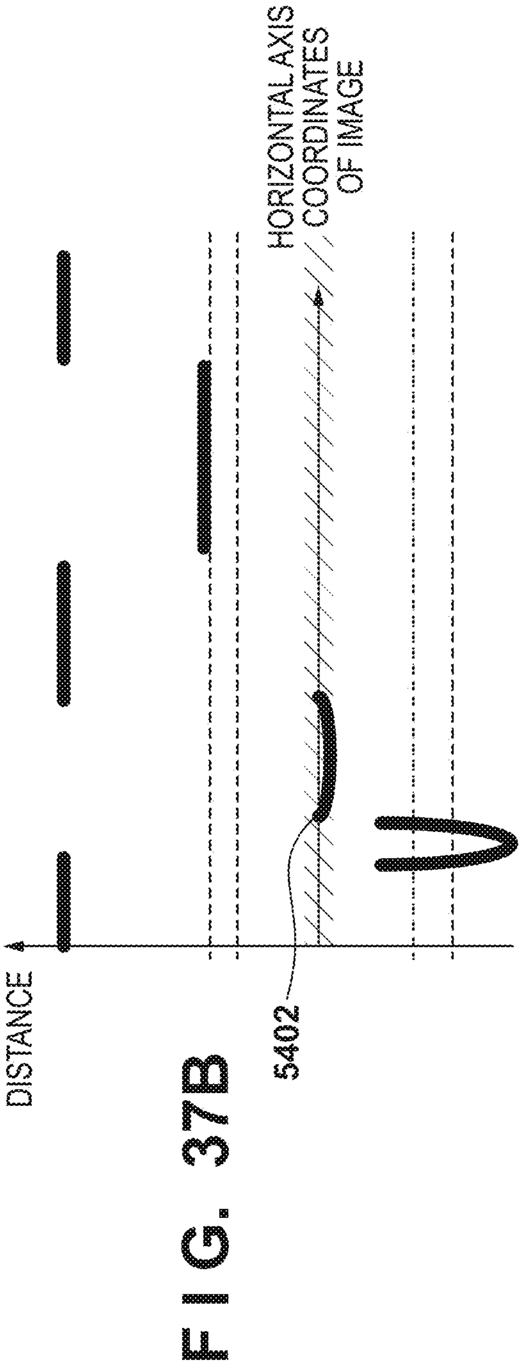

In the present embodiment, the CPU 102 performs processing of coloring the corresponding pixel in the image illustrated in FIG. 37A with a predetermined color, for the pixel corresponding to a region 5402 recognized as having a relative distance of 0, as illustrated in FIG. 37B.

The user can check whether the subject itself is in focus in the image obtained by the image processing apparatus 100 by viewing both a region 5401 and the subject in the image in FIG. 37A.

As described above, according to the present embodiment, it is possible to check, in an easy-to-understand manner, whether the stated region that is in focus is equivalent to the subject itself.

Embodiment 60

Figure 38:
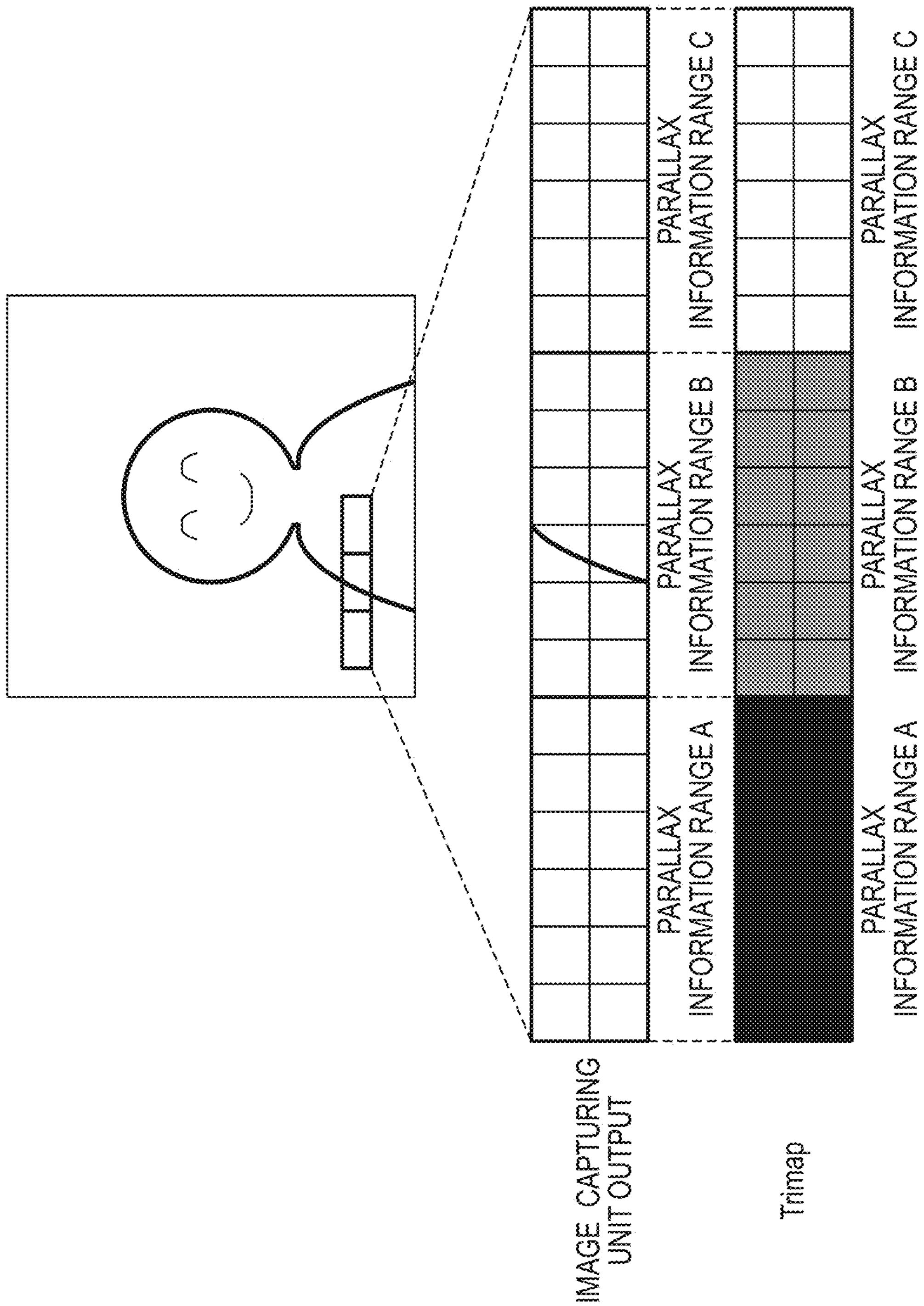
FIG. 38 is a descriptive diagram illustrating a parallax information range, pixels, and a Trimap according to Embodiment 60.

The image capturing unit 107 of the image processing apparatus 100 can transmit the parallax information of a plurality of pixel ranges of the image signal together, as illustrated in FIG. 38, to reduce the bandwidth of the internal bus 101 and the like. FIG. 38 is a diagram illustrating a part of the Trimap generated from a part of the output of the image capturing unit 107 and the parallax information output from the image capturing unit 107. The present embodiment will describe a case where the image capturing unit 107 transmits the parallax information for a range of 12 pixels of the image signal together.

In a parallax information range A illustrated in FIG. 38, all 12 pixels in the range are from capturing the background, and thus all 12 pixels are in the background region. In a parallax information range C, all 12 pixels in the range are from capturing the subject, and thus the Trimap is generated with all 12 pixels being in the foreground region. In a parallax information range B, the background, the subject, and the boundary between the background and the subject are each captured in the 12 pixels within the range, but because the parallax information is grouped together, the Trimap is generated with all 12 pixels being in the unknown region. As a result, the area occupied by the unknown region in the generated Trimap increases.

Embodiment 60 will describe an example of using an edge detection result of the image signal to reclassify the pixels in the unknown region into the foreground region, the background region, and the unknown region in finer units than the parallax information range, and generate a second Trimap in which the area of the unknown region is reduced.

Figure 39A:
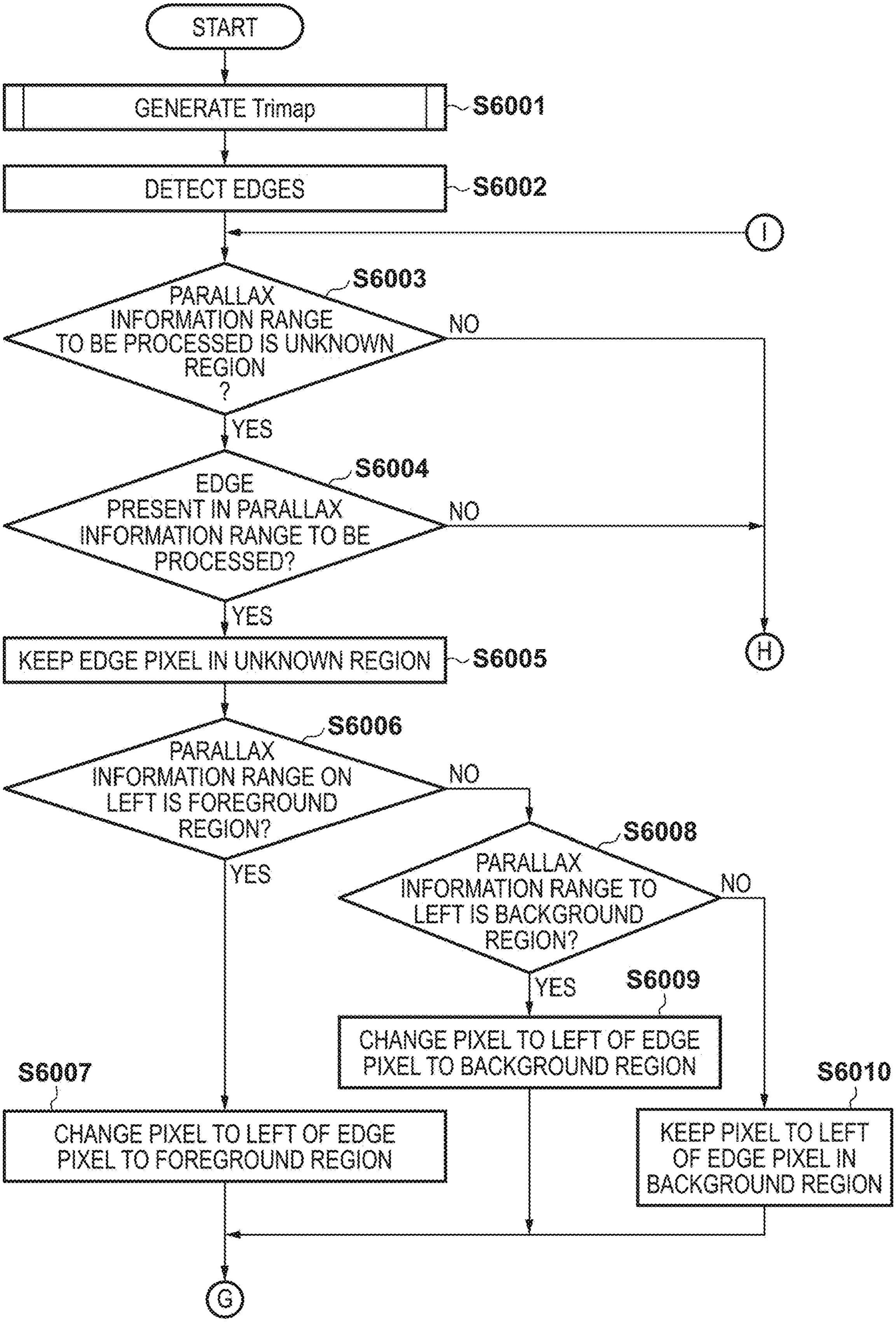
FIG. 39A is a flowchart illustrating second Trimap generation processing according to Embodiment 60.
Figure 39B:
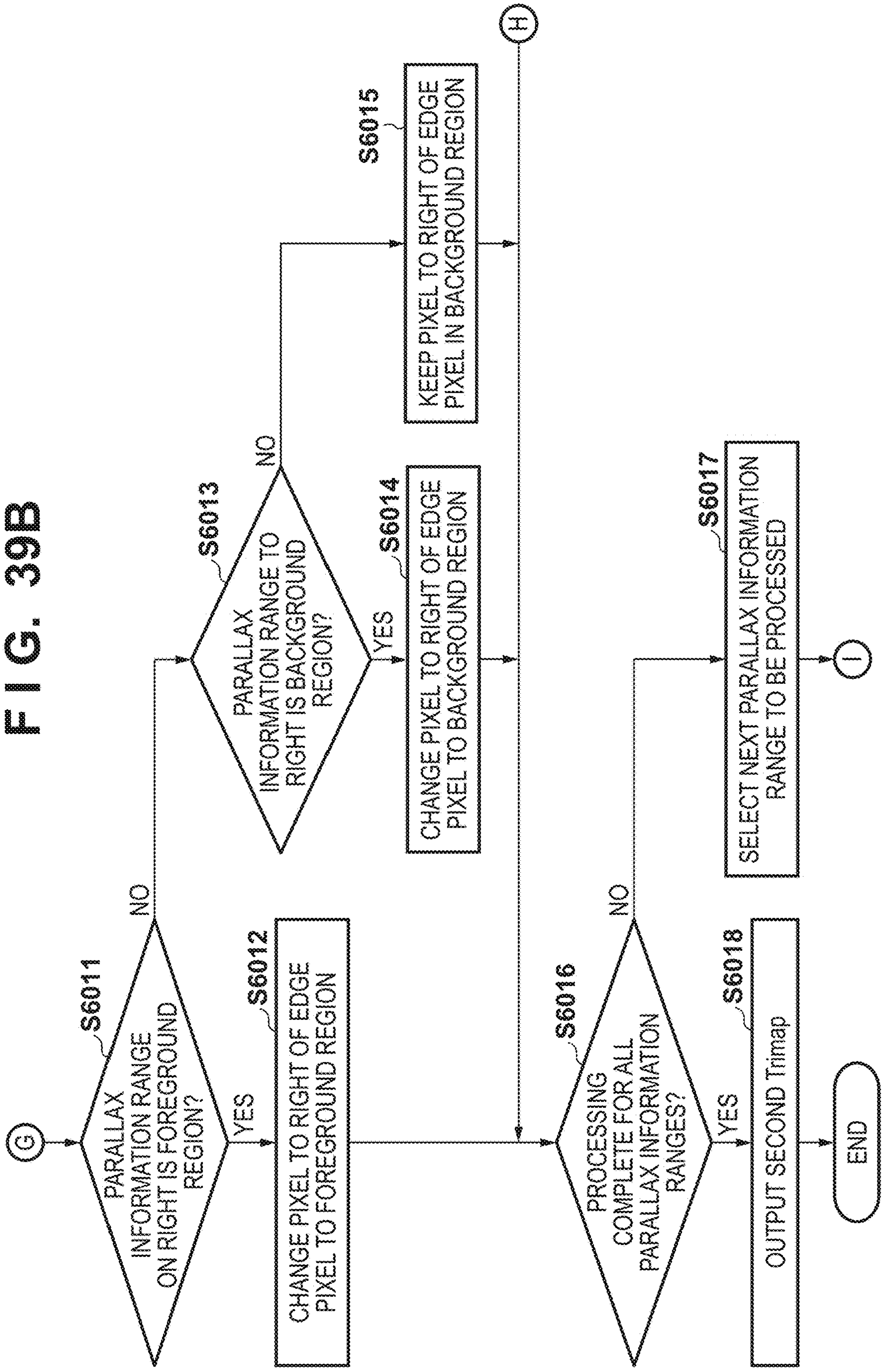
FIG. 39B is a flowchart illustrating the second Trimap generation processing according to Embodiment 60.

FIGS. 39A and 39B are flowcharts illustrating second Trimap generation processing according to Embodiment 60. Each process in this flowchart is realized by the CPU 102 loading a program recorded in the ROM 103 into the RAM 104 and executing that program.

In step S6001, the CPU 102 generates a first Trimap by performing the same processing as step S1003 to step S1008 described in Embodiment 10. The CPU 102 records the first Trimap into the frame memory 111.

In step S6002, the CPU 102 performs edge detection by causing the image processing unit 105 to process the image signal read out from the frame memory 111. The edge detection performed by the image processing unit 105, for example, detects positions where luminance changes, color changes, or the like in the image signal are discontinuous, and specifically, the edge detection is realized through the gradient method, the Laplacian method, or the like. The CPU 102 records the edge detection result processed by the image processing unit 105 in the frame memory 111. The image processing unit 105 outputs the edge detection result as a flag, for each pixel in the image signal, indicating whether the pixel corresponds to an edge.

In step S6003, the CPU 102 reads out the region, in the first Trimap, that corresponds to the parallax information range to be processed, from the frame memory 111, and determines whether the range is classified as an unknown region. If the parallax information range to be processed is classified as an unknown region, the processing moves to step S6004. However, if the parallax information range to be processed is not classified as an unknown region, the processing moves to step S6016.

In step S6004, the CPU 102 reads out the region, in the edge detection result, that corresponds to the parallax information range to be processed, from the frame memory 111, and determines whether there is a pixel corresponding to an edge within that range. If the parallax information range to be processed contains a pixel that corresponds to an edge, the processing moves to step S6005. However, if the parallax information range to be processed does not contain a pixel that corresponds to an edge, the processing moves to step S6016.

In step S6005, the CPU 102 keeps the pixel corresponding to the edge, in the region of the first Trimap corresponding to the parallax information range to be processed, as the unknown region.

In step S6006, the CPU 102 reads out the region, in the first Trimap, that corresponds to the parallax information range adjacent to the left of the parallax information range to be processed, from the frame memory 111, and determines whether that range is classified as a foreground region. If the parallax information range on the left is classified as a foreground region, the processing moves to step S6007. However, if the parallax information range on the left is not classified as a foreground region, the processing moves to step S6008.

In step S6007, the CPU 102 changes, to the foreground region, the pixel located to the left of the pixel corresponding to an edge in the region of the first Trimap corresponding to the parallax information range to be processed. The CPU 102 records the changed Trimap in the frame memory 111.

In step S6008, the CPU 102 reads out the region, in the first Trimap, that corresponds to the parallax information range adjacent to the left of the parallax information range to be processed, from the frame memory 111, and determines whether that range is classified as a background region. If the parallax information range on the left is classified as a background region, the processing moves to step S6009. However, if the parallax information range on the left is not classified as a background region, the processing moves to step S6010.

In step S6009, the CPU 102 changes, to the background region, the pixel located to the left of the pixel corresponding to an edge in the region of the first Trimap corresponding to the parallax information range to be processed. The CPU 102 records the changed Trimap in the frame memory 111.

In step S6010, the CPU 102 keeps the pixel located to the left of the pixel corresponding to the edge, in the region of the first Trimap corresponding to the parallax information range to be processed, as the unknown region.

In step S6011, the CPU 102 reads out the region, in the first Trimap, that corresponds to the parallax information range adjacent to the right of the parallax information range to be processed, from the frame memory 111, and determines whether that range is classified as a foreground region. If the parallax information range on the right is classified as a foreground region, the processing moves to step S6012. However, if the parallax information range on the right is not classified as a foreground region, the processing moves to step S6013.

In step S6012, the CPU 102 changes, to the foreground region, the pixel located to the right of the pixel corresponding to an edge in the region of the first Trimap corresponding to the parallax information range to be processed. The CPU 102 records the changed Trimap in the frame memory 111.

In step S6013, the CPU 102 reads out the region, in the first Trimap, that corresponds to the parallax information range adjacent to the right of the parallax information range to be processed, from the frame memory 111, and determines whether that range is classified as a background region. If the parallax information range on the right is classified as a background region, the processing moves to step S6014. However, if the parallax information range on the right is not classified as a background region, the processing moves to step S6015.

In step S6014, the CPU 102 changes, to the background region, the pixel located to the right of the pixel corresponding to an edge in the region of the first Trimap corresponding to the parallax information range to be processed. The CPU 102 records the changed Trimap in the frame memory 111.

In step S6015, the CPU 102 keeps the pixel located to the right of the pixel corresponding to the edge, in the region of the first Trimap corresponding to the parallax information range to be processed, as the unknown region.

In step S6016, the CPU 102 determines whether all of the parallax information ranges in the image signal recorded in the frame memory 111 have been processed. If all the parallax information ranges have been processed, the processing moves to step S6018. However, if not all the parallax information ranges have been processed, the processing moves to step S6017.

In step S6017, the CPU 102 selects an unprocessed parallax information range as the next range to be processed. For example, the parallax information range to be processed is selected in raster direction order from the upper-left. The processing then returns to step S6003.

In step S6018, the CPU 102 outputs the Trimap recorded in the frame memory 111 to the exterior through the image terminal 109 or the network terminal 108 as the second Trimap. Note that the CPU 102 may record the second Trimap into the recording medium 112.

Figure 40:
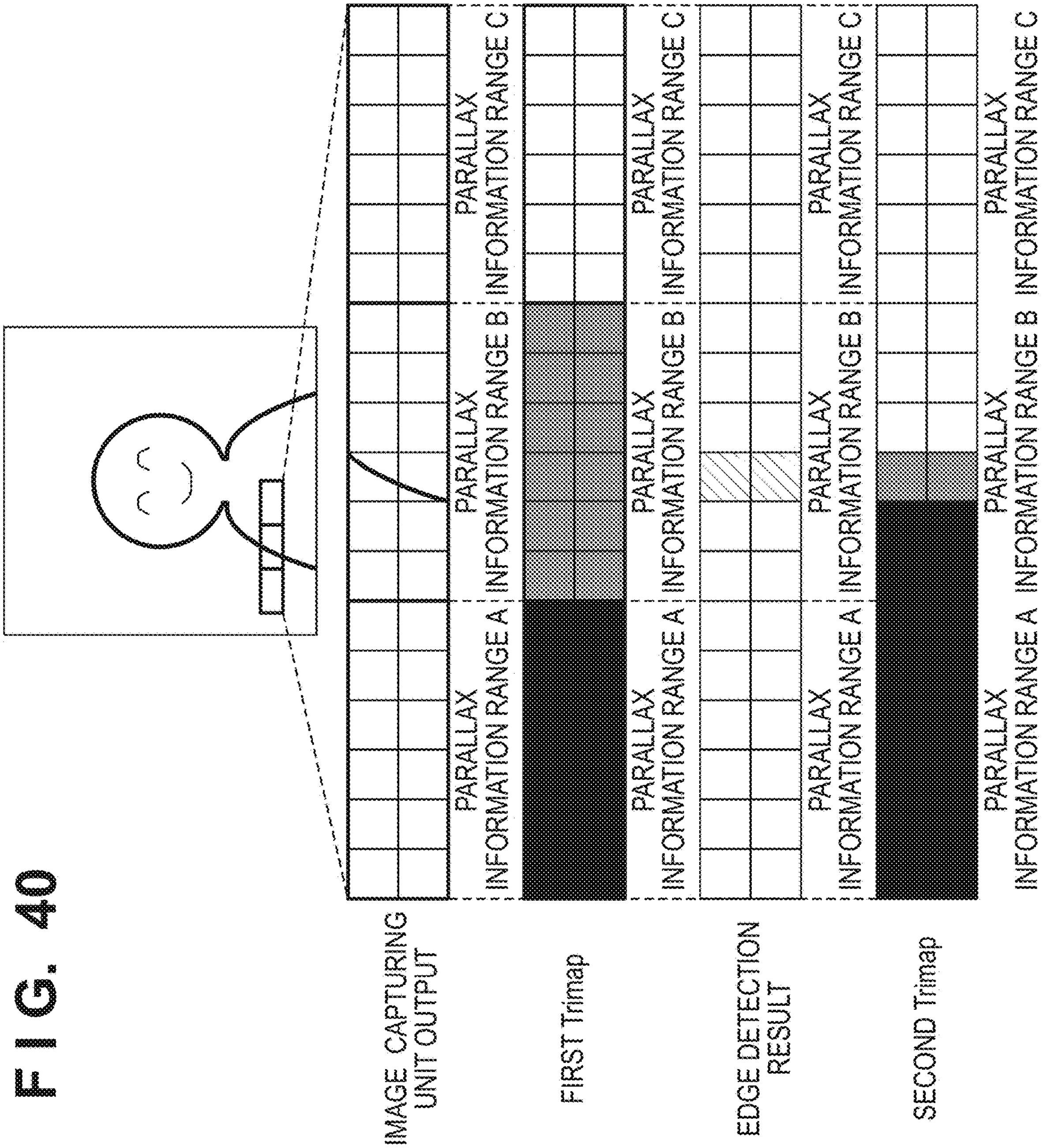
FIG. 40 is a descriptive diagram illustrating an edge detection result and a Trimap according to Embodiment 60.

FIG. 40 is a diagram illustrating a part of the output from the image capturing unit 107, a part of the first Trimap, a part of the edge detection result described in step S6002, and a part of the second Trimap obtained by the processing of step S6003 to step S6015. In FIG. 40, the output of the image capturing unit 107 and the first Trimap are the same as the output of the image capturing unit 107 and the Trimap in FIG. 38, and will therefore not be described. The pixel that corresponds to the boundary between the background and the subject is determined to correspond to an edge by the edge detection of step S6002, as indicated by the diagonal lines in the edge detection result in FIG. 40. The second Trimap is generated through the processing of step S6003 to step S6015. In FIG. 40, pixels corresponding to the edge of the parallax information range B are classified as the unknown region, pixels between the edge of the parallax information range B and the parallax information range A are classified as the background region, and pixels between the edge of the parallax information range B and the parallax information range C are classified as the foreground region.

As describe above, according to Embodiment 60, by using an edge detection result of the image signal, the pixels in the unknown region can be reclassified into the foreground region, the background region, and the unknown region in finer units than the parallax information range, and a second Trimap in which the area of the unknown region is reduced can be generated. By reducing the area of the unknown region of the Trimap, the detection accuracy of the neural network that uses the Trimap to crop out the foreground and background can be improved.

Embodiment 70

When a subject such as a human body is shot as far down as the feet, the ground surface near where the feet touch the ground is at about the same distance as the subject's feet, and thus when a Trimap is generated from the distance information, the ground surface will be erroneously determined to be the foreground region.

Embodiment 70 will describe an example in which by detecting a foot part of the subject, a second Trimap is generated in which the ground surface, which was erroneously determined to be a foreground region at the same relative distance as the foot part of the subject, is reclassified as an unknown region or a background region.

Figure 41:
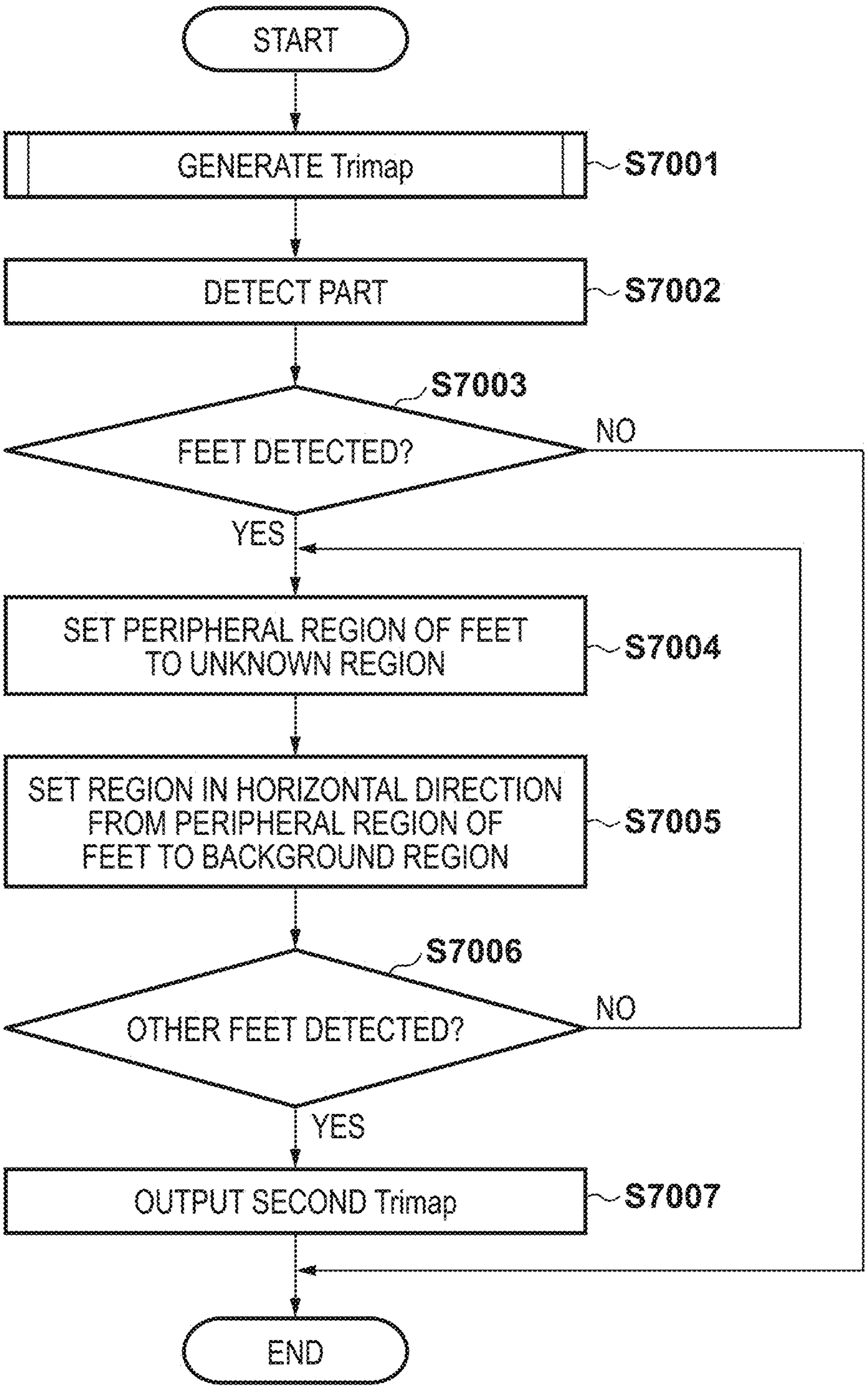
FIG. 41 is a flowchart illustrating second Trimap generation processing according to Embodiment 70.

FIG. 41 is a flowchart illustrating second Trimap generation processing according to Embodiment 70. Each process in this flowchart is realized by the CPU 102 loading a program stored in the ROM 103 into the RAM 104 and executing that program.

In step S7001, the CPU 102 generates a first Trimap by performing the same processing as step S1003 to step S1008 described in Embodiment 10. The CPU 102 records the first Trimap into the frame memory 111.

In step S7002, the CPU 102 detects the feet of the human body by loading parameters for detecting the feet of a human body, recorded in the ROM 103, into the object detection unit 115, and causing the object detection unit 115 to process an image read out from the frame memory 111. The object detection unit 115 records, as part detection information in the RAM 104, two coordinates indicating the vertices of opposing corners of a rectangle encompassing the foot region detected in the image, with the horizontal direction of the image as the x-axis and the vertical direction as the y-axis, and the lower-left corner of the image as the coordinates (0,0).

Although the present embodiment describes a case where the object detection unit 115 is a neural network that outputs coordinates of the detected region, the object detection unit 115 may be another neural network that detects the skeleton of a human body.

In step S7003, the CPU 102 determines whether the part detection information is recorded in the RAM 104. If the part detection information is recorded in the RAM 104, the CPU 102 determines that the feet of the human body have been detected in the image, and the processing moves to step S7004. However, if no part detection information is recorded in the RAM 104, the CPU 102 determines that the feet of the human body have not been detected in the image, and the processing of the flowchart ends.

In step S7004, the CPU 102 reads out the first Trimap recorded in the frame memory 111 and the part detection information recorded in the RAM 104, and changes the inside of the rectangular region in the Trimap, indicated by the part detection information, to an unknown region. The processing performed in step S7004 will be described in detail later with reference to FIG. 42.

In step S7005, the CPU 102 changes a region classified in the Trimap as the foreground region or the unknown region, in a region having a y coordinate in the same range as the y coordinate of the rectangle indicated by the part detection information on the Trimap but not having an x coordinate in the same range as the x coordinate of the rectangle, to the background region. The CPU 102 records the Trimap changed in step S7004 and step S7005 into the frame memory 111. The processing performed in step S7005 will be described in detail later with reference to FIG. 43.

In step S7006, the CPU 102 determines whether another instance of part detection information is recorded in the RAM 104. If another instance of part detection information is recorded in the RAM 104, the CPU 102 determines that the feet of another human body have been detected in the image, and the processing moves again to step S7004. If no part detection information is recorded in the RAM 104, the CPU 102 determines that the feet of another human body have not been detected in the image, and the processing moves to step S7007.

In step S7007, the CPU 102 outputs the Trimap recorded in the frame memory 111 to the exterior through the image terminal 109 or the network terminal 108 as the second Trimap. The processing then moves to the ending step. Note that the CPU 102 may record the second Trimap into the recording medium 112.

Figure 42:
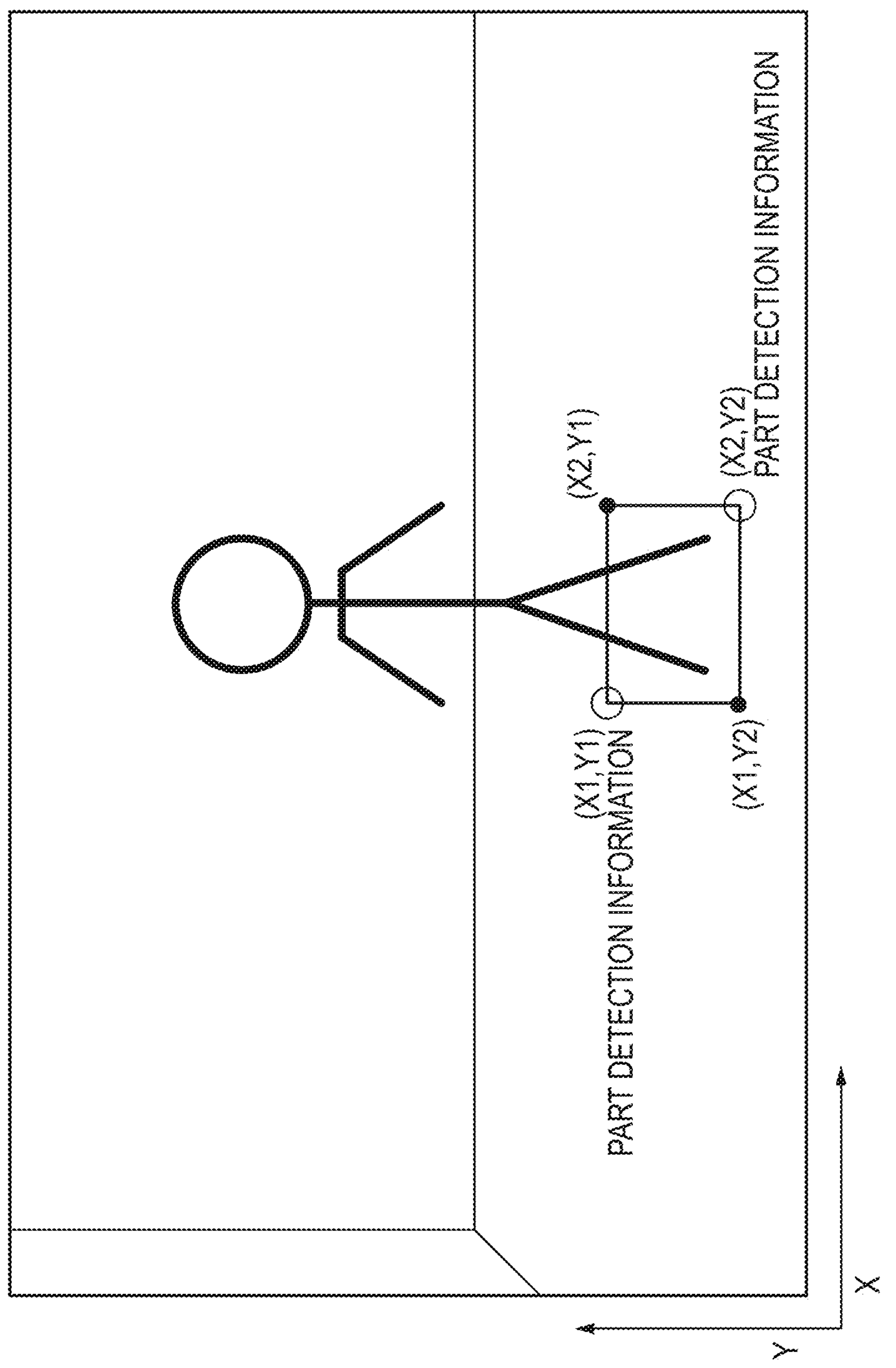
FIG. 42 is a diagram illustrating details of the processing of step S7004 according to Embodiment 70.

The processing of step S7004 will be described in detail with reference to FIG. 42. FIG. 42 is a diagram illustrating the two coordinates obtained from the part detection information output by the object detection unit 115, and the rectangle encompassing the region of the detected feet indicated by the part detection information, on the image recorded in the frame memory 111. The two coordinates obtained from the part detection information are (X1,Y1) and (X2,Y2). The inner region of the rectangle indicated by four points (X1,Y1), (X2,Y1), (X1,Y2), and (X2,Y2), which take the two coordinates as vertices at opposing corners, is set as the unknown region in step S7004.

Figure 43:
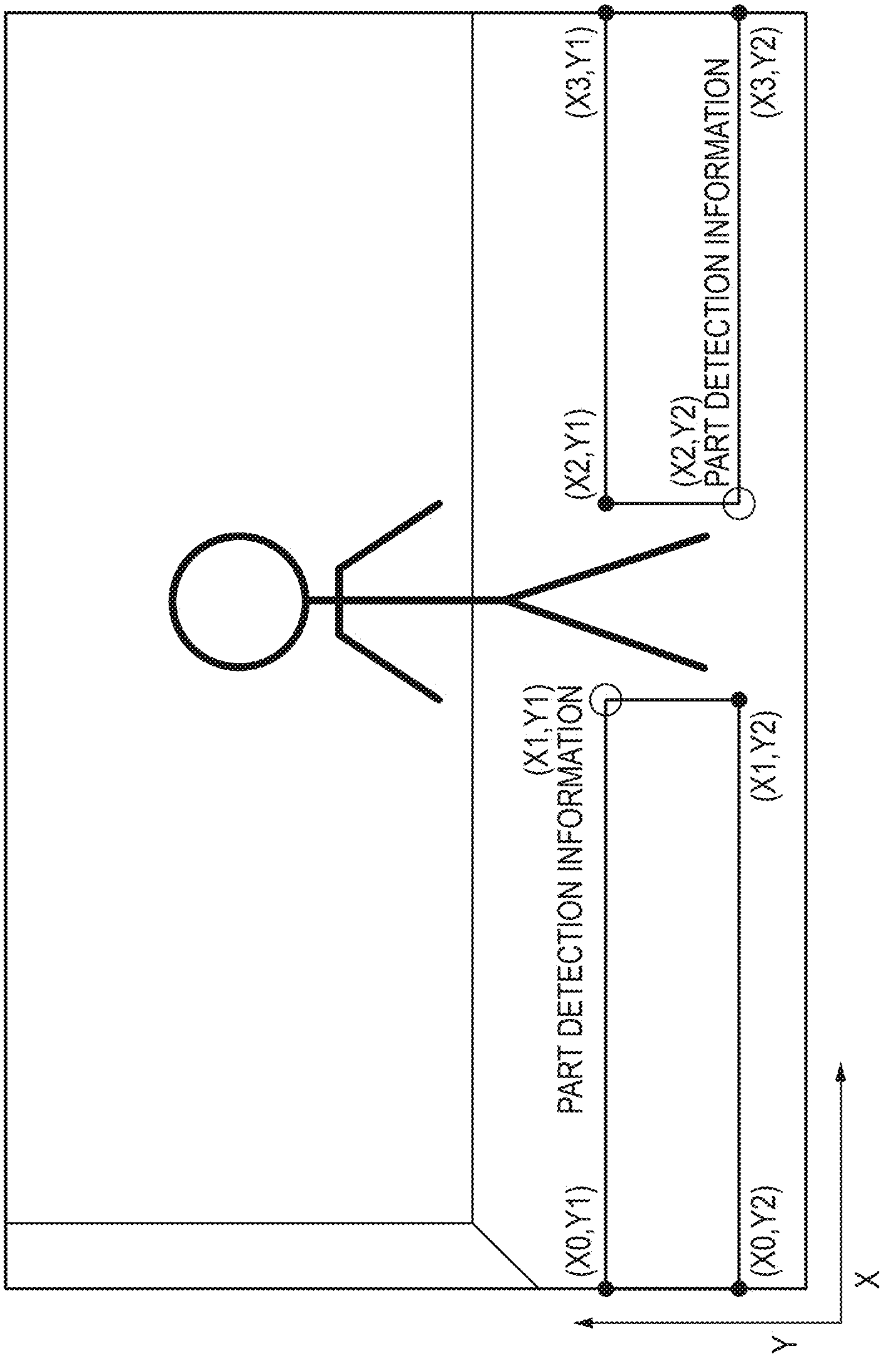
FIG. 43 is a diagram illustrating details of the processing of step S7005 according to Embodiment 70.

The processing of step S7005 will be described in detail with reference to FIG. 43. FIG. 43 is a diagram illustrating the rectangular region set as the background region in step S7005, on the image recorded in the frame memory 111. Two rectangular regions, which do not include a region from Y1 to Y2 within the same range as the y coordinates of the rectangular region corresponding to a peripheral region of the feet (FIG. 42) and from X1 to X2 within the same range as the x coordinates of the rectangular region corresponding to the peripheral region of the feet (FIG. 42), are set as the background region. In other words, two regions corresponding to a rectangle indicated by the four points (X0,Y1), (X1,Y1), (X0,Y2), and (X1,Y2) and a rectangle indicated by the four points (X2,Y1), (X3,Y1), (X2,Y2), and (X3,Y2) are set as the background region in step S7005. Note that the x coordinate X0 is the leftmost end of the image and the x coordinate X3 is the rightmost end of the image.

As described above, according to Embodiment 70, a second Trimap can be generated in which the ground surface, which was erroneously determined to be a foreground region at the same relative distance as the foot part of the subject, is reclassified as an unknown region or a background region.

The present embodiment has described an example of using a neural network that, by detecting the feet of a human body, reclassifies the ground surface that is in contact with the feet of the human body as an unknown region or a background region. If the subject is a car, a motorcycle, or the like, for example, the present embodiment can be applied by using a neural network that detects the tires that make contact with the ground surface. Likewise, the present embodiment can be applied for other subjects by using a neural network that detects parts of the other subjects that make contact with the ground surface.

Embodiment 71

Embodiment 70 described an example of generating a second Trimap in which a ground surface erroneously determined to be a foreground region is reclassified as an unknown region or a background region. However, the range of the ground surface that is erroneously determined to be a foreground region at the same distance as the subject is broader if the image processing apparatus 100 is tilted forward and narrower if the image processing apparatus 100 is tilted backward.

Embodiment 71 will describe an example of changing the range to be reclassified by referring to the tilt of the image processing apparatus 100 using information from an accelerometer for image stabilization built into the lens unit 106 when generating the second Trimap in which a ground surface erroneously determined to be a foreground region is reclassified as an unknown region or a background region.

Figure 44:
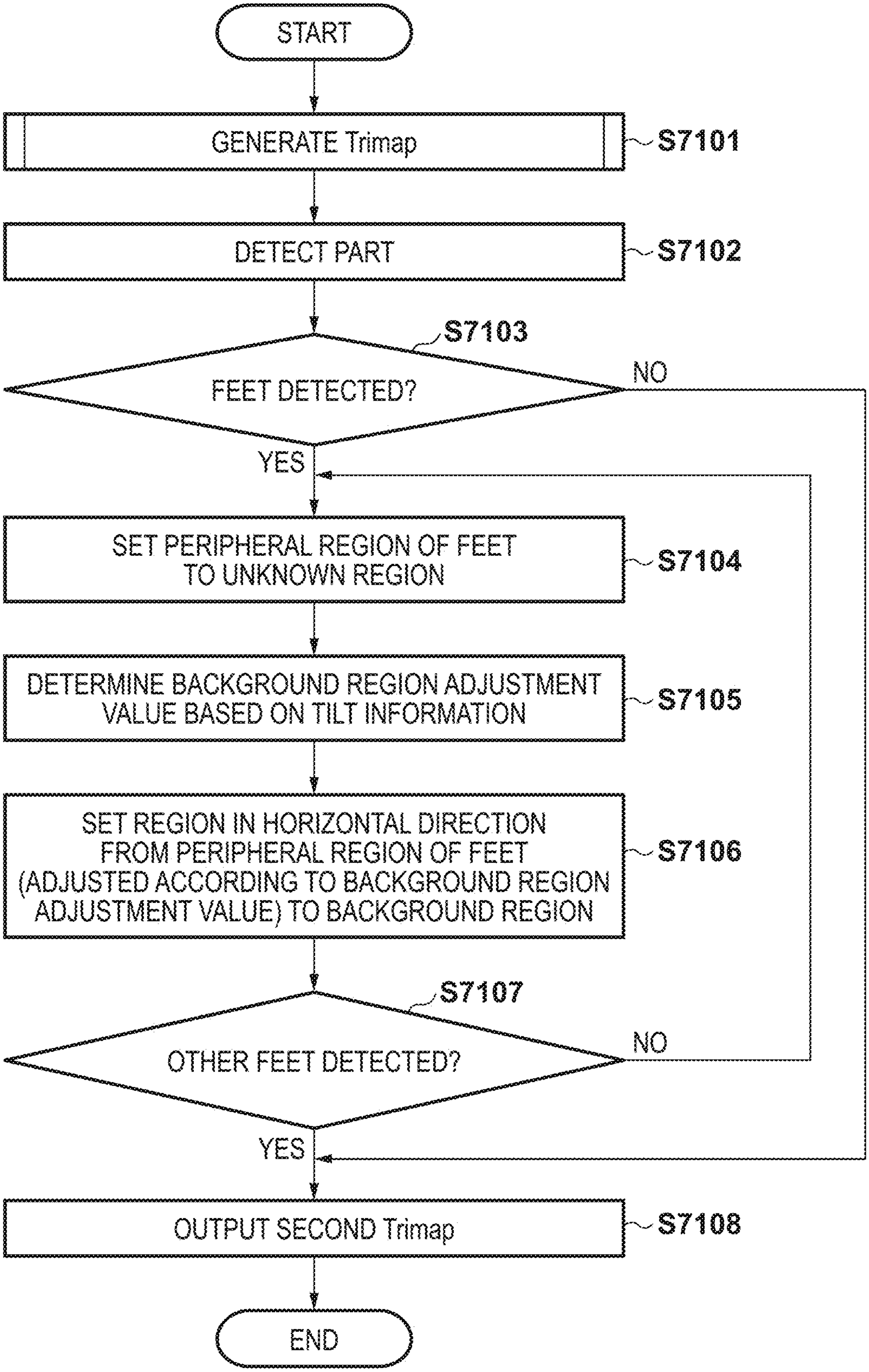
FIG. 44 is a flowchart illustrating second Trimap generation processing according to Embodiment 71.

FIG. 44 is a flowchart illustrating second Trimap generation processing according to Embodiment 71. Each process in this flowchart is realized by the CPU 102 loading a program recorded in the ROM 103 into the RAM 104 and executing that program.

The processing from step S7101 to step S7104 is the same as the processing from step S7001 to step S7004 described in Embodiment 70, and will therefore not be described here.

In step S7105, the CPU 102 reads out tilt information from the accelerometer of the lens unit 106. The tilt information is a numerical value that indicates whether the image processing apparatus 100 is tilted forward or backward. The CPU 102 determines a background region adjustment value t based on the tilt information. The background region adjustment value t is set to 0 if the image processing apparatus 100 is parallel to the ground surface, increases if the image processing apparatus 100 is tilted forward, and decreases if the image processing apparatus 100 is tilted backward.

In step S7106, the CPU 102 changes a region classified in the Trimap as the foreground region or the unknown region, in a region having a y coordinate in the same range as a y coordinate extended in the y coordinate direction, by the background region adjustment value t, from the upper part and lower part of the rectangle indicated by the part detection information on the Trimap, but not having an x coordinate in the same range as the x coordinate of the rectangle, to the background region. The CPU 102 records the Trimap changed in step S7104 and step S7106 into the frame memory 111. The processing performed in step S7106 will be described in detail later with reference to FIG. 45.

The processing from step S7107 to step S7108 is the same as the processing from step S7006 to step S7007 described in Embodiment 70, and will therefore not be described here.

Figure 45:
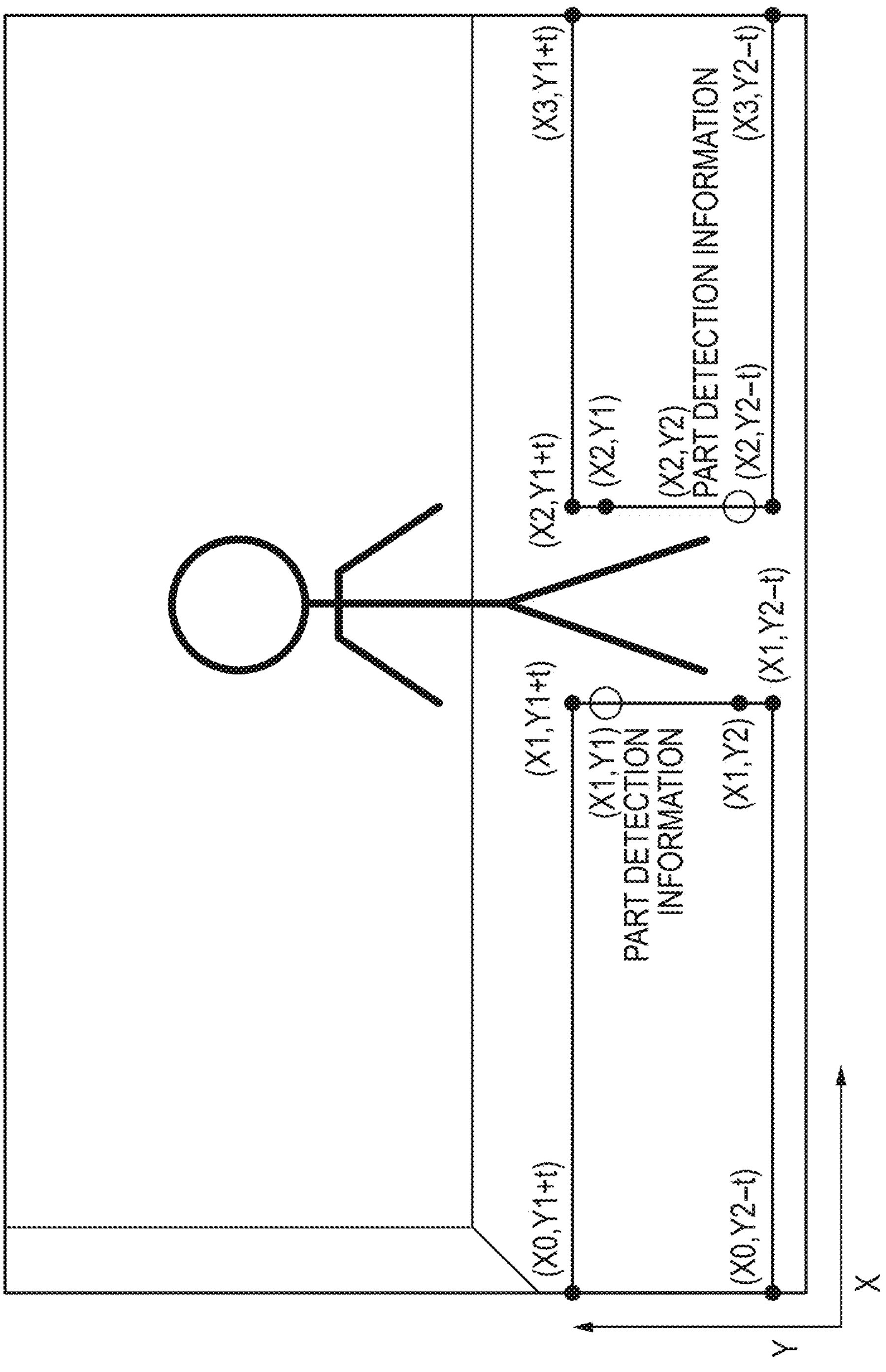
FIG. 45 is a diagram illustrating details of the processing of step S7106 according to Embodiment 70.

The processing of step S7106 will be described in detail with reference to FIG. 45. FIG. 45 is a diagram illustrating the rectangular region set as the background region in step S7106, on the image recorded in the frame memory 111. Two rectangular regions, which do not include a region from (Y1+t) to (Y2−t) within the same range as the y coordinates extended in the y coordinate direction by the background region adjustment value t from the upper part and the lower part of the rectangular region corresponding to a peripheral region of the feet (FIG. 42) and from X1 to X2 within the same range as the x coordinates of the rectangular region corresponding to the peripheral region of the feet (FIG. 42), are set as the background region. In other words, the regions within a rectangle indicated by the four points (X0,Y1+0, (X1,Y1+t), (X0,Y2−t), and (X1,Y2−t), and the rectangle indicated by the four points (X2,Y1+t), (X3,Y1+t), (X2,Y2−t), and (X3,Y2−t), are set as the background region in step S7106. Note that the x coordinate X0 is the leftmost end of the image and the x coordinate X3 is the rightmost end of the image.

As described above, according to Embodiment 71, the range to be reclassified to the background region can be changed by referring to the tilt of the image processing apparatus 100 using information from an accelerometer for image stabilization built into the lens unit 106 when generating the second Trimap in which a ground surface erroneously determined to be a foreground region is reclassified as a background region.

Embodiment 80

As one embodiment, it is also possible to generate Trimap using parallax information, a defocus amount, and the like that can be calculated by CPU 102 based on the information obtained from the image plane phase detection sensor. In a situation where the aperture of the lens is changed during shooting, there is an issue in that the parallax information for each frame at the boundary between the foreground region and the background region also changes, resulting in a change in the boundary of the unknown region. The present embodiment will describe a configuration that addresses this issue.

Figure 46:
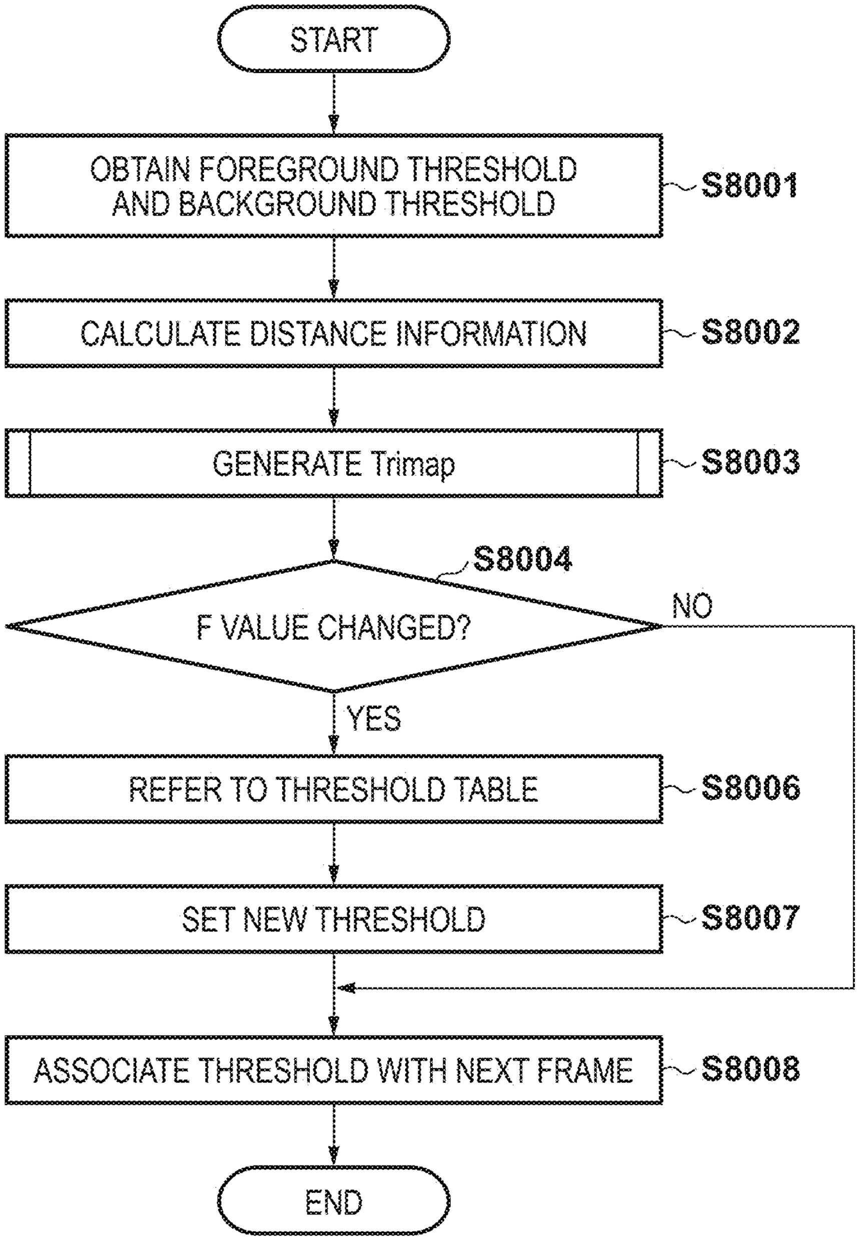
FIG. 46 is a flowchart illustrating processing for changing a threshold in response to a change in an F value according to Embodiment 70.

A function through which the image processing apparatus 100 generates a Trimap based on parallax information will be described with reference to FIG. 46. FIG. 46 illustrates processing for determining a threshold for a defocus amount for the image processing apparatus 100 to separate each boundary between the foreground region, the background region, and the unknown region when generating the Trimap for each frame. The processing illustrated in FIG. 46 is repeated by the image processing apparatus 100 each time a Trimap is generated on a frame-by-frame basis.

The processing of step S8001 and step S8002 is the same as step S4001 and step S4004 in Embodiment 40, and will therefore not be described.

In step S8003, the image processing apparatus 100 (the CPU 102) generates the Trimap by performing the same processing as step S1003 to step S1008 described in Embodiment 10.

In step S8004, the image processing apparatus 100 determines whether the depth of field has been changed based on an amount of change in the F value. Note that the F value used in the determination of step S8004 may be replaced by a variable that makes it possible to calculate the focal length and the amount of light entering the lens unit 106. For example, the image processing apparatus 100 may perform a frame-by-frame comparison of an amount of change due to a T value or an H value, which are indicators calculated from the transmittance of the optical system. If there is a change in the F value, the processing moves to step S8006, whereas if there is no change in the F value, the processing moves to step S8008.

In step S8006, the image processing apparatus 100 refers to a table that defines a relationship between the F value and the threshold. This table is assumed to be stored in the image processing apparatus 100 (e.g., in the ROM 103).

In step S8007, the image processing apparatus 100 sets new thresholds (the foreground threshold and the background threshold) in the RAM 104 based on the table referenced in step S8006 and the current (post-change) F value.

In step S8008, the image processing apparatus 100 stores the thresholds (the foreground threshold and the background threshold) in association with the next frame.

The image processing apparatus realizes optimal image separation for each frame by repeating the processing from step S8001 to step S8008 each time a frame is obtained.

Note that a configuration may be employed in which the processing of step S8008 is performed only when, for example, the depth of field is changed, rather than for all consecutive frame images constituting a moving image. A method in which the processing of step S8004 to step S8008 is performed for every set number of frames, instead of for all consecutive frame images constituting a moving image, may also be employed.

Embodiment 80 realizes optimal image separation on a frame-by-frame basis when there is a change in the F value. An example of this is illustrated in FIGS. 47A to 47C and FIGS. 48A to 48C.

Figure 47A:
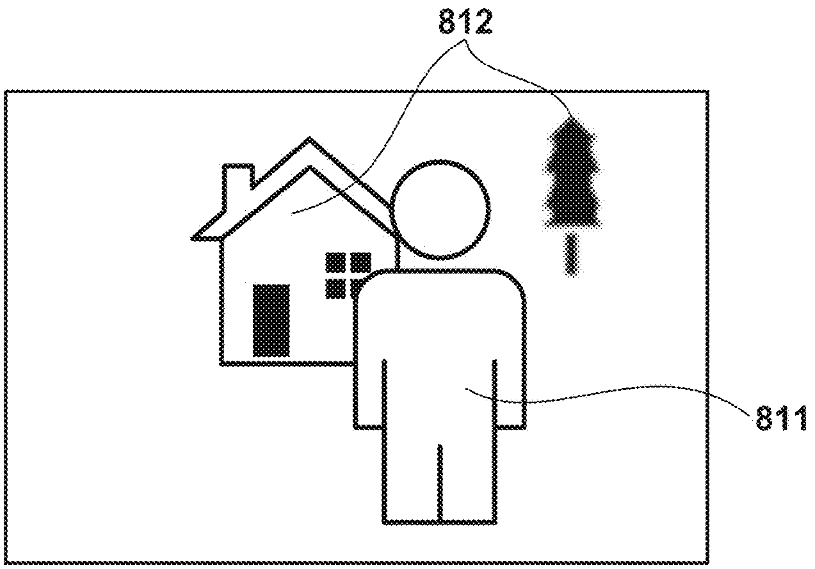
FIGS. 47A to 47C are descriptive diagrams illustrating frame images according to Embodiment 80.
Figure 47B:
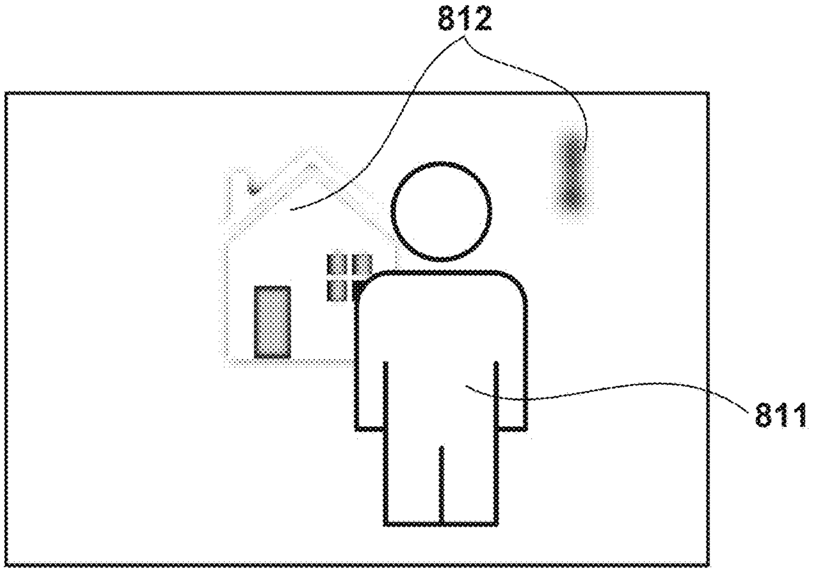
Figure 47C:
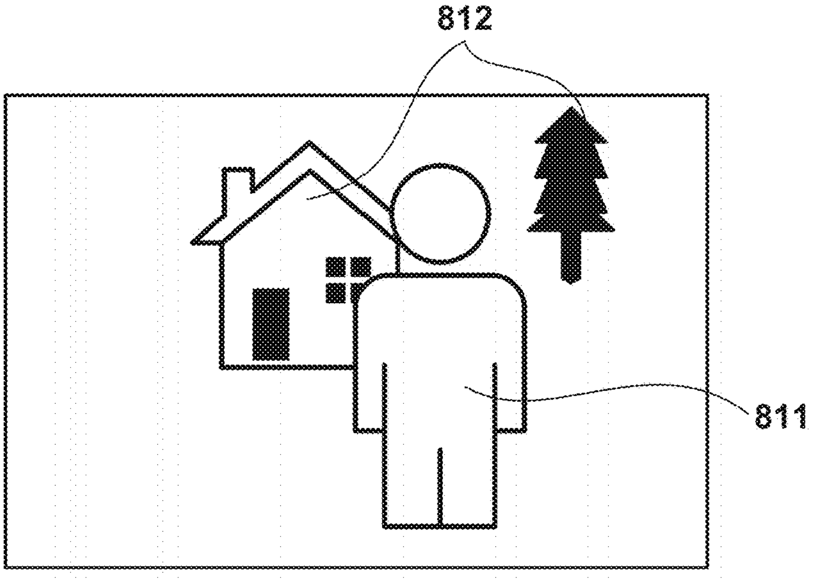

FIGS. 47A to 47C are frame images obtained by focusing on a subject 811, using the configuration of the present embodiment. FIG. 47A illustrates a frame image obtained in any given state.

FIG. 47B illustrates a frame image obtained at a shallower depth of field, i.e., a smaller F value, than in FIG. 47A. A background 812 aside from the subject 811 in the frame image in FIG. 47B becomes blurred in appearance due to the greater defocus amount. In FIG. 47B, because the difference between defocus amounts easily increases at the boundary part between the subject 811 and the background 812, the subject 811 is more likely to be classified as the foreground region, and the boundary part of the background 812 as a part of the background region, when the image is separated.

FIG. 47C illustrates a frame image obtained at a deeper depth of field, i.e., a greater F value, than in FIG. 47A. The background 812 aside from the subject 811 in the frame image in FIG. 47C becomes sharper in appearance due to the smaller defocus amount. In FIG. 47C, because the difference between defocus amounts easily decreases at the boundary part between the subject 811 and the background 812, there is a disadvantage in that a part of the background 812 on the outside of the subject 811 is also classified as the foreground region when the image is separated.

Figure 48A:
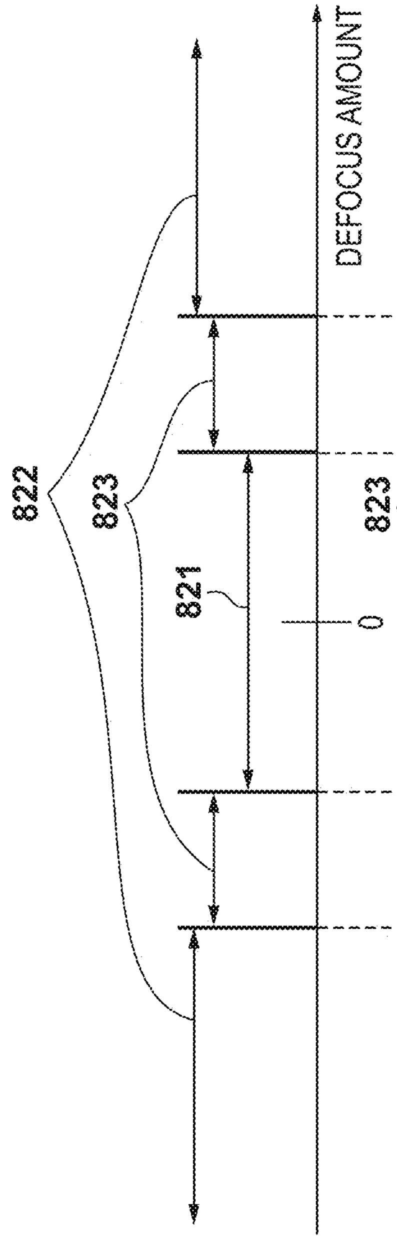
FIGS. 48A to 48C are descriptive diagrams illustrating an image separation method according to Embodiment 80.
Figure 48B:
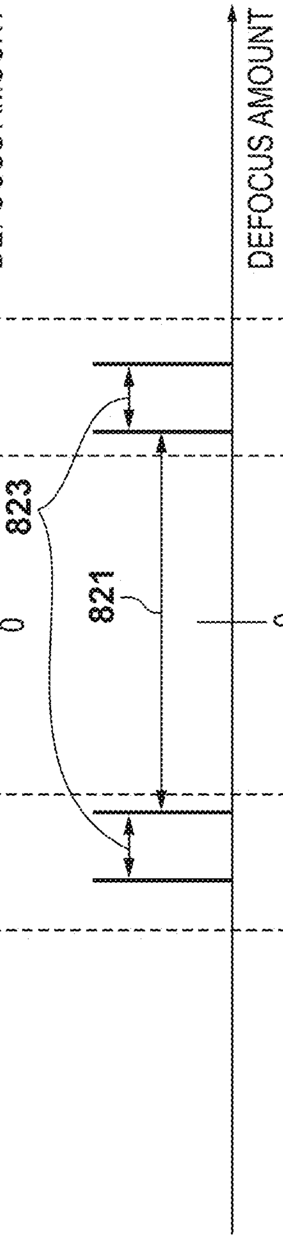
Figure 48C:
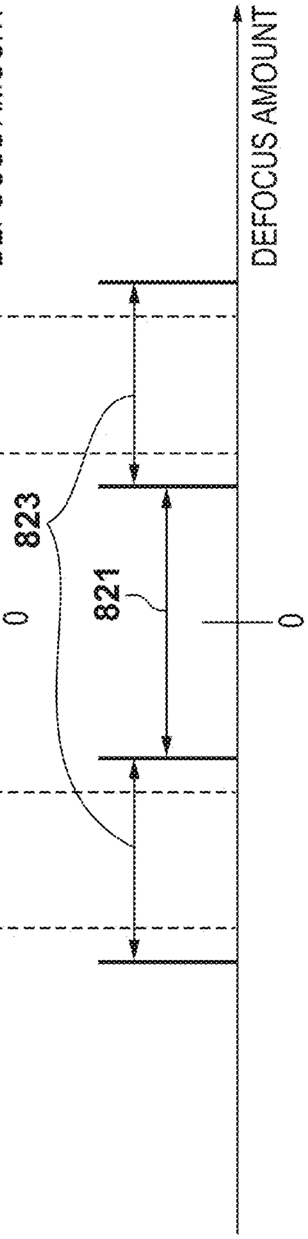

FIGS. 48A to 48C are diagrams illustrating a method for separating all pixels in a frame into three regions, i.e., the foreground region, the background region, and the unknown region, according to the defocus amount. FIG. 48A illustrates classification performed at the time of image separation, corresponding to the frame image obtained in a given state, illustrated in FIG. 47A. A region 821 is a range where the defocus amount is small and the region is classified as a foreground region. A region 822 is a range where the defocus amount is large and the region is classified as a background region. A region 823 is a range that cannot be determined to be either a foreground region or a background region according to the defocus amount, and is therefore classified as an unknown region.

FIG. 48B illustrates the range of classification performed during image separation when an operation for reducing the depth of field, i.e., reducing the F value compared to FIG. 48A, is performed. In the state illustrated in FIG. 47B, the difference between the defocus amounts easily increases at a boundary part between the subject 811 and the background 812. For this reason, as illustrated in FIG. 48B, the table of step S8006 is set such that the region 823 has a narrower range for the defocus amount than in FIG. 48A.

FIG. 48C illustrates the range of classification performed during image separation when an operation for deepening the depth of field, i.e., increasing the F value compared to FIG. 48A, is performed. In the state illustrated in FIG. 47C, the difference between the defocus amounts easily decreases at a boundary part between the subject 811 and the background 812. For this reason, as illustrated in FIG. 48C, the table of step S8006 is set such that the region 823 has a broader range for the defocus amount than in FIG. 48A.

In the configuration of the present embodiment, under a condition that the entire subject 811 in FIGS. 47A to 47C is blurred in appearance, the table in step S8006 may be set such that the boundary part between the subject 811 and the background 812 becomes broader when the F value is reduced. Likewise, under a condition that the entire subject 811 in FIGS. 47A to 47C is blurred in appearance, the table in step S8006 may be set such that the boundary part between the subject 811 and the background 812 becomes narrower when the F value is increased.

As described above, according to Embodiment 80, an effect can be expected in which the boundaries of the foreground region, the background region, and the unknown region can be appropriately identified even when the F value is changed by the aperture of the lens.

Embodiment 90

As one embodiment, it is also possible to generate Trimap using parallax information, a defocus amount, and the like that can be calculated by CPU 102 based on the information obtained from the image plane phase detection sensor.

Figures 49A, 49B, 49C:
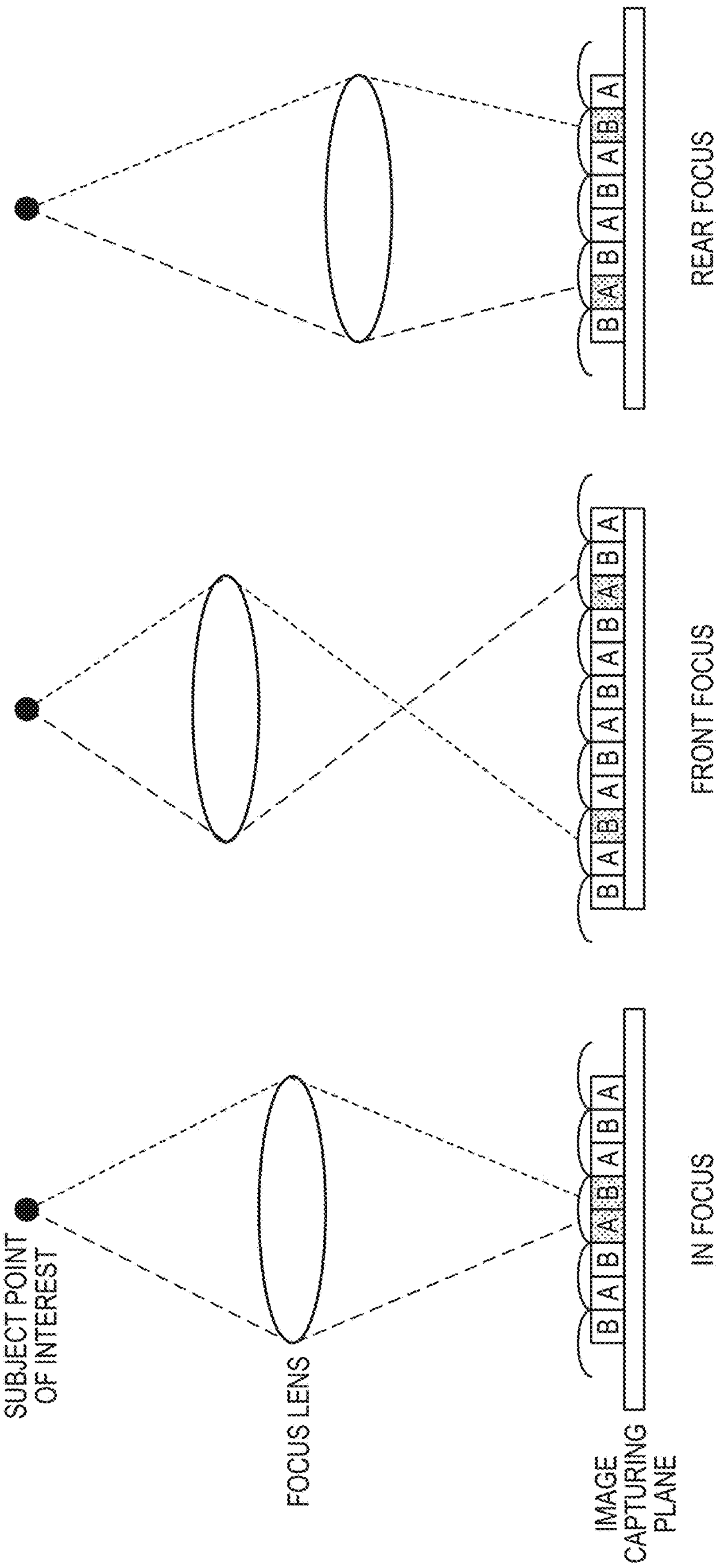
FIGS. 49A to 49C are descriptive diagrams illustrating a focus region according to Embodiment 90.

The obtainment of the parallax information will be described first with reference to FIGS. 49A to 49C. FIGS. 49A to 49C illustrate an optical path from the subject to the image sensor when a given point of interest of a subject is shot. FIG. 49A is a diagram illustrating an in-focus state (i.e., a state in which the subject is at the focal position). Light is focused by the focus lens and the image is formed at the image capturing plane. At this time, the A image signal and the B image signal in the same pixel output the same information. FIG. 49B is a diagram illustrating a front focus state. Although the light is focused by the focus lens, the image is formed in front of the image capturing plane, and thus the optical path crosses and then enters the image capturing plane. At this time, the positional relationship between the A image signal and the B image signal is farther apart than when in an in-focus state, as illustrated in the drawing. By detecting this degree of separation, it can be seen that the image is in front focus. FIG. 49C is a diagram illustrating a rear focus state. Although the light is focused by the focus lens, the image is formed in back of the image capturing plane, and thus the optical path enters the image capturing plane without crossing. At this time, compared to the in-focus state, the positional relationship between the A image signal and the B image signal is farther apart, as illustrated in the drawing, which is a relationship where the positions of the A image signal and the B image signal are reversed compared to the front focus state. By detecting this, it can be seen that the image is in rear focus.

Figures 50A, 50B, 50C:
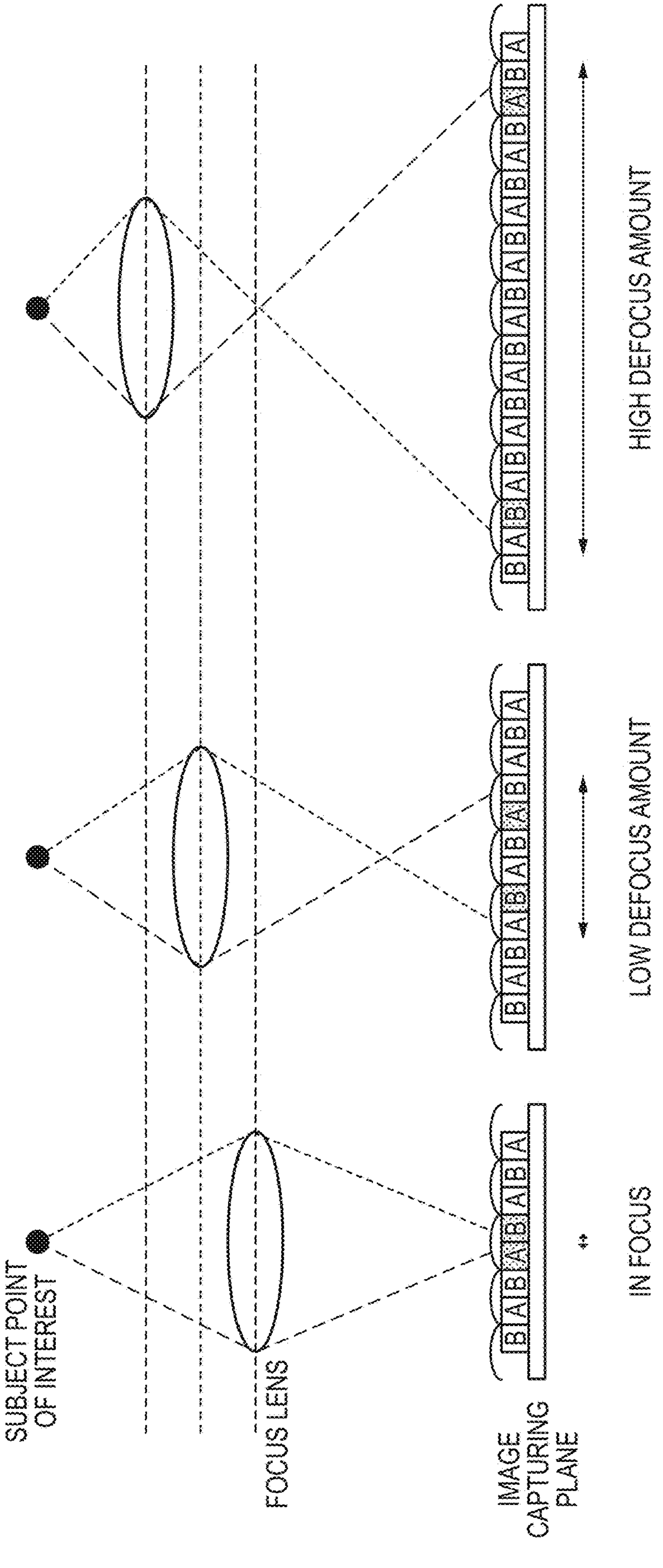
FIGS. 50A to 50C are descriptive diagrams illustrating a defocus amount according to Embodiment 90.

Then, as illustrated in FIGS. 50A to 50C, the detected degree of separation of the pixels serves as the defocus amount, which means that the defocus amount increases as the detected degree of separation of the pixels increases, and the blurred state becomes stronger. If this pixel shift can be controlled to remain small, an image that is in focus can be shot.

Figure 51A:
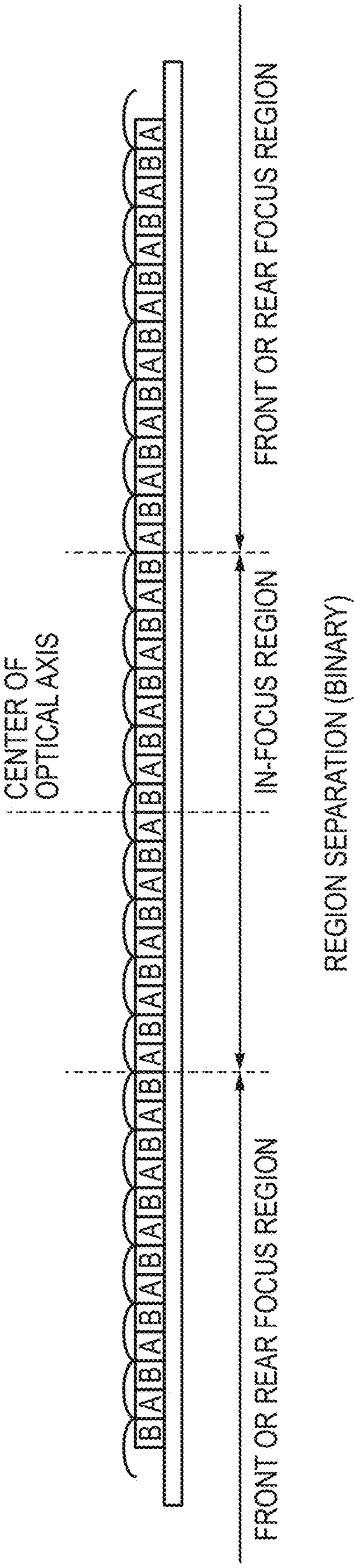
FIGS. 51A and 51B are descriptive diagrams illustrating focus region boundaries according to Embodiment 90.
Figure 51B:
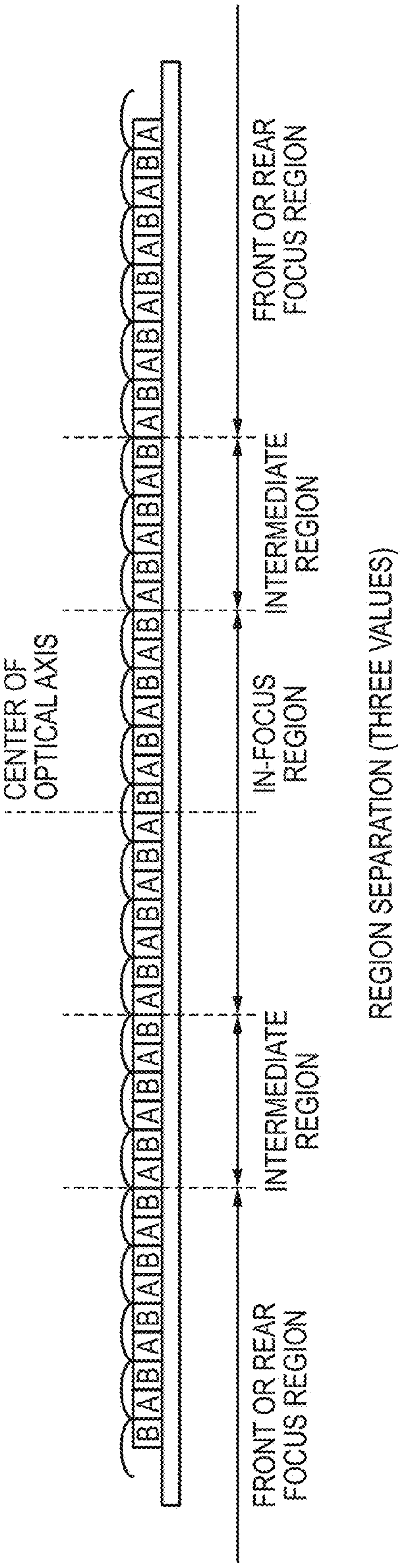

In the present embodiment, a Trimap is generated by using this detection of the detected shift in positions of the pixels in the A image signal and the B image signal. Based on the concepts of FIGS. 49A to 49C and 50A to 50C, the boundary (threshold) between a region that is in focus (an in-focus region) and a front focus region or a rear focus region are set as illustrated in FIG. 51A. By providing this boundary, it is possible to binarize the image simply by determining the in-focus region to be the foreground region and determining the front focus region or the rear focus region to be the background region. Alternatively, it is possible to have the in-focus region and the front focus region determined to be the foreground region, and the rear focus region to be the background region. Furthermore, it is also possible to set an intermediate region at the boundary between the in-focus region and the front focus region or the rear focus region, as illustrated in FIG. 51B. By determining this intermediate region as the unknown region, it is possible to generate a Trimap image having three values, i.e., the foreground region, the background region, and the unknown region.

Figure 52:
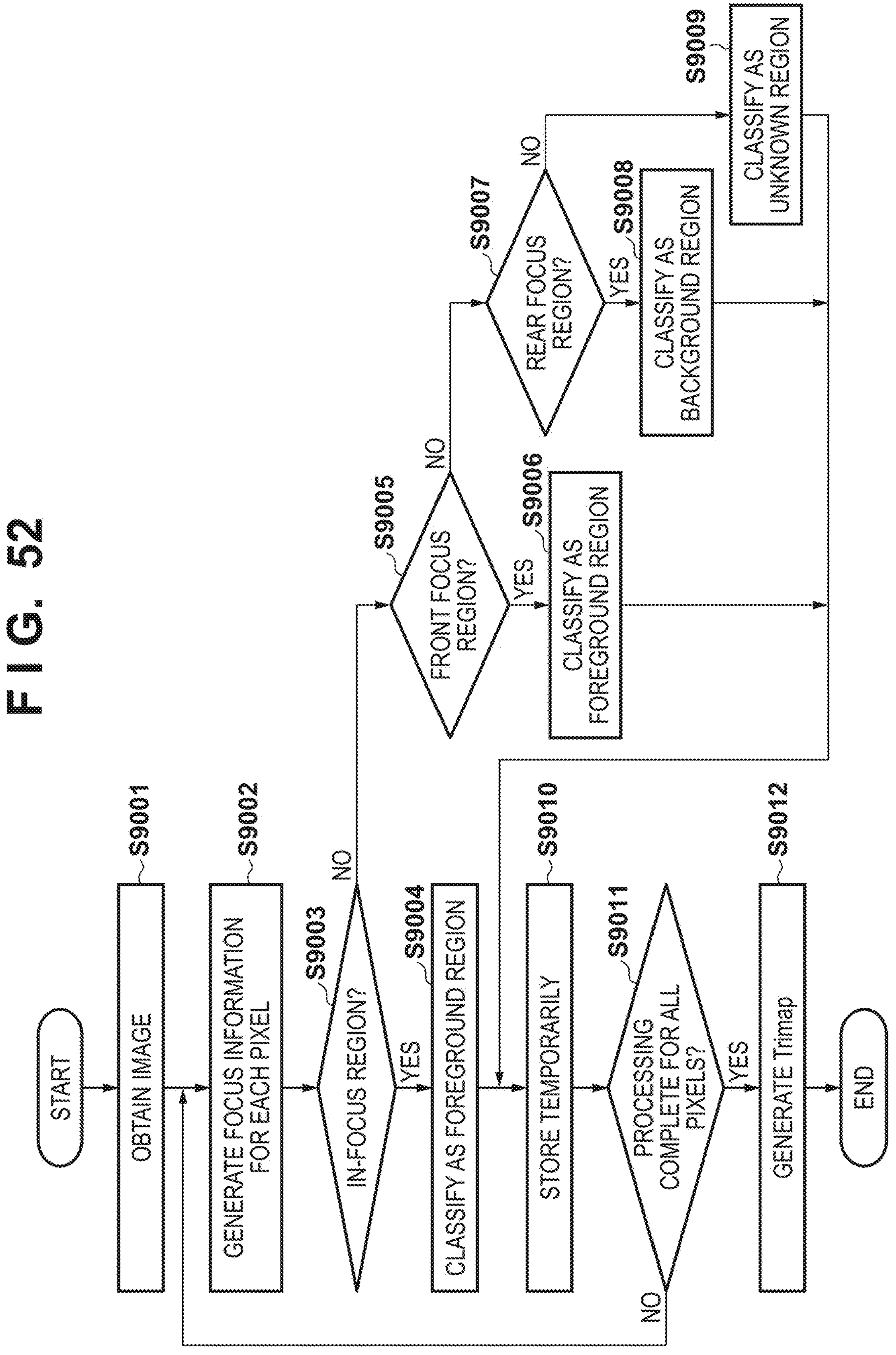
FIG. 52 is a flowchart illustrating Trimap generation processing according to Embodiment 90.

The above processing will be described with reference to the flowchart in FIG. 52. This is mainly executed by the CPU 102 of the image processing apparatus 100, and in this example, the in-focus region and the front focus region are set as the foreground region, the rear focus region is set as the background region, and the boundary part is set as the unknown region.

First, in step S9001, the user shoots an image of a desired subject using the image processing apparatus 100. The image of the subject is received by the image capturing unit 107. In step S9002, the CPU 102 obtains information of an image plane phase difference from the image capturing unit 107 and detects positional shift of the entering information between the A image signal or the B image signal. The CPU 102 generates focus information from that information. In step S9003, if the CPU 102 determines that the positional shift between the A image signal and the B image signal for a given pixel of interest is low and the region is the in-focus region, the processing moves to step S9004, and that pixel is determined to be in the foreground region. On the other hand, if, in step S9005, the CPU 102 determines that the positional shift is large and the image is in a front focus state, the processing moves to step S9006, and that pixel is determined to be in the foreground region. This is because on object in front of the in-focus region is often the subject that the user desires, and is therefore kept as the foreground region. If, in step S9007, the CPU 102 determines that the positional shift between the A image signal and the B image signal for a given pixel of interest is large and the pixel is in a rear focus state, the processing moves to step S9008, and that pixel is determined to be in the background region. Furthermore, if the pixel is neither in the in-focus region, nor in the front focus region, nor in the rear focus region, the CPU 102 moves the processing to step S9009 and determines that the pixel is in the unknown region. In this example, the in-focus region and the front focus region are foreground regions, and there is therefore no need to create an unknown region therebetween.

In step S9010, the CPU 102 temporarily stores the result of this processing in the frame memory 111. In step S9011, the CPU 102 determines whether the processing is complete for all pixels of the image capturing unit 107. If so, the processing moves to step S9012, the image is read out from the frame memory 111, the Trimap image is generated, and these items are output to the display unit 114 and the like.

As described above, the Trimap image can be generated using the focus information and the defocus amount that can be detected from the shift between the A image signal and the B image signal.

Embodiment 91

Figure 53A:
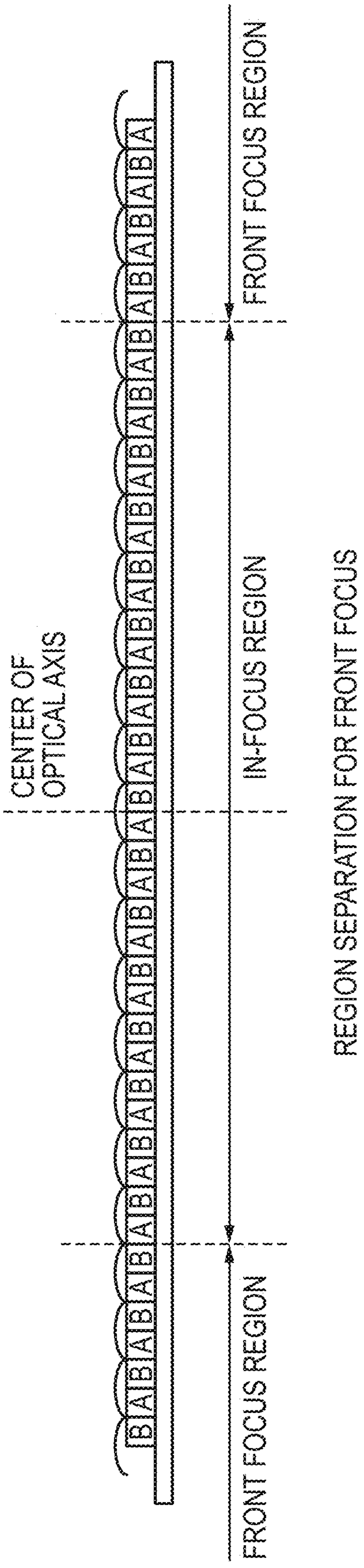
FIGS. 53A and 53B are descriptive diagrams illustrating focus region boundaries according to Embodiment 91.
Figure 53B:
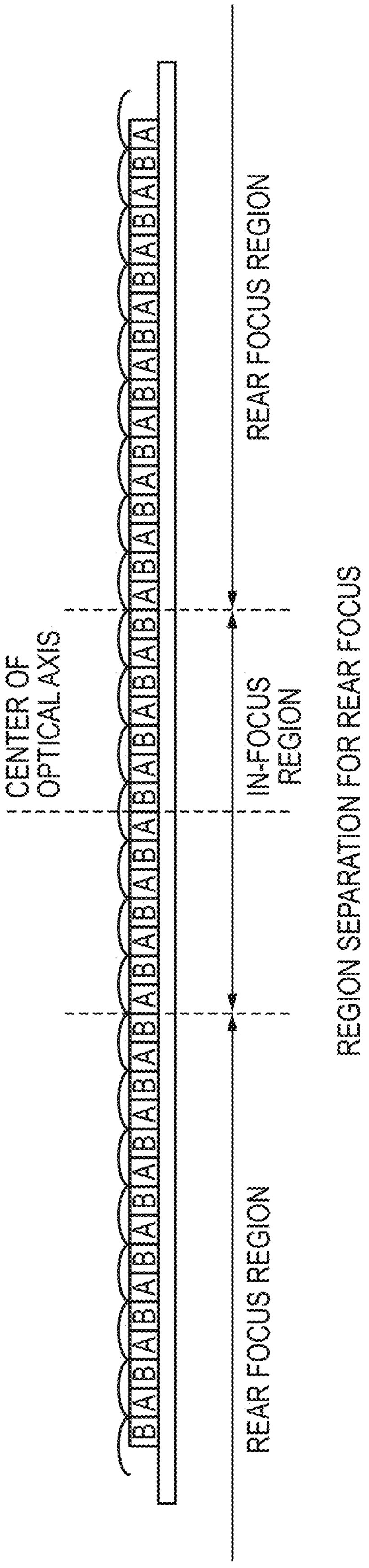

In Embodiment 90, the Trimap image was generated using the defocus amount, which is focus information. Embodiment 91 will described a method for generating a Trimap image with even higher accuracy. FIGS. 53A and 53B illustrate the same separation of the focus regions as in FIGS. 51A and 51B. At this time, the boundary part between the front focus region and the rear focus region may be changed. For example, in the case of FIG. 53A, the boundary (threshold) may be set in the front focus region such that the in-focus region is broader. On the other hand, in the case of FIG. 53B, the boundary (threshold) may be set in the rear focus region such that the in-focus region is narrower. If the boundary thresholds can be set individually for the front focus region and the rear focus region in this manner, fine-tuning can be carried out according to movement of the subject. For example, if the subject is a human, it is possible to generate a Trimap image according to the actual situation, such as the fact that the movement of the face or hand of a human often enters the front focus region.

Figure 54A:
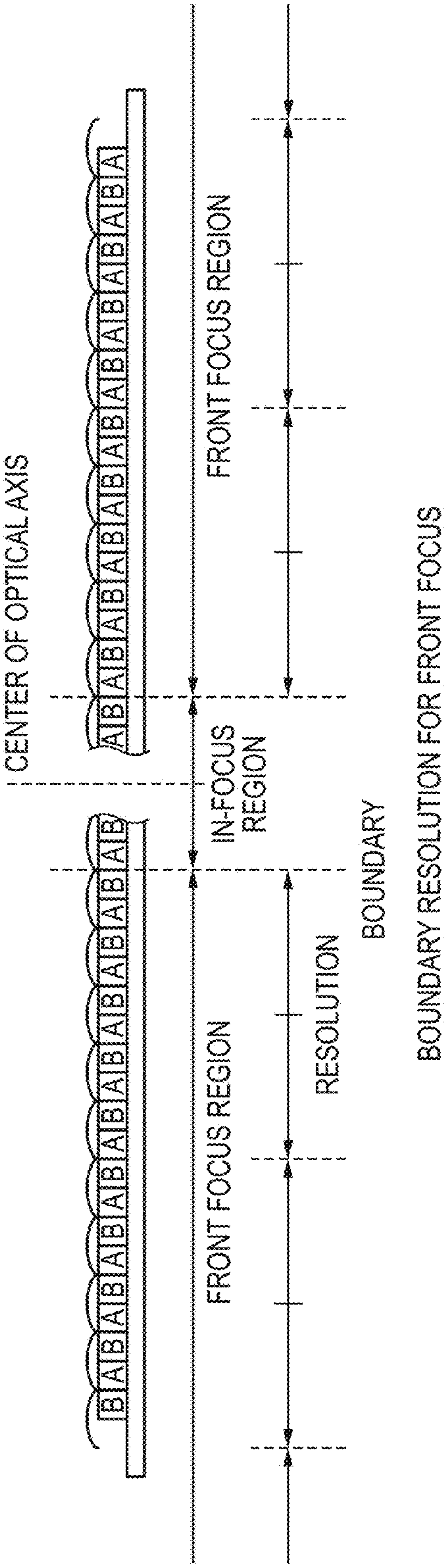
FIGS. 54A and 54B are descriptive diagrams illustrating set resolutions at focus region boundaries according to Embodiment 91.
Figure 54B:
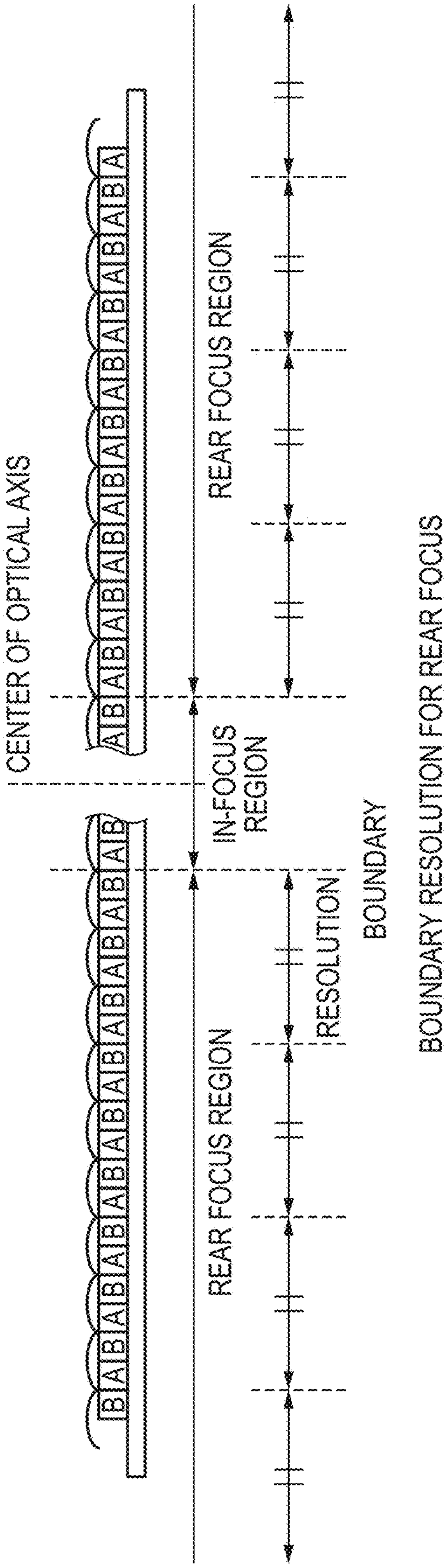
Figure 55:
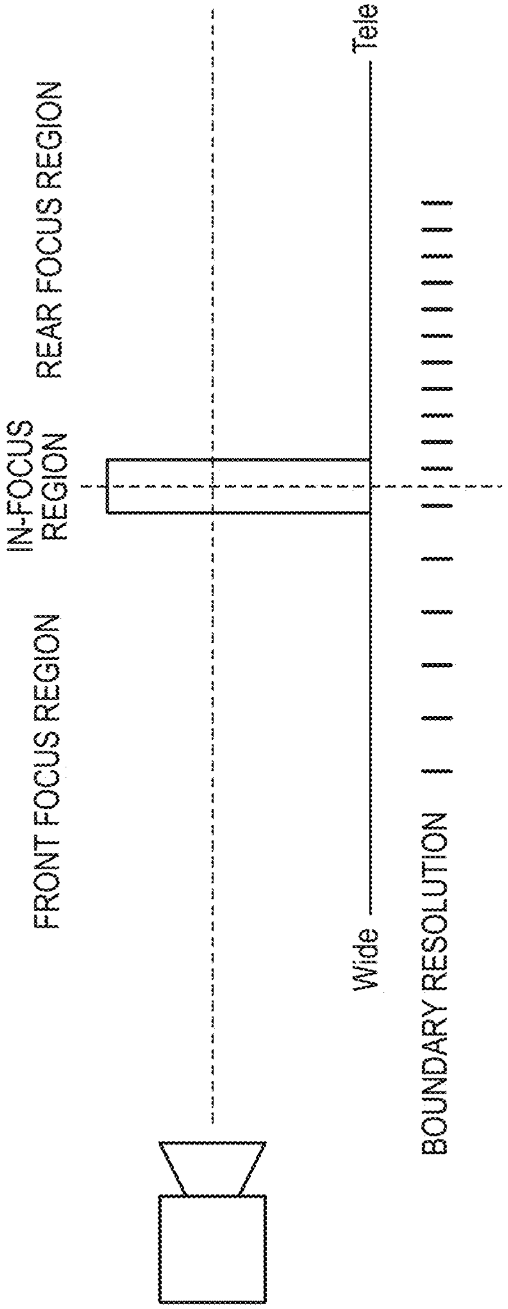
FIG. 55 is a side-view descriptive diagram illustrating set resolutions at focus region boundaries according to Embodiment 91.

Furthermore, as an adjustment function, it may be possible to freely change the threshold setting of the boundary, and different adjustment resolutions can be provided for the front focus region and the rear focus region. This is illustrated in FIGS. 54A and 54B. FIG. 54A illustrates the adjustment resolution in the front focus region, and FIG. 54B illustrates the adjustment resolution in the rear focus region. Here, the resolution of the front focus region is set to be coarser, and the resolution of the rear focus region is set to be finer. FIG. 55 is a diagram illustrating the relationship between resolution and distance. Making settings in this manner makes it possible to perform fine-tuning according to movement of the subject, and generate a Trimap image having improved accuracy while adapting to the actual conditions of the shooting.

Figure 56:
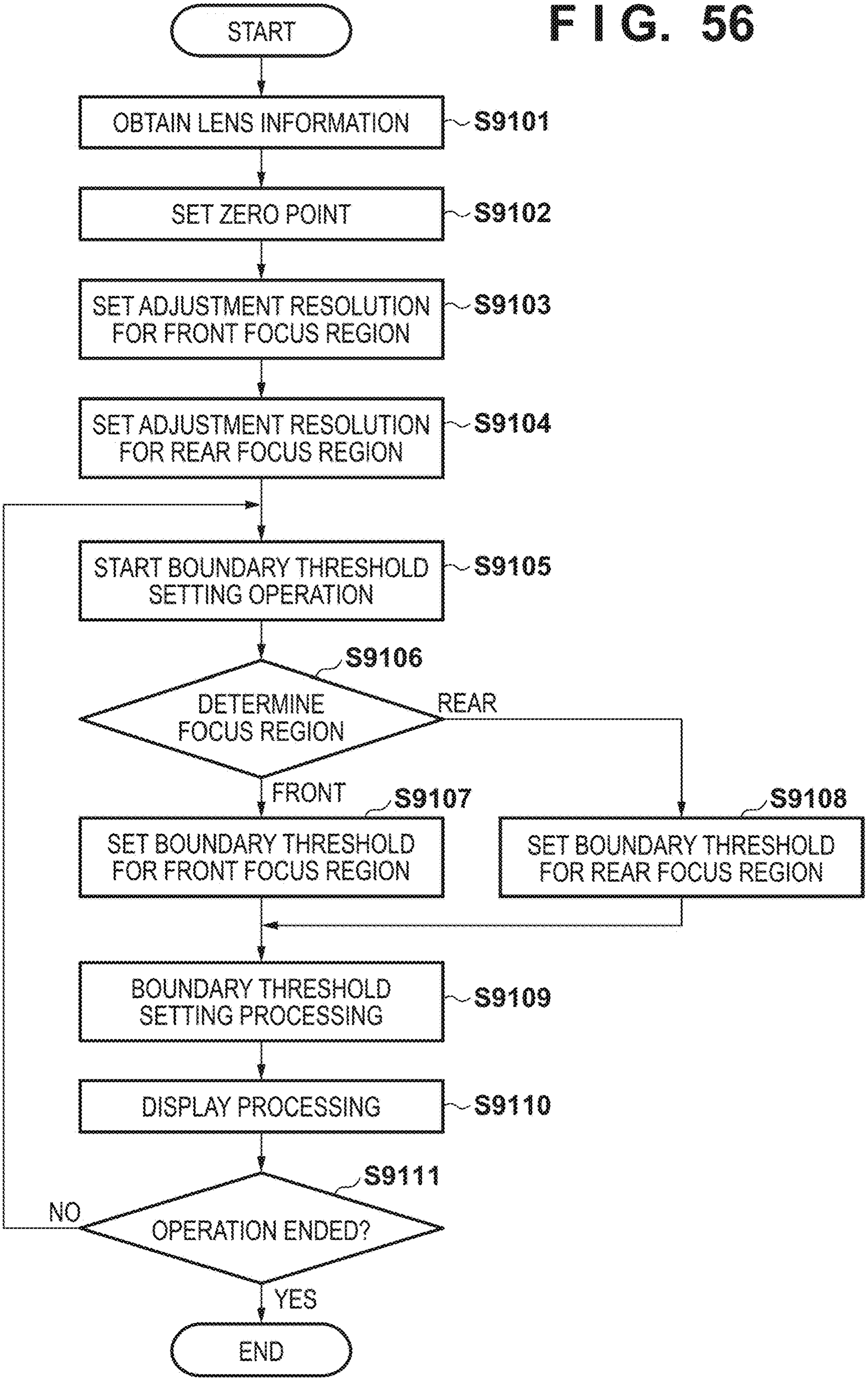
FIG. 56 is a flowchart illustrating processing for setting an adjustment resolution and a boundary threshold at focus region boundaries according to Embodiment 91.

The above processing will be described with reference to the flowchart in FIG. 56. This is mainly processed by the CPU 102 of the image processing apparatus 100, and in this example, pertains to setting the adjustment resolution and using that setting to set the region thresholds. First, in step S9101, the image processing apparatus 100 performs processing for obtaining the lens information. This is an operation through which the CPU 102 obtains information about the lens unit 106 mounted to the image processing apparatus 100. The lens unit 106 may vary in function and performance in terms of high or low resolution, high or low transmittance, the number of aperture blades, being provided with image stabilizer functions, and so on. The CPU 102 performs operations for setting initial values based on this information.

In step S9102, the CPU 102 sets a zero point, which is the center in the in-focus region. This is a midpoint between the front focus region and the rear focus region, and the boundary separation processing is performed starting from this zero point.

In step S9103, the CPU 102 sets the adjustment resolution for the front focus region. In step S9104, the CPU 102 sets the adjustment resolution for the rear focus region. These adjustment resolutions are set based on the lens information of the lens unit 106 mounted as described earlier, and are set independently for each region.

In step S9105, when the user wishes to change the boundary threshold and starts operations using the operation unit 113, the CPU 102 displays, in the display unit 114, a screen pertaining to which region to set.

In step S9106, if the user selects the front focus region, the processing moves to step S9107, where the user can change the boundary threshold of the front focus region. On the other hand, if the user selects the rear focus region, the processing moves to step S9108, where the user can change the boundary threshold of the rear focus region.

In step S9109, the CPU 102 applies the boundary threshold that has been set. In step S9110, the CPU 102 displays the boundary threshold that has been set in the display unit 114 or the like to inform the user that the setting is complete. In step S9111, when the user completes the setting operation, the processing of this flowchart ends.

As described above, by having the user set a desired boundary threshold in the front focus region and the rear focus region and making the adjustment resolution of the threshold selective, an optimal Trimap image for the shooting state can be generated.

Note that the aforementioned adjustment resolution may be used not only with model information of the lens, but also by holding a plurality of instances of information in the ROM 103 in advance as a table or the like and having the CPU 102 load that information into the RAM 104 or the like. Alternatively, the user may be allowed to set a desired adjustment resolution. It is also possible to flexibly change the adjustment resolution according to the state of the lens, such as the opening and closing state of the aperture, the operation speed of the focus lens, or the like. In addition, although the foregoing descriptions focused specifically on the front focus region and the rear focus region, the embodiment can also be implemented by adding the intermediate region (the unknown region).

Embodiment A0

When shooting a plurality of subjects, it may be necessary to have the plurality of subjects recognized as the foreground region of the Trimap. However, in the foregoing embodiments, it is possible that some of the subjects will be recognized as the background region when the distance between the subjects in the depth direction is too great. In light of this problem, the present embodiment will describe processing for generating a Trimap with all subjects set as the foreground region, even when there are a plurality of subjects.

In the present embodiment, the image processing apparatus 100 illustrated in FIG. 1 performs face detection. The face detection function will be described here. The CPU 102 sends image data subject to face detection to the object detection unit 115. Under the control of the CPU 102, the object detection unit 115 applies a horizontal band pass filter to the image data. Additionally, under the control of the CPU 102, the object detection unit 115 applies a vertical band pass filter to the image data that has been processed. Edge components of the image data are detected using the horizontal and vertical band pass filters.

After this, the CPU 102 performs pattern matching with respect to the detected edge components, and extracts candidate groups for the eyes, the nose, the mouth, and the ears. Then, from the extracted eye candidate groups, the CPU 102 determines eye pairs that meet preset conditions (e.g., the distance between the two eyes, tilt, and the like) and narrows down the eye candidate groups to only groups having eye pairs. The CPU 102 then detects the face by associating the narrowed-down eye candidate groups with the other parts that form the corresponding face (the nose, mouth, and ears), and passing the image through a pre-set non-face condition filter. The CPU 102 outputs face information according to the face detection results and ends the processing. At this time, the CPU 102 stores features such as the number of faces in the RAM 104.

The Trimap generation processing according to Embodiment A0 will be described next with reference to the flowcharts in FIGS. 57A and 57B. First, in step SA001, the CPU 102 obtains a number of face regions detected by the image processing unit 105 from the image processing unit 105. In step SA002, the CPU 102 determines whether there is a face region based on the number of face regions obtained in step SA001. In other words, if the number of face regions is 0, there are no face regions, whereas when such is not the case, it is determined that there is a face region. If it is determined that there is a face region, the processing moves to step SA003, and if not, the processing moves to step SA016.

In step SA003, the CPU 102 sets an internal variable N to 1 and sets an internal variable M to 1. In step SA004, the CPU 102 obtains the coordinates of an Nth face region from the image processing unit 105. In step SA005, the CPU 102 calculates an average defocus amount in the face region identified by the coordinates obtained in step SA004. In step SA006, the CPU 102 determines whether the average defocus amount calculated in step SA005 is less than or equal to a threshold. In other words, it is determined whether the average defocus amount in the face region is less than or equal to the threshold and the image is not blurred. If the average defocus amount is determined to be less than or equal to the threshold, the processing moves to step SA007, and if not, the processing moves to step SA013.

In step SA007, the CPU 102 sets parameters of a threshold for generating a Trimap according to the average defocus amount. The threshold here is a threshold for determining the foreground region, the background region, and the unknown region. In step SA008, the CPU 102 calculates an average relative distance in the face region identified by the coordinates obtained in step SA004.

In step SA009, the CPU 102 subtracts the average relative distance calculated in step SA008 from a relative distance of each pixel in a DepthMap (e.g., the distance information obtained by the process of step S1003 in FIG. 3), thereby generating a new DepthMap. In step SA010, the CPU 102 generates an Mth Trimap based on the new DepthMap generated in step SA009.

On the other hand, if it is determined in step SA006 that the average defocus amount is greater than the threshold, in step SA013, the CPU 102 decrements the value of the internal variable M by 1.

Following the processing of step SA010 or step SA013, in step SA011, the CPU 102 determines whether there are any unprocessed face regions. In other words, if the number of face regions obtained in step SA001 matches the internal variable N, the CPU 102 determines that there are no unprocessed face regions. If there is an unprocessed face region, the processing moves to step SA012. In step SA012, the CPU 102 increments the value of the internal variable N by 1, increments the value of the internal variable M by 1, and returns the processing to step SA004.

On the other hand, if it is determined that there are no unprocessed face regions in step SA011, in step SA014, the CPU 102 determines whether the internal variable M is 0.

M=0 means that there is no face region where the average defocus amount is determined to be greater than the threshold in step SA006. This is a case when there is no need to generate a new DepthMap. If the internal variable M is determined not to be 0 in step SA014, the processing moves to step SA015.

In step SA015, the CPU 102 composites the M Trimaps generated in step SA010. This compositing is processing for generating a single Trimap by taking the logical OR of the regions determined to be the foreground region and the unknown region.

On the other hand, if the internal variable M is determined to be 0 in step SA014, or if it is determined that there is not face region in step SA002, in step SA016, the CPU 102 generates a Trimap based on the DepthMap.

As described above, according to Embodiment A0, a Trimap that takes each subject as a foreground region can be generated when there are a plurality of subjects in the image.

Embodiment A1

In Embodiment A0, there is a problem in that the processing for generating the same number of Trimaps as there are detected subjects takes a long time. In light of this problem, the present embodiment will describe processing for generating a Trimap with all subjects set as the foreground region, without generating a plurality of Trimaps, even when there are a plurality of subjects.

The Trimap generation processing according to Embodiment A1 will be described next with reference to the flowcharts in FIGS. 58A and 58B. In the flowcharts in FIGS. 58A and 58B, steps that perform the same processing as in FIGS. 57A and 57B are assigned the same reference signs are in FIGS. 57A and 57B, and will not be described.

Figure 58A:
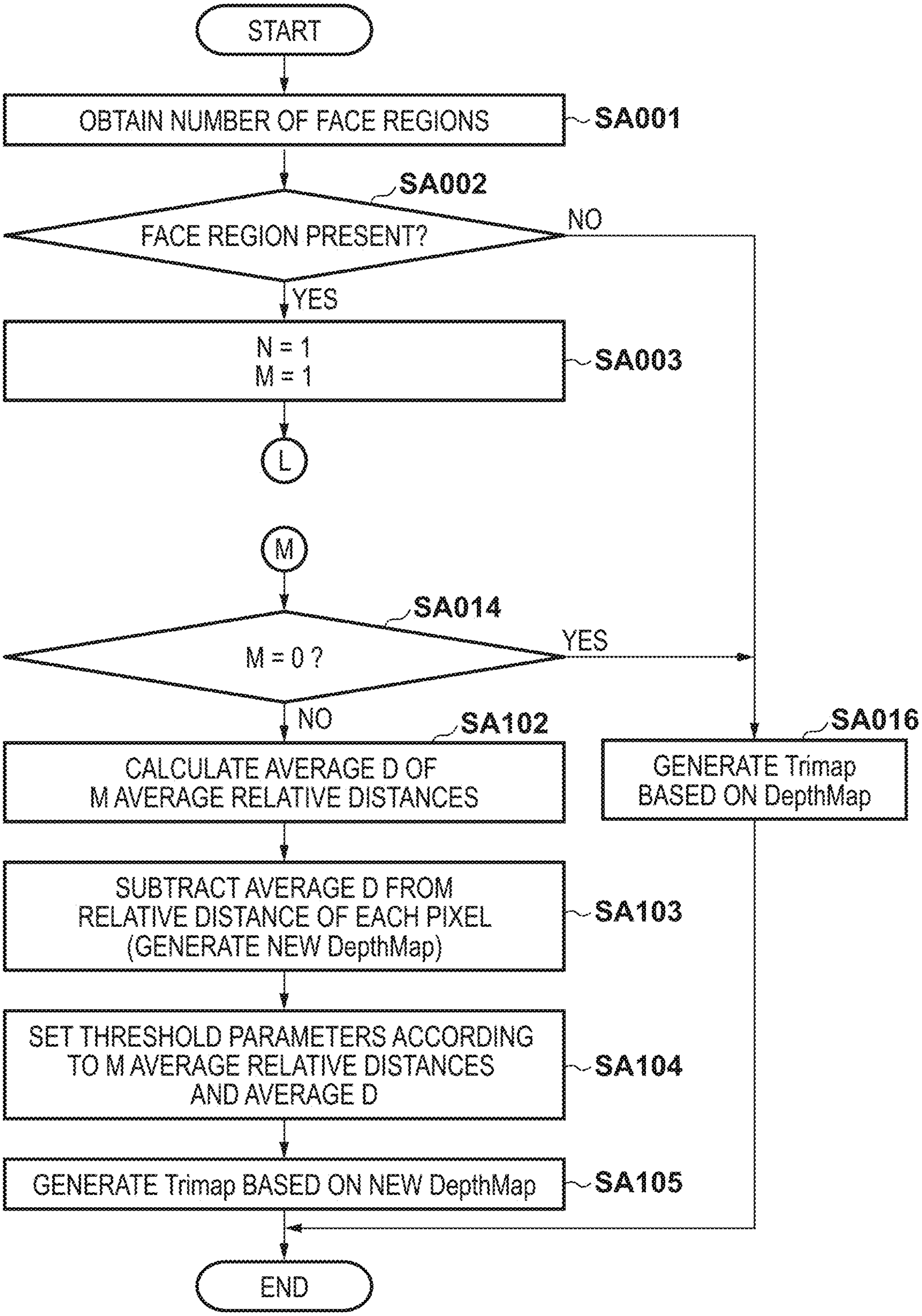
FIG. 58A is a flowchart illustrating Trimap generation processing according to Embodiment A1.
Figure 58B:
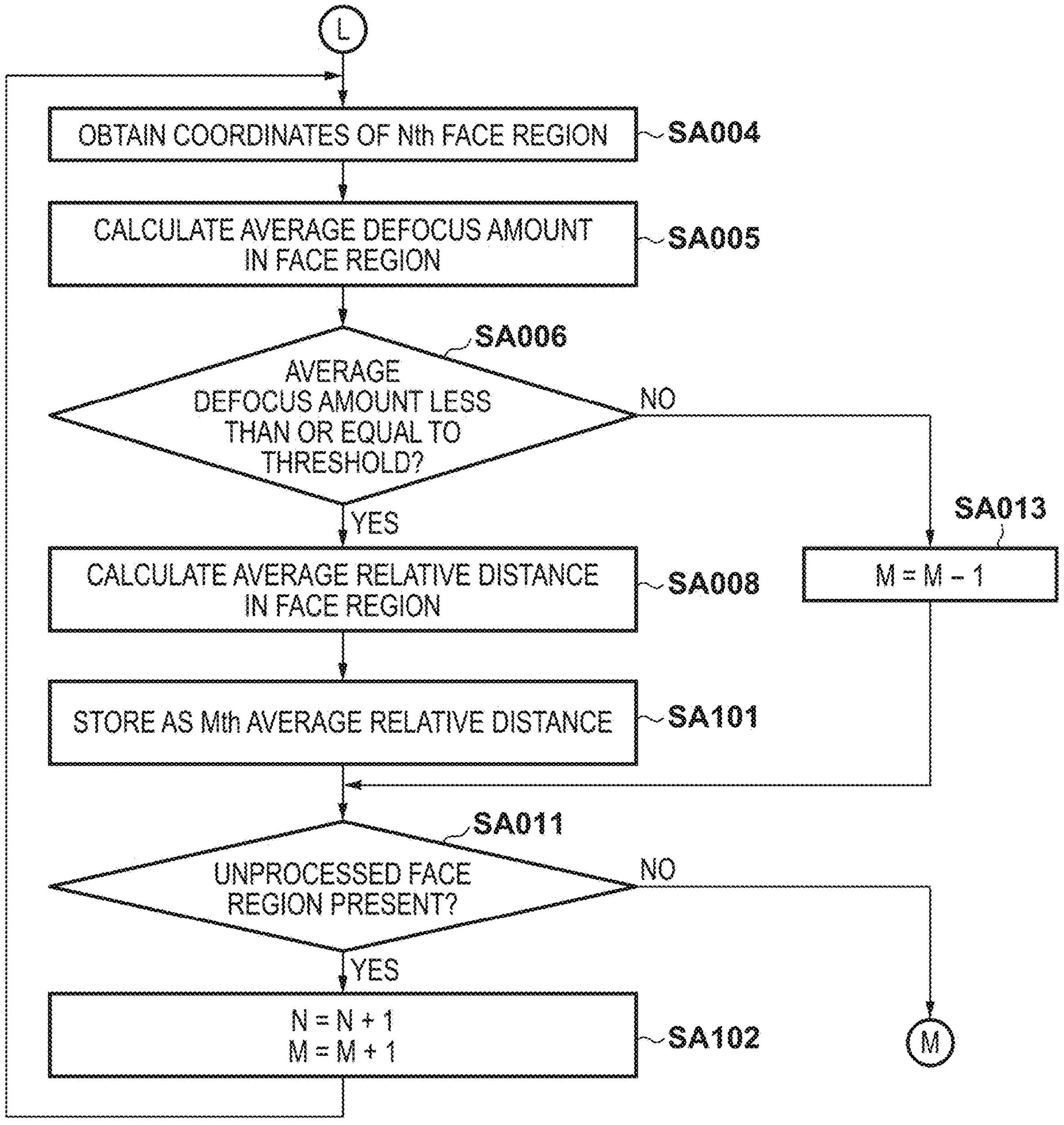
FIG. 58B is a flowchart illustrating the Trimap generation processing according to Embodiment A1.

First, the processing of step SA001 to step SA008 is the same as in FIGS. 58A and 58B and will therefore not be described. However, there is no step SA007, and if a determination of "yes" is in step SA006, the processing moves to step SA008. The processing then moves to step SA101.

In step SA101, the CPU 102 stores the average calculated in step SA008 in the RAM 104 as an average of the Mth relative distance. The following processes from step SA011 to step SA014 are the same as in FIGS. 58A and 58B, and will therefore not be described.

Next, in step SA102, the CPU 102 calculates an average D of the averages of M relative distances stored in the RAM 104. In step SA103, the CPU 102 generates a new DepthMap by subtracting the average D calculated in step SA102 from the relative distance of each pixel. In step SA104, the CPU 102 sets parameters for the threshold of the unknown region determination processing according to the average of the M relative distances stored in the RAM 104 and the average D calculated in step SA102. In step SA105, the CPU 102 generates a Trimap based on the new DepthMap.

As described above, according to Embodiment A1, when there are a plurality of subjects in the image, a Trimap that takes each subject as a foreground region can be generated.

Embodiment A2

Embodiment A1 has a problem in that when there is some object between subjects, what should originally be the background region is recognized as the foreground region. In light of this problem, the present embodiment will described processing for generating a Trimap by setting parts which may be taken as background regions to be background regions when there is an object between the subjects, even when there are a plurality of subjects.

Figure 59A:
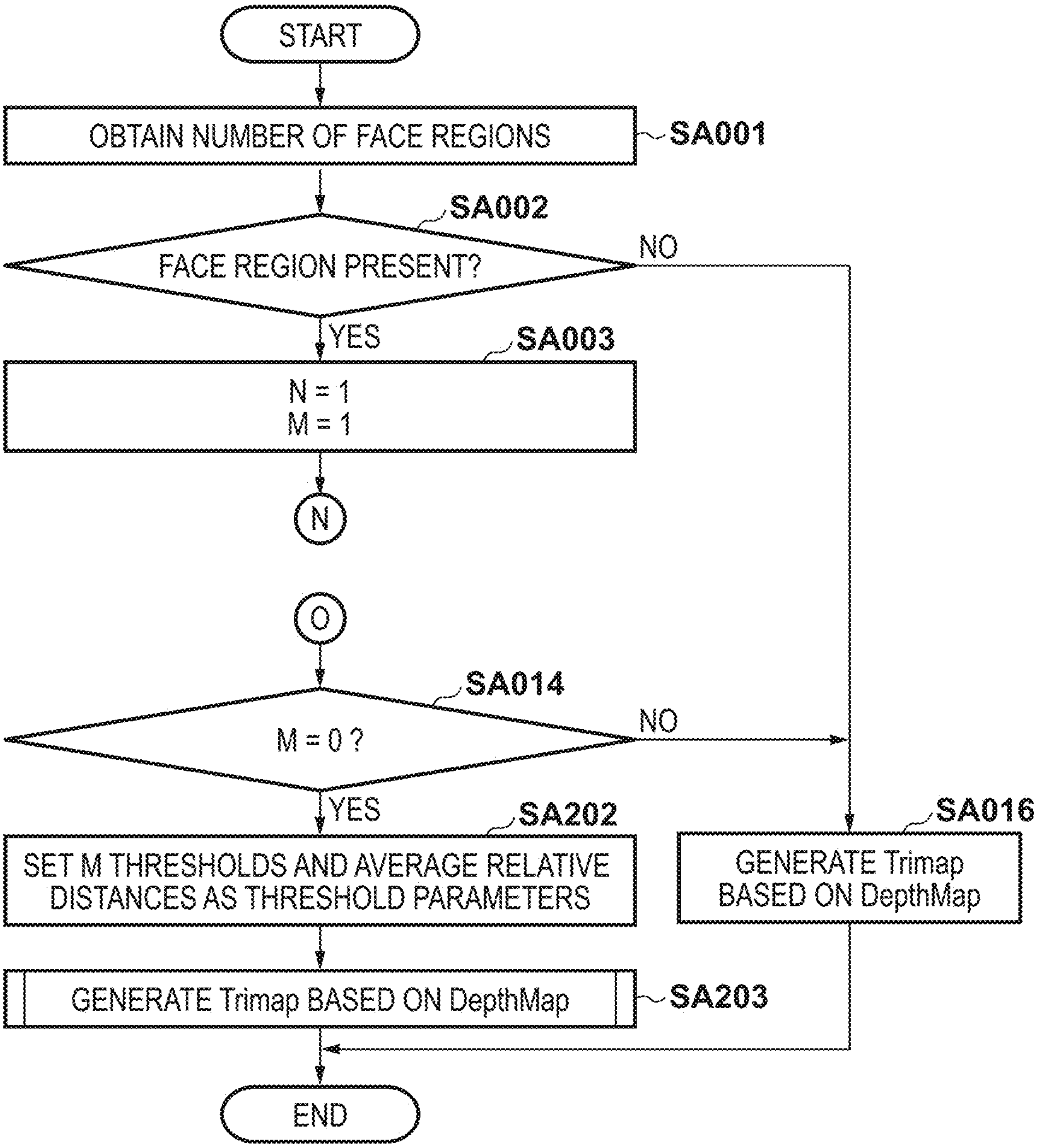
FIG. 59A is a flowchart illustrating Trimap generation processing according to Embodiment A2.
Figure 59B:
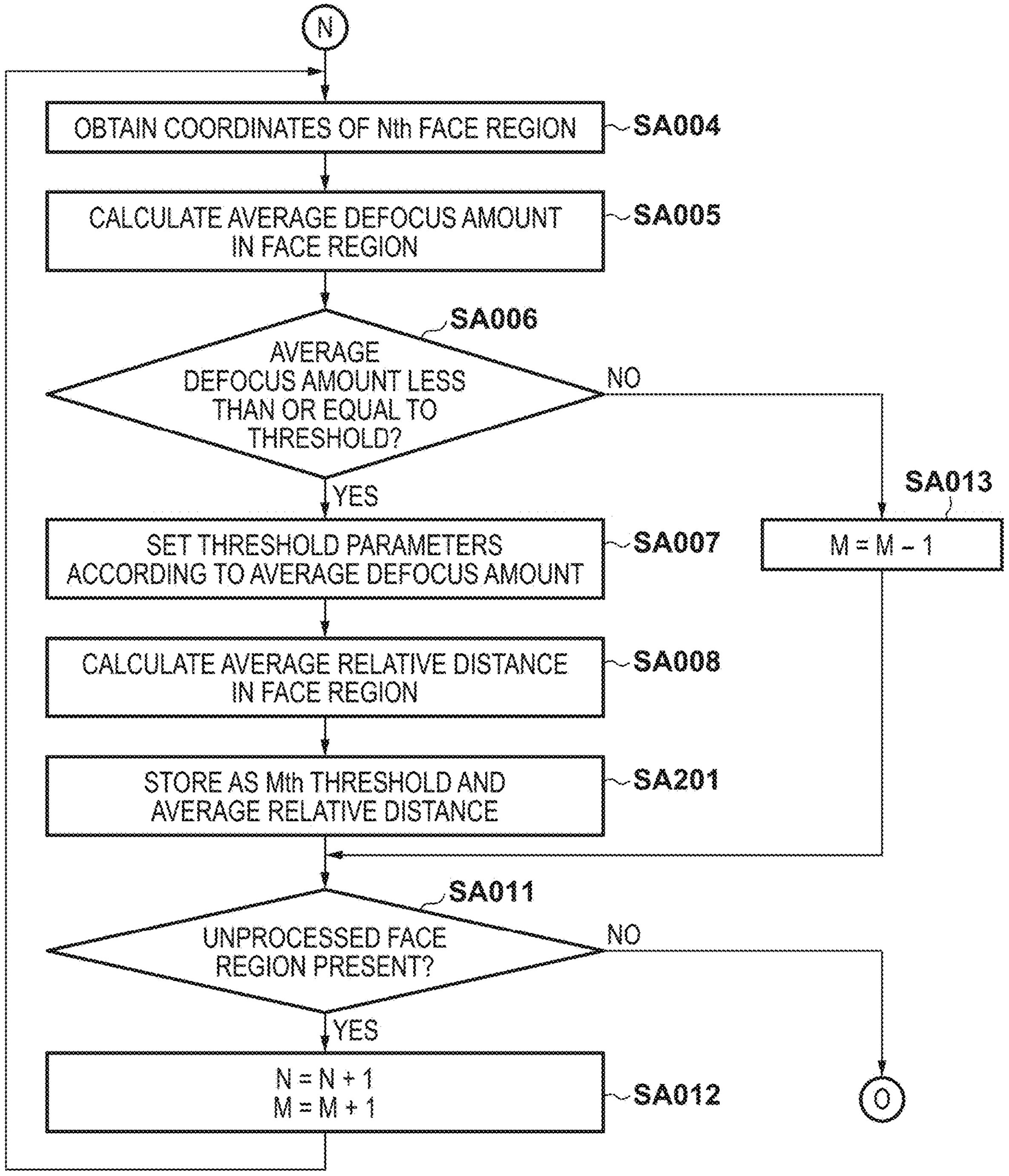
FIG. 59B is a flowchart illustrating the Trimap generation processing according to Embodiment A2.

The Trimap generation processing according to Embodiment A2 will be described next with reference to the flowcharts in FIGS. 59A and 59B. In the flowcharts in FIGS. 59A and 59B, steps that perform the same processing as in FIGS. 57A and 57B are assigned the same reference signs are in FIGS. 57A and 57B, and will not be described.

Figure 57A:
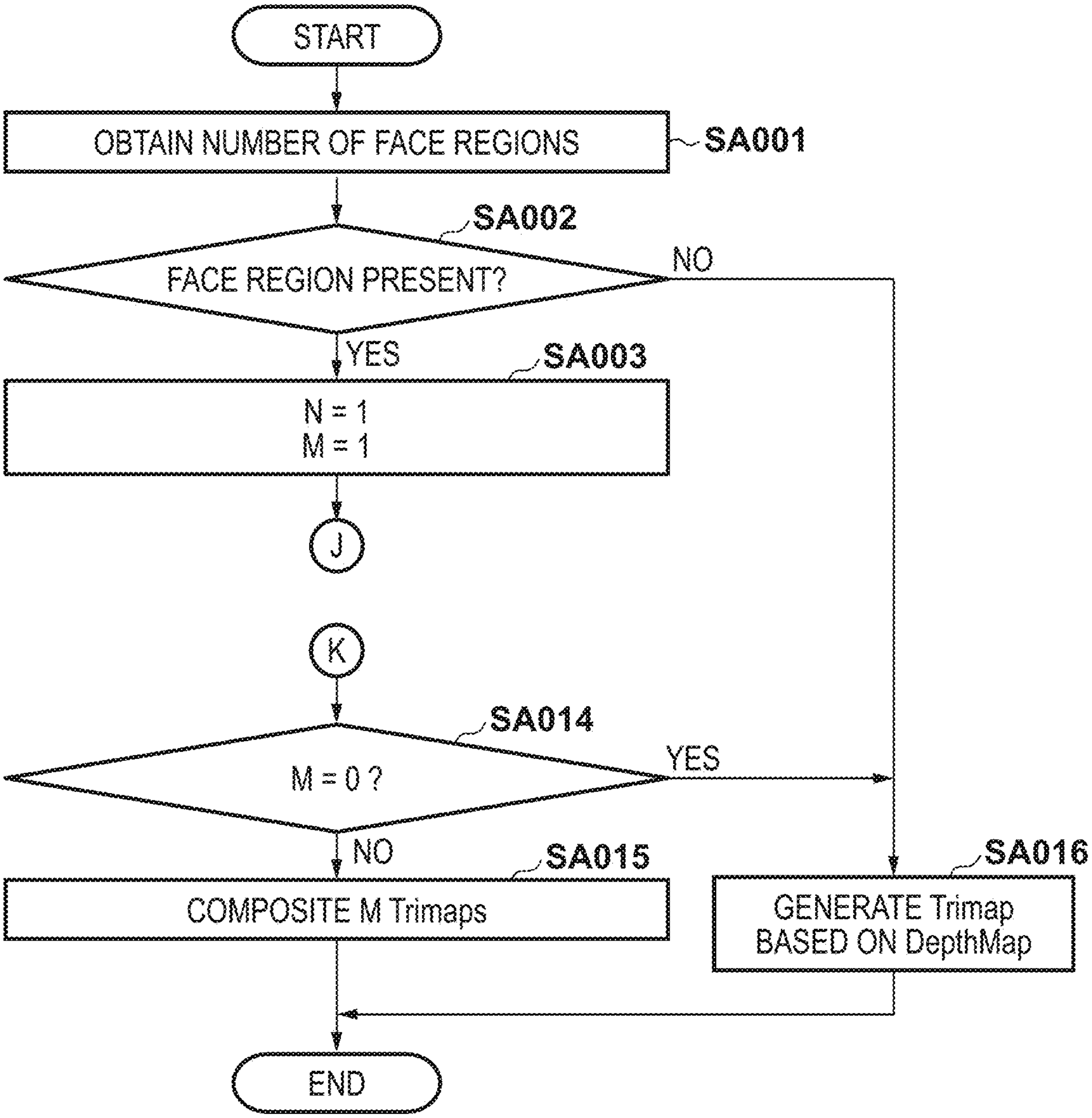
FIG. 57A is a flowchart illustrating Trimap generation processing according to Embodiment A0.
Figure 57B:
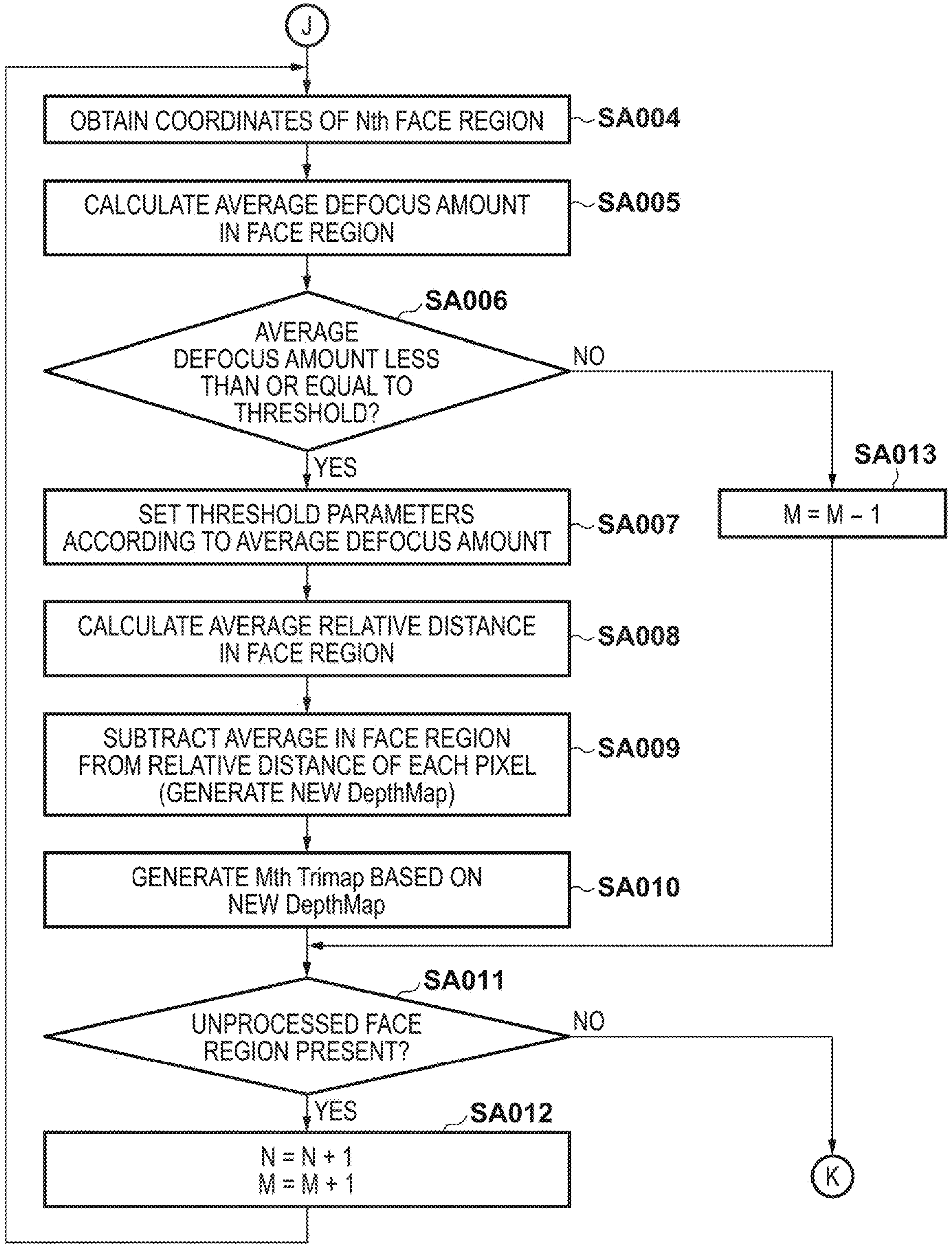
FIG. 57B is a flowchart illustrating the Trimap generation processing according to Embodiment A0.

First, the order of the flow from step SA001 to step SA008 is the same as in FIG. 57, and will therefore not be described here. After the process of step SA008, in step SA201, the CPU 102 stores the parameters of the threshold for the unknown region determination processing set in step SA007 and the average of the relative distance calculated in step SA008 in the RAM 104 as an Mth threshold and the average of the relative distances. The following processing from step SA011 to step SA014 are the same as in FIGS. 57A and 57B, and will therefore not be described.

Next, in step SA202, the CPU 102 sets the M thresholds stored in the RAM 104 and the average of the relative distances as parameters for the threshold. In step SA203, the CPU 102 generates a Trimap using the DepthMap and the parameters set in step SA202. The processing performed in step SA203 will be described in detail later with reference to FIG. 60.

Figure 60:
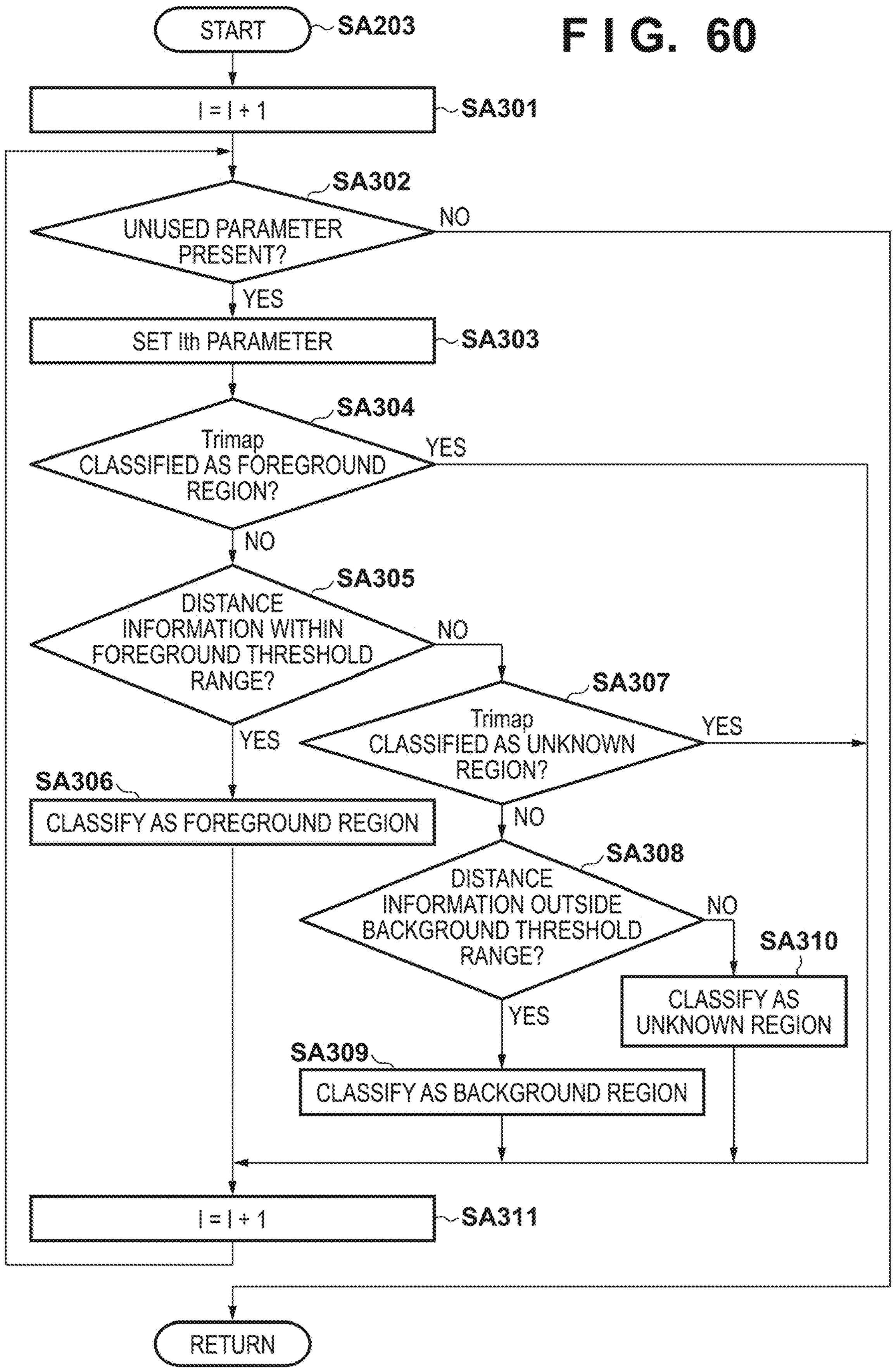
FIG. 60 is a flowchart illustrating details of the processing of step SA203 according to Embodiment A2.

Next, the processing of step SA203 will be described in detail with reference to the flowchart shown in FIG. 60. First, in step SA301, the CPU 102 sets the value of the internal variable I, which determines which threshold parameter is set, to 1. In step SA302, the CPU 102 determines whether there are any unused parameters. In other words, the CPU 102 determines whether the value of the internal variable I exceeds the internal variable M. If it is determined that there are unused parameters, the processing moves to step SA303.

Next, in step SA303, the CPU 102 sets the parameters of an Ith threshold. In step SA304, the CPU 102 determines whether the Trimap data in the process of being generated is data classified as a foreground region. If it is determined that the data is not classified as a foreground region, the processing moves to step SA305.

In step SA305, the CPU 102 determines whether the distance information to the subject is within the range of the foreground threshold determined in step SA303. If this information is determined to be within the range of the foreground threshold, the processing moves to step SA306. In step SA306, the CPU 102 classifies a region for which the distance information is determined to be within the range of the foreground threshold in step SA305 as a foreground region, and performs processing for replacing the Trimap data of that region with the foreground threshold data.

On the other hand, if the information is determined to be outside the range of the foreground threshold in step SA305, the processing moves to step SA307. In step SA307, the CPU 102 determines whether the Trimap data in the process of being generated is data classified as an unknown region. If it is determined that the data is not classified as an unknown region, the processing moves to step SA308.

In step SA308, the CPU 102 determines whether the distance information to the subject is outside the range of the background threshold determined in step SA303. If the information is determined to be outside the range of the background threshold, the processing moves to step SA309. In step SA309, the CPU 102 classifies a region for which the distance information is determined to be outside the range of the background threshold in step SA308 as a background region, and performs processing for replacing the Trimap data of that region with the background threshold data.

On the other hand, if the information is determined to be within the range of the background threshold in step SA308, the processing moves to step SA310. In step SA310, the CPU 102 classifies a region for which the distance information is determined to be within the range of the background threshold in step SA308 as an unknown region, and performs processing for replacing the Trimap data of that region with the unknown region data.

On the other hand, if it is determined that the data is classified as an unknown region in step SA307, the processing moves to step SA311. Additionally, if it is determined that the Trimap data is classified as a foreground region in step SA304, the processing moves to step SA311.

In step SA311, the CPU 102 increments the value of the internal variable I by 1, and returns the processing to step SA302.

On the other hand, if it is determined that there are no unprocessed parameters in step SA302, the processing of this flowchart ends.

As described above, according to Embodiment A2, when there are a plurality of subjects in the image and an object is present between the subjects, the object can be taken as a background region, and a Trimap can be generated with only the subject as the foreground region.

Embodiment B0

The present embodiment will describe an example in which when a plurality of subjects located at the same distance are shot, a Trimap that displays only a predetermined subject by changing the distance information outside a selected region is generated. The "predetermined subject" refers to a subject which the user wishes to display as a Trimap, and will be called a "subject of interest".

Figure 62:
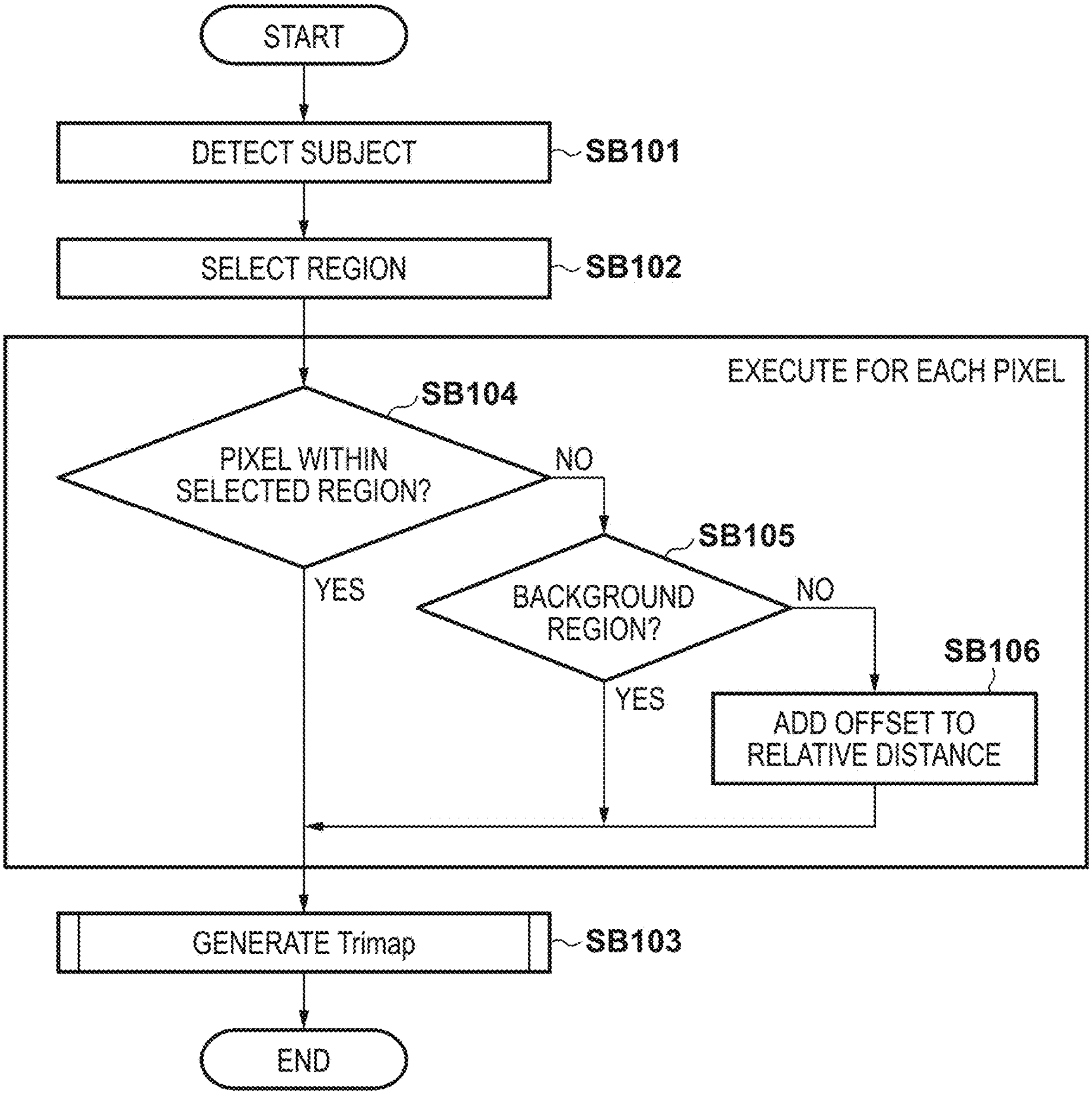
FIG. 62 is a flowchart illustrating Trimap generation processing according to Embodiment B0.

FIG. 62 is a flowchart of processing for detecting a subject and displaying only the subject of interest as a Trimap by adding an offset value to the distance information outside the region of the subject of interest. Each process in this flowchart is realized by the CPU 102 loading a program stored in the ROM 103 into the RAM 104 and executing that program.

In step SB101, the CPU 102 controls the object detection unit 115 to detect a subject in the image processed by the image processing unit 105. In the present embodiment, the processing for detecting a subject, performed by the object detection unit 115, is processing that outputs coordinate data as a processing result, and is deep learning or the like using a neural network called step Single Shot Multibox Detector (SSD), You Only Look Once (YOLO), or the like, for example. Based on the coordinate data obtained from the object detection unit 115, the CPU 102 superimposes a detection region, which indicates the region of the detected subject, onto the image processed by the image processing unit 105, and displays the resulting image in the display unit 114.

Figure 61A:
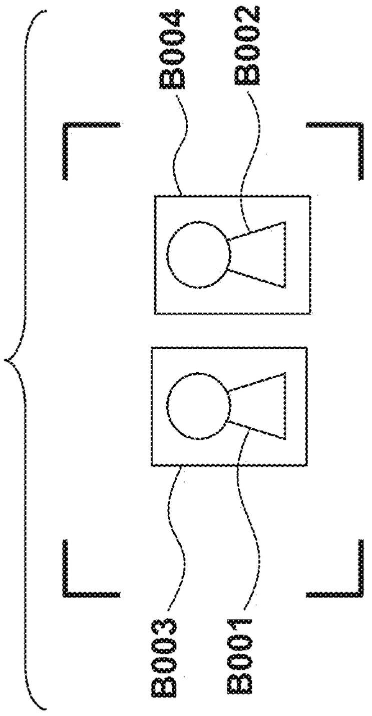
FIGS. 61A to 61D are diagrams illustrating examples of captured images and Trimaps according to Embodiment B0 to Embodiment B2.

FIG. 61A is a diagram illustrating an example of a first detection region B003 and a second detection region B004 displayed in the display unit 114 for a first subject B001 and a second subject B002 detected in step SB101.

In step SB102, the user selects a detection region. Various selection methods may be employed here. For example, the user may select the detection region using a directional key of the operation unit 113 or the like. If the display unit 114 is a touch panel, a method in which the user makes the selection by directly touching a displayed detection region may be employed. Note that the number of selections is not limited to one. Based on the result of the selection made by the user, the CPU 102 superimposes the selected region, which indicates the detection region of the subject of interest, on the image processed in step SB101, and display the resulting image in the display unit 114. The selected region displayed is displayed using a bolder frame than the detection region, for example.

Figure 61B:
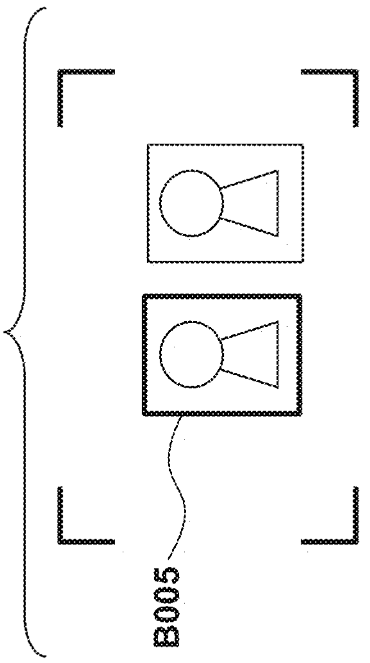

FIG. 61B is a diagram illustrating an example of a selected region B005 displayed in the display unit 114, corresponding to a case where the first subject B001 is the subject of interest in step SB102.

In step SB104, the CPU 102 determines, for each pixel of the image, whether the pixel is in the selected region. Specifically, the CPU 102 determines the coordinate positions of the selected region based on the coordinate data obtained from the object detection unit 115, and if the coordinate position of each pixel is within the range of the coordinate positions of the selected region, determines that that pixel is in the selected region. If the pixel is in the selected region, the processing moves to step SB103, and if not, the processing moves to step SB105.

In step SB105, the CPU 102 determines, for each pixel of the image, whether the pixel is in the background region. The classification of the foreground region, the background region, and the unknown regions uses the same processing as that described in Embodiment 10, and will therefore not be described here. If the pixel is in the background region, the processing moves to step SB103, and if not, the processing moves to step SB106.

In step SB106, the CPU 102 adds a predetermined offset value to the distance information (relative distance) corresponding to a pixel outside the selected region. The offset value is the value at which the pixel is determined to be in the background region after the addition. Specifically, for example, if the range of the distance information is 0 to 255 and the range of 127 to 255 is determined to be the background region, if 255 is provided as the offset value, all pixels outside the selected region will be determined to be in the background region. Note that when adding the offset value to the distance information, it is assumed that a limit is provided at a value of 255 to prevent overflow.

In step SB103, the CPU 102 generates the Trimap by performing the same processing as step S1003 to step S1008 described in Embodiment 10. The CPU 102 loads the generated Trimap into the frame memory 111, and outputs the Trimap to the display unit 114, the image terminal 109, or the network terminal 108. Note that the CPU 102 may record the Trimap into the recording medium 112.

Figure 61C:
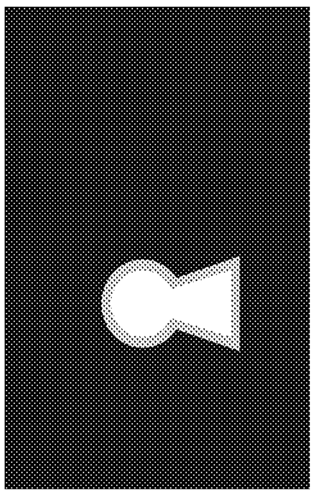

FIG. 61C is a diagram illustrating an example of the Trimap that is ultimately generated in the present embodiment.

As described above, according to the present embodiment, when shooting a plurality of subjects located at the same distance, a Trimap can be generated in which subjects aside from a subject of interest are not included in the foreground region, and only the subject of interest is displayed.

Embodiment B1

An example of generating a Trimap that displays only a subject of interest by changing the distance information outside the selected region was described with reference to FIG. 62. However, an example of changing the color data of the Trimap outside the selected region is conceivable as another embodiment.

The present embodiment will describe an example in which when a plurality of subjects located at the same distance are shot, a Trimap that displays only a subject of interest by changing the color data of the Trimap outside a selected region is generated.

Figure 63:
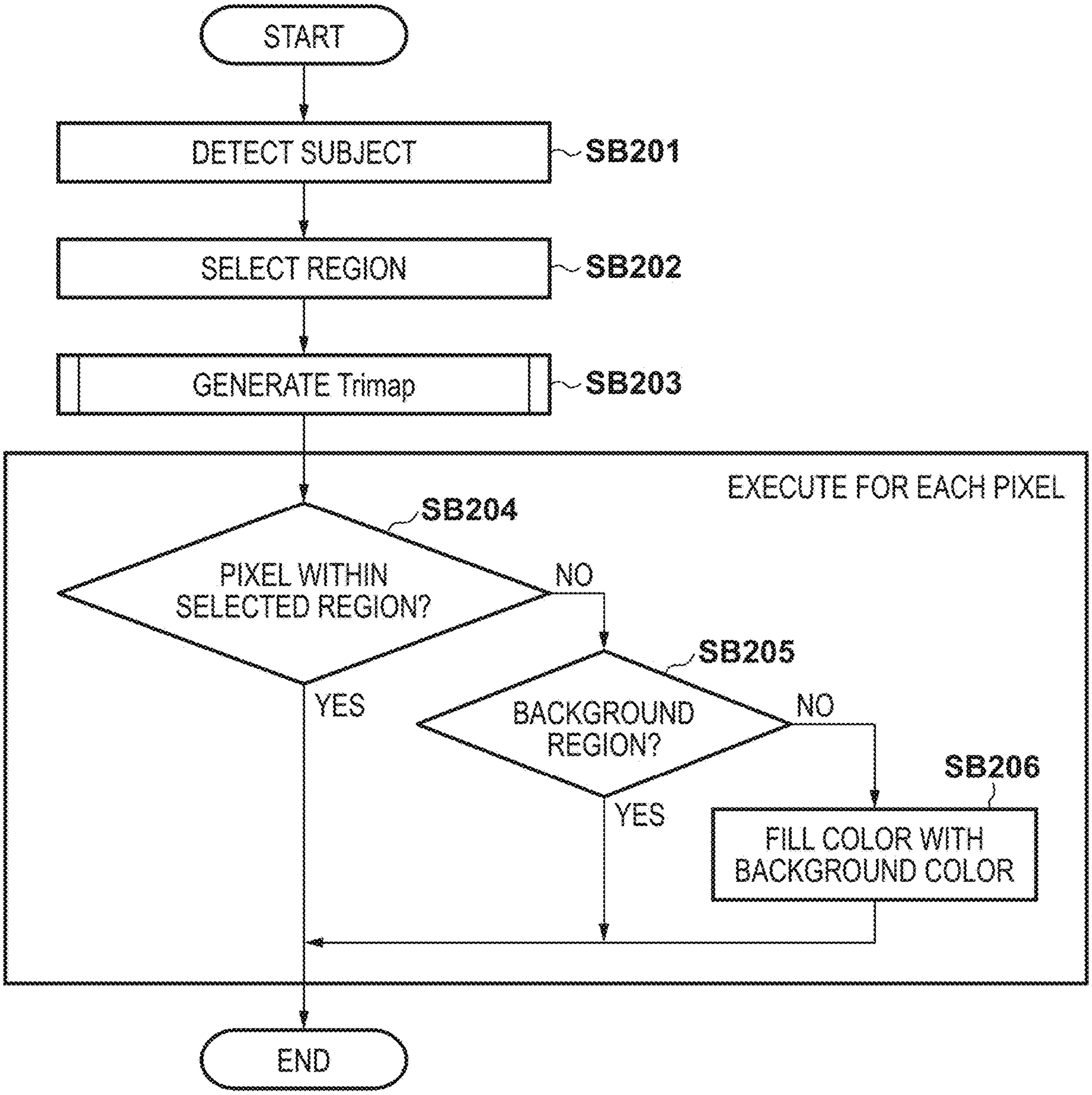
FIG. 63 is a flowchart illustrating Trimap generation processing according to Embodiment B1.

FIG. 63 is a flowchart of processing for detecting a subject and displaying only the subject of interest as a Trimap by filling the color data of the Trimap outside the region of the subject of interest with a color corresponding to the background region. Each process in this flowchart is realized by the CPU 102 loading a program stored in the ROM 103 into the RAM 104 and executing that program. The processing of step SB201 to step SB203 in FIG. 63 is the same as step SB101 to step SB103 in FIG. 62 described in Embodiment B0, and will therefore not be described.

In step SB204, the CPU 102 determines, for each pixel of the Trimap, whether the pixel is in the selected region. The determination processing is the same as the processing of step SB104 in FIG. 62 described in Embodiment B0, and will therefore not be described. If the pixel is in the selected region, the CPU 102 ends the processing of this flowchart, and if not, the CPU 102 moves the processing to step SB205.

In step SB205, the CPU 102 determines, for each pixel of the Trimap, whether the pixel is in the background region. The classification of the foreground region, the background region, and the unknown regions uses the same processing as that described in Embodiment 10, and will therefore not be described here. If the pixel is in the background region, the CPU 102 ends the processing of this flowchart, and if not, the CPU 102 moves the processing to step SB206.

In step SB206, the CPU 102 fills the color data of each pixel outside the selected region with a predetermined color corresponding to the background region. Specifically, for example, if the color corresponding to the background region is black, the CPU 102 fills the color data of the pixels outside the selected region with black.

The CPU 102 loads the processed Trimap into the frame memory 111, and outputs the Trimap to the display unit 114, the image terminal 109, or the network terminal 108. Note that the CPU 102 may record the Trimap into the recording medium 112. FIG. 61C illustrates an example of the Trimap that is ultimately generated in the present embodiment.

As described above, according to the present embodiment, a Trimap that displays only the subject of interest can be generated without changing the distance information.

Embodiment B2

An example of generating a Trimap that displays only a subject of interest by changing the color data of the Trimap outside the selected region was described with reference to FIG. 63. However, an example of changing the color data of the Trimap within the selected region is conceivable as another embodiment.

The present embodiment will describe an example in which when a plurality of subjects located at the same distance are shot, a Trimap that displays only a subject of interest by changing the color data of the Trimap within a selected region is generated.

Figure 64:
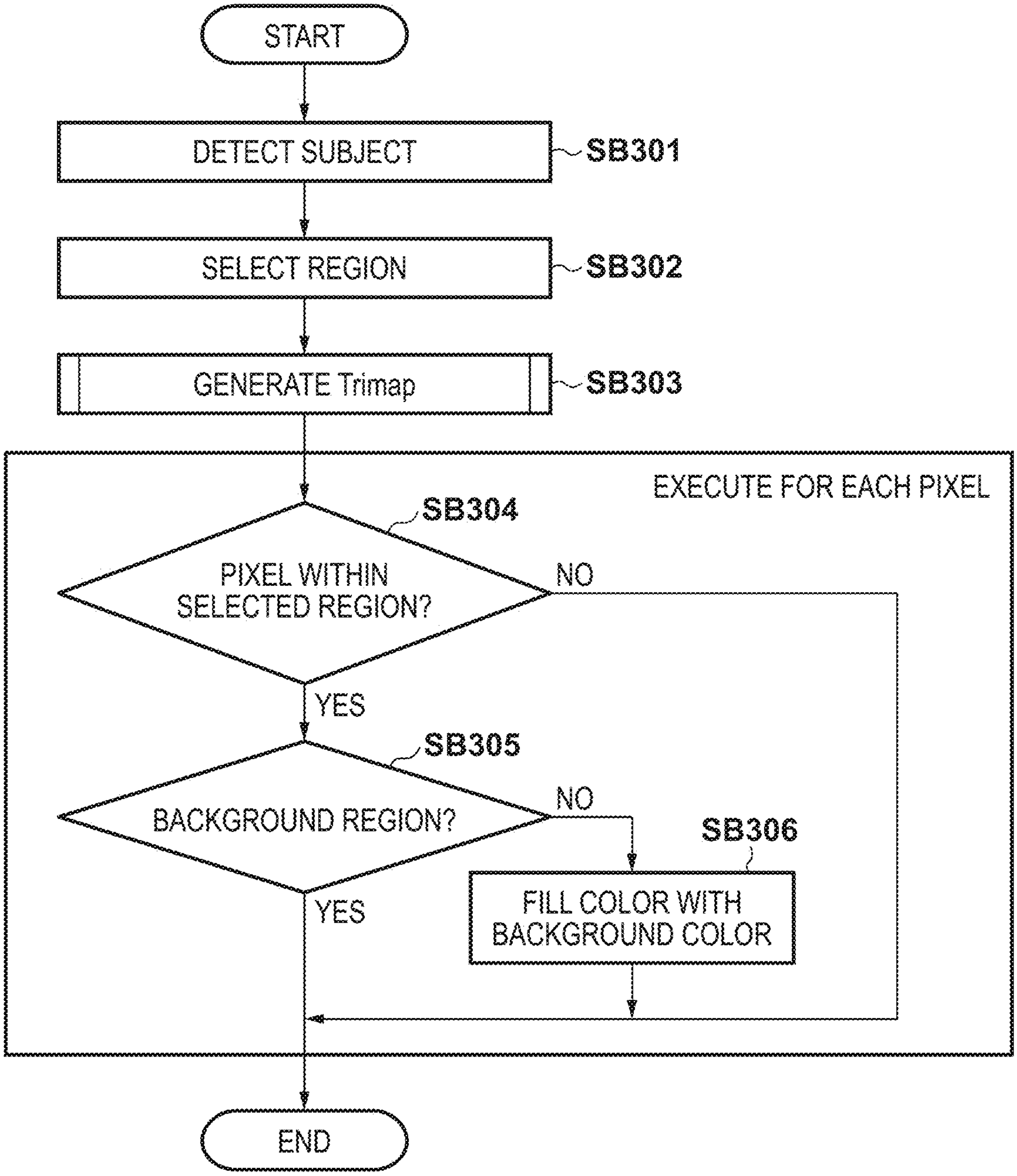
FIG. 64 is a flowchart illustrating Trimap generation processing according to Embodiment B2.

FIG. 64 is a flowchart of processing for detecting a subject and displaying only the subject of interest as a Trimap by filling the color data of the Trimap within a region of a subject aside from the subject of interest with a color corresponding to the background region. Each process in this flowchart is realized by the CPU 102 loading a program stored in the ROM 103 into the RAM 104 and executing that program. The processing of step SB301 to step SB303 in FIG. 64 is the same as step SB101 to step SB103 in FIG. 62 described in Embodiment B0, and will therefore not be described. However, in the present embodiment, the selected region represents a detection region aside from the subject of interest. Accordingly, in step SB302, unlike step SB102, the user selects a subject aside from the subject of interest.

Figure 61D:
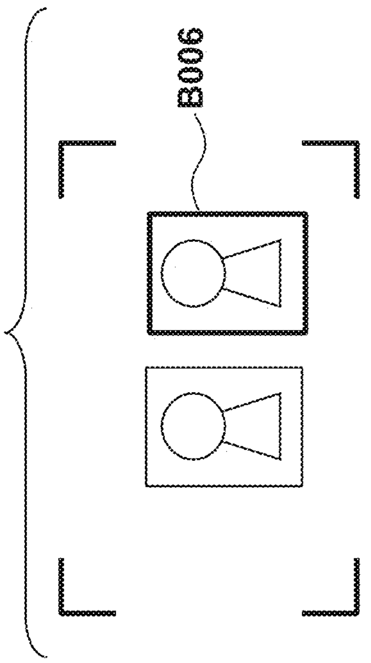

FIG. 61D is a diagram illustrating an example of a selected region B006 displayed in the display unit 114, in a case where the first subject B001 is the subject of interest in step SB302.

In step SB304, the CPU 102 determines, for each pixel of the Trimap, whether the pixel is in the selected region. The determination method is the same as the processing of step SB104 in FIG. 62 described in Embodiment B0, and will therefore not be described. If the pixel is in the selected region, the processing moves to step SB305, and if not, the processing of this flowchart ends.

In step SB305, the CPU 102 determines, for each pixel of the Trimap, whether the pixel is in the background region. The classification of the foreground region, the background region, and the unknown regions uses the same processing as that described in Embodiment 10, and will therefore not be described here. If the pixel is in the background region, the CPU 102 ends the processing of this flowchart, and if not, the CPU 102 moves the processing to step SB306.

In step SB306, the CPU 102 fills the color data of each pixel within the selected region with a predetermined color corresponding to the background region. Note that the details of this processing are the same as step SB206 in FIG. 63 described in Embodiment B1, and will therefore not be described.

The CPU 102 loads the processed Trimap into the frame memory 111, and outputs the Trimap to the display unit 114, the image terminal 109, or the network terminal 108. Note that the CPU 102 may record the Trimap into the recording medium 112. FIG. 61C illustrates an example of the Trimap that is ultimately generated in the present embodiment.

As described above, according to the present embodiment, a Trimap that displays only the subject of interest can be generated without displaying anything outside the selected region.

Embodiment C0

Outputting using Serial Digital Interface (SDI) is one method for outputting the generated Trimap to the exterior. As a method for superimposing the Trimap data on SDI, it is conceivable to convert the data into ancillary packets and multiplex those packets with an ancillary data region. Trying to generate data by packing the Trimap data efficiently may result in prohibited code. In light of the above problem, the present embodiment will describe processing for mapping data such that the data does not become prohibited code.

Figure 65:
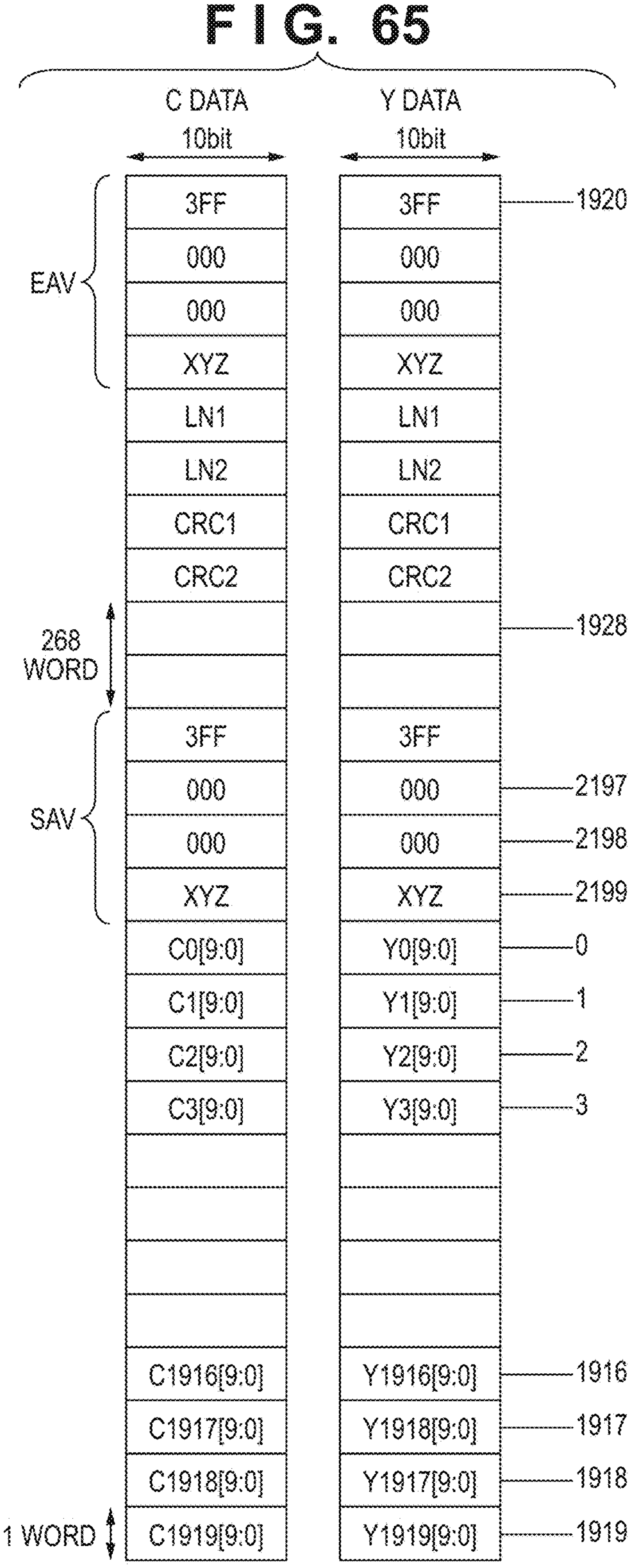
FIG. 65 is a diagram illustrating an SDI data structure according to Embodiment C0.
Figure 66:
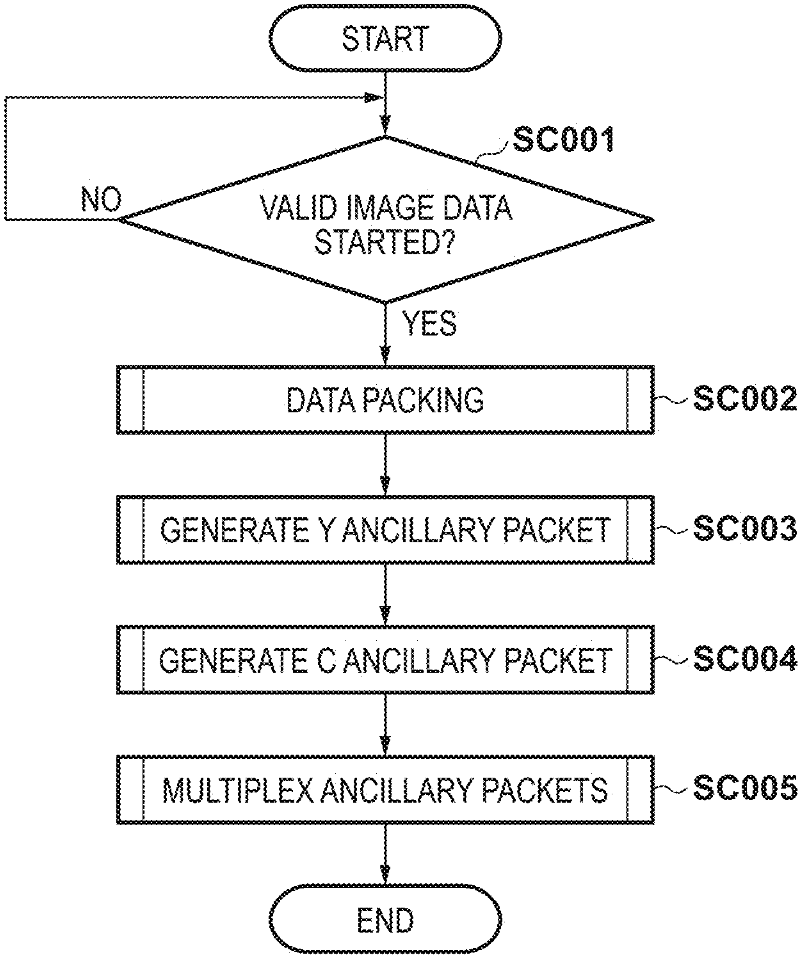
FIG. 66 is a flowchart illustrating stream generation processing according to Embodiment C0.

FIG. 65 illustrates the structure of an HD-SDI data stream when the framerate is 29.97 fps. In the present embodiment, the image processing apparatus 100 transmits moving image data according to the SDI standard. Specifically, the image processing apparatus 100 allocates each instance of pixel data in accordance with SMPTE ST 292-1. FIG. 65 illustrates a data stream in which one line's worth of Y data is multiplexed, and a data stream in which C data is multiplexed. The data stream has 1,125 lines in a single frame. The Y data and C data are constituted by 2,200 words, with each word being 10 bits. The number of bits in one word may be N bits (N≥10). Starting at the 1,920th word, the data is multiplexed with an identifier EAV for recognizing a break position of the image signal, followed by a Line Number (LN) and Cycle Redundancy Check Code (CRCC) data for transmission error checking. Then, a data region where ancillary data may be multiplexed continues for 268 words, and an identifier SAV for recognizing the break position of the image signal, in the same manner as EAV, is multiplexed. Then, 1,920 words of image data are multiplexed and transmitted. As the framerate changes, the number of words in one line changes as well, and the number of words in the data region where ancillary data can be multiplexed changes.

Stream generation processing according to Embodiment C0 will be described next with reference to the flowcharts in FIGS. 66, 67A, 67B, 68A, 68B, and 69. In the flowchart in FIG. 66, in step SC001, the CPU 102 determines whether a line in which valid image data is started has been reached. For example, for a progressive image, the line 42 is the starting line of the valid image, and the valid image continues until the line 1,121. For an interlaced image, the valid image data of the first field is from line 21 to line 560, and the valid image data of the second field is from line 584 to line 1,123. If it is determined that the line where the valid image data starts has been reached, the processing moves to step SC002. On the other hand, if the valid image data has not started, the CPU 102 waits until the valid image data starts.

In step SC002, the CPU 102 packs the Trimap data into data in which one word has 10 bits. The packing processing will be described in detail later. In step SC003, the CPU 102 generates a Y ancillary packet to be multiplexed with the Y data stream. In step SC004, the CPU 102 generates a C ancillary packet to be multiplexed with the C data stream. The processing for generating the Y ancillary packet and the C ancillary packet will be described in detail later. In step SC005, the CPU 102 multiplexes the Y ancillary packet and the C ancillary packet with the data stream. The ancillary packet multiplexing processing will be described in detail later. The processing in the flowchart in FIG. 66 corresponds to the processing of one frame or one field, and this processing is repeated for each frame or each field.

Processing for packing the Trimap data into data having 10 bits for one word will be described next with reference to the flowcharts in FIGS. 67A and 67B. In step SC101, the CPU 102 sets an internal variable L to 1. In step SC102, the CPU 102 sets an internal variable P to 0. In step SC103, the CPU 102 sets the internal variable I to 0. In step SC104, the CPU 102 sets an internal variable W to 0.

In step SC105, the CPU 102 determines whether the Trimap data of a Pth pixel is white data. In other words, the CPU 102 determines whether the Trimap data is 0x00. If the Trimap data is determined to be white data in step SC105, the processing moves to step SC106, and if not, the processing moves to step SC109.

In step SC106, the CPU 102 determines whether the value of the internal variable P is an even number. If the value is determined to be an even number, the processing moves to step SC107. In step SC107, the CPU 102 sets the white data to 0x00.

On the other hand, if the internal variable P is determined not to be an even number in step SC106, the processing moves to step SC108. In step SC108, the CPU 102 sets the white data to 0x11.

In step SC109, the CPU 102 assigns the Trimap data to the I and I+1 bits of a Wth word.

In step SC110, the CPU 102 determines whether the internal variable I is 8. If the internal variable I is determined to be 8, the processing moves to step SC111. In step SC111, the CPU 102 sets the internal variable I to 0. In step SC112, the CPU 102 increments the internal variable W by 1.

On the other hand, if the internal variable I is determined not to be 8 in step SC110, the processing moves to step SC113. In step SC113, the CPU 102 increments the internal variable I by 2.

Next, in step SC114, the CPU 102 determines whether the current pixel (the Pth pixel) is the final pixel. In other words, the number of pixels in the valid image is 1,920, and thus the CPU 102 determines whether the internal variable P is 1919. If it is determined in step SC114 that the pixel is not the final pixel, the processing moves to step SC115. In step SC115, the CPU 102 increments the value of the internal variable P by 1, and returns the processing to step SC105.

On the other hand, if it is determined in step SC114 that the pixel is the final pixel, the processing moves to step SC116. In step SC116, the CPU 102 stores the one line's worth of word data in which the Trimap data is packed in the RAM 104. In step SC117, the CPU 102 determines whether the current line (an Lth line) is the final line. For example, for a progressive image, the number of valid image lines is 1,080, and thus the CPU 102 determines whether the internal variable L is 1,080. If it is determined that the line is not the final line, the processing moves to step SC118. In step SC118, the CPU 102 increments the value of the internal variable L by 1, and returns the processing to step SC102.

On the other hand, if the line is determined to be the final line in step SC117, the processing of this flowchart ends.

Figure 67A:
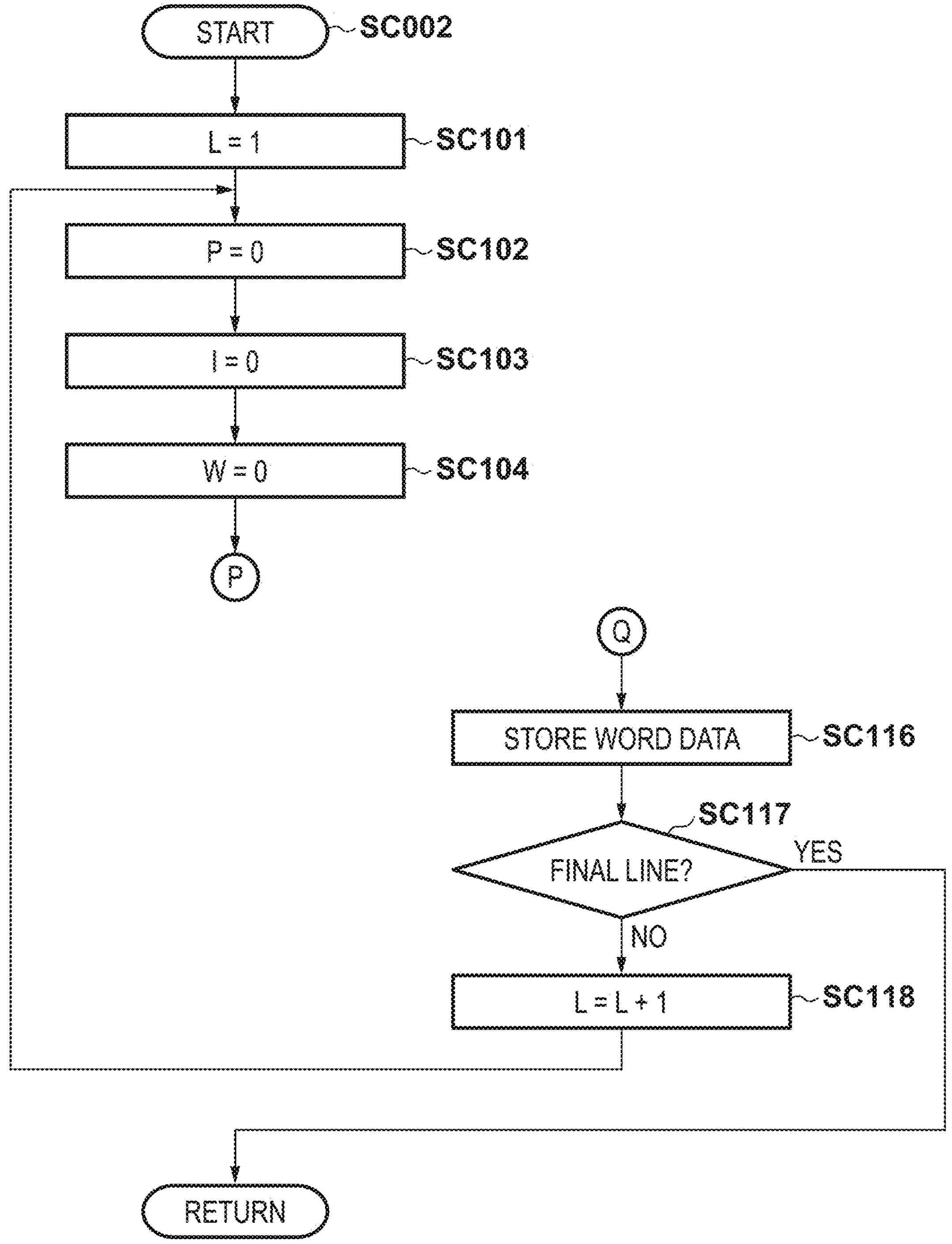
FIG. 67A is a flowchart illustrating details of the processing of step SC002 according to Embodiment C0.
Figure 67B:
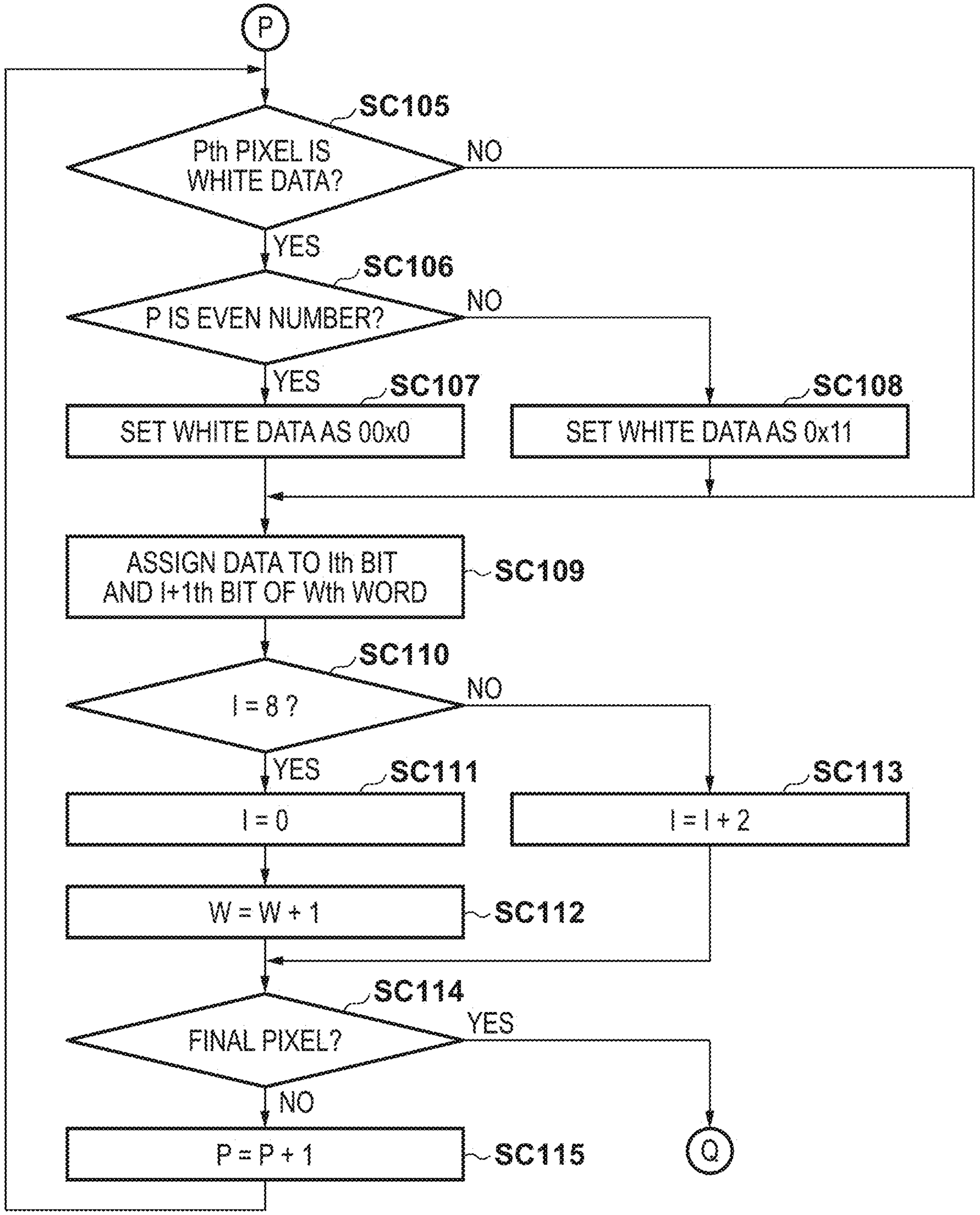
FIG. 67B is a flowchart illustrating details of the processing of step SC002 according to Embodiment C0.

FIGS. 70A and 70B illustrate the data structure generated by the processing of the flowcharts in FIGS. 67A and 67B. The data structure in FIGS. 70A and 70B is a data structure generated when the Trimap data is packed as 10 bits per word. As illustrated in FIG. 70A, five pixels of Trimap data are packed into one word. Specifically, the Trimap data is assigned such that the first pixel is assigned to the 0th and first bits, the second pixel is assigned to the second and third bits, the third pixel is assigned to the fourth and fifth bits, the fourth pixel is assigned to the sixth and seventh bits, and the fifth pixel is assigned to the eighth and ninth bits. Although the flowcharts in FIGS. 67A and 67B illustrate processing of packing five pixels per word, but the processing may also pack four pixels per word, as illustrated in FIG. 70B. In this case, the eighth and ninth bits are assigned Even Parity and Not Even Parity. The assignment of bits described here is an example, and the assignment may use any other bit structure. Furthermore, Even Parity is merely an example, and other information may be assigned.

Figure 68A:
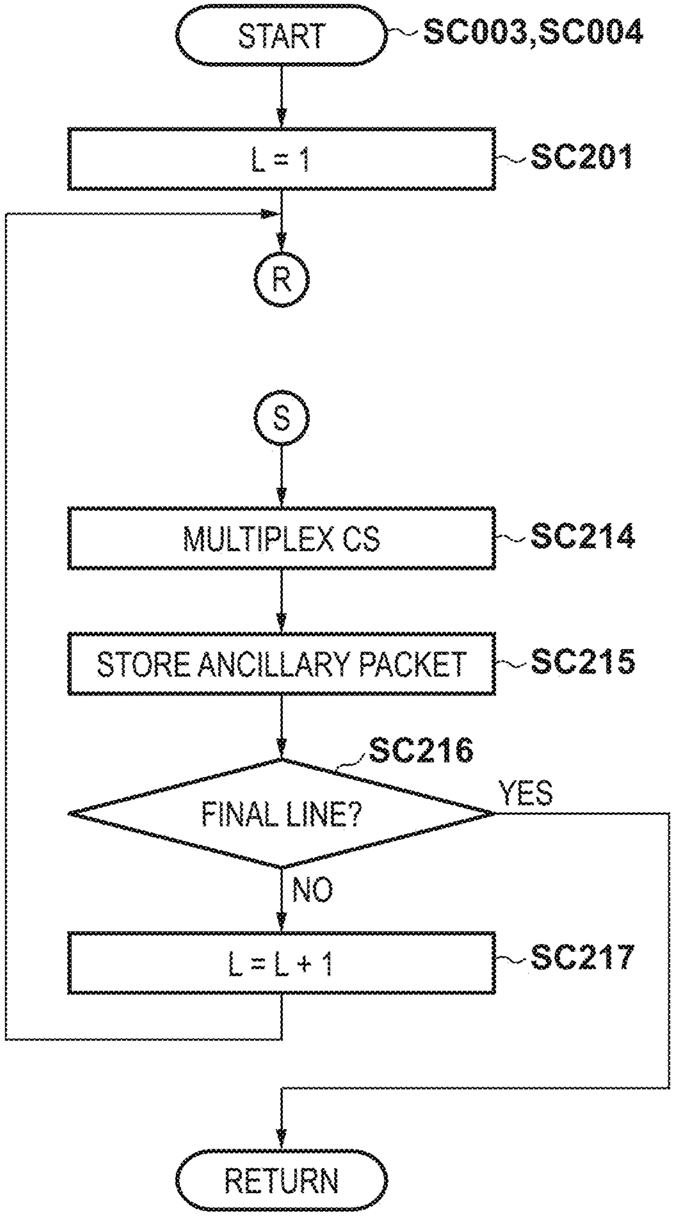
FIG. 68A is a flowchart illustrating details of the processing of steps step SC003 and step SC004 according to Embodiment C0.
Figure 68B:
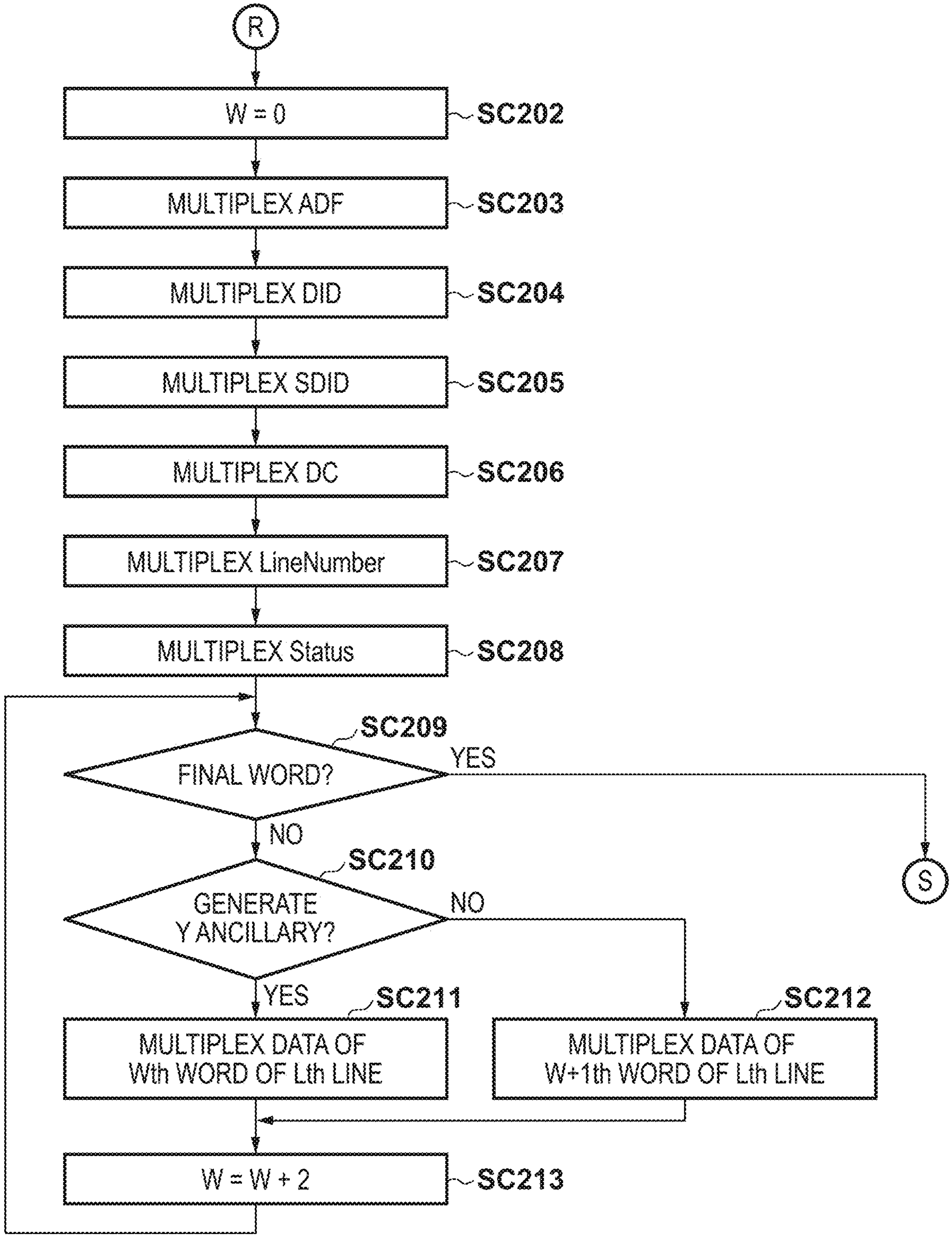
FIG. 68B is a flowchart illustrating details of the processing of steps step SC003 and step SC004 according to Embodiment C0.

The processing for generating the ancillary packet will be described next with reference to the flowcharts in FIGS. 68A and 68B. FIG. 71A illustrates an example of the ancillary packet generated here.

In FIG. 71A, an Ancillary Data Flag (ADF) indicates the start of the ancillary data packet. Data ID (DID) is an ID that represents the type of ancillary. Secondary Data ID (SDID) is, like the DID, an ID that indicates the type of ancillary. Data Count (DC) represents the number of data. Line Number (LN) represents the number of lines.

FIG. 71B illustrates details on the bit assignment for the LN. The 0th and first bits of LN0 are reserve data, and the 0th to sixth bits of the number of lines are assigned to the second to eighth bits. Inverted data of the eighth bit is assigned to the ninth bit. The 0th and first bits and the sixth to eighth bits of LN1 are reserve data. The seventh to eleventh bits of the line number are assigned to the second to fifth bits. Inverted data of the eighth bit is assigned to the ninth bit. Next, "Status" is information that indicates the status of the Trimap data.

Details of Status are illustrated in FIG. 71C. The 0th and first bits of Status( ) indicate what the data representing the white data is. The second and third bits indicate what the data representing the black data is. The fourth and fifth bits indicate what the data representing the gray data is. The sixth bit is a flag indicating whether to invert the data 0x00. The seventh bit indicates polarity, i.e., whether data of 0x00 or 0x11 is assigned to the data of even-numbered pixels. The eighth bit is Even Parity, and the ninth bit is Not Even Parity. The 0th to second bits of Status1 indicate the data of how many pixels are packed into one word. The third to seventh bits are reserve data. The eighth bit is Even Parity, and the ninth bit is Not Even Parity.

In FIG. 71A, the Trimap data is multiplexed, from TrimapData0, by the number of words packed. Check Sum (CS) is a checksum. However, this is merely an example of an ancillary packet, and bits can be assigned in other ways.

First, in step SC201, the CPU 102 sets the internal variable L to 1. In step SC202, the CPU 102 sets the internal variable W to 0. In step SC203, the CPU 102 multiplexes the Ancillary Data Flag (ADF). In step SC204, the CPU 102 multiplexes the Data ID (DID). In step SC205, the CPU 102 multiplexes the Secondary Data ID (SDID). In step SC206, the CPU 102 multiplexes the Data Count (DC). In step SC207, the CPU 102 multiplexes the Line Number (LN). In step SC208, the CPU 102 multiplexes the Status.

In step SC209, the CPU 102 determines whether the word in which the Trimap data is packed is the final word. For example, if 5 pixels are packed per word, the number of words is 384. In other words, the CPU 102 determines whether the internal variable W is 384. If it is determined in step SC209 that the word is not the final word, the processing moves to step SC210. In step SC210, the CPU 102 determines whether to generate a Y ancillary. If it is determined that the Y ancillary is to be generated, the processing moves to step SC211. In step SC211, the CPU 102 reads out the data of the Wth word of the Lth line from the RAM 104 and multiplexes that data.

On the other hand, if it is determined in step SC210 that the Y ancillary is not to be generated (i.e., that a C ancillary is to be generated), the processing moves to step SC212. In step SC212, the CPU 102 multiplexes the data of the W+1-th word of the Lth line.

In step SC213, the CPU 102 increments the value of the internal variable W by 2, and returns the processing to step SC209.

On the other hand, if it is determined in step SC209 that the word is the final word, the processing moves to step SC214. In step SC214, the CPU 102 multiplexes the CS. In step SC215, the CPU 102 stores the generated ancillary packet in the RAM 104.

In step SC216, the CPU 102 determines whether the current line (i.e., the Lth line) is the final line. For example, for a progressive image, the number of valid image lines is 1,080, and thus the CPU 102 determines whether the internal variable L is 1,080. If it is determined that the line is not the final line, the processing moves to step SC217. In step SC217, the CPU 102 increments the value of the internal variable L by 1, and returns the processing to step SC202.

On the other hand, if the line is determined to be the final line in step SC216, the processing of this flowchart ends.

Figure 69:
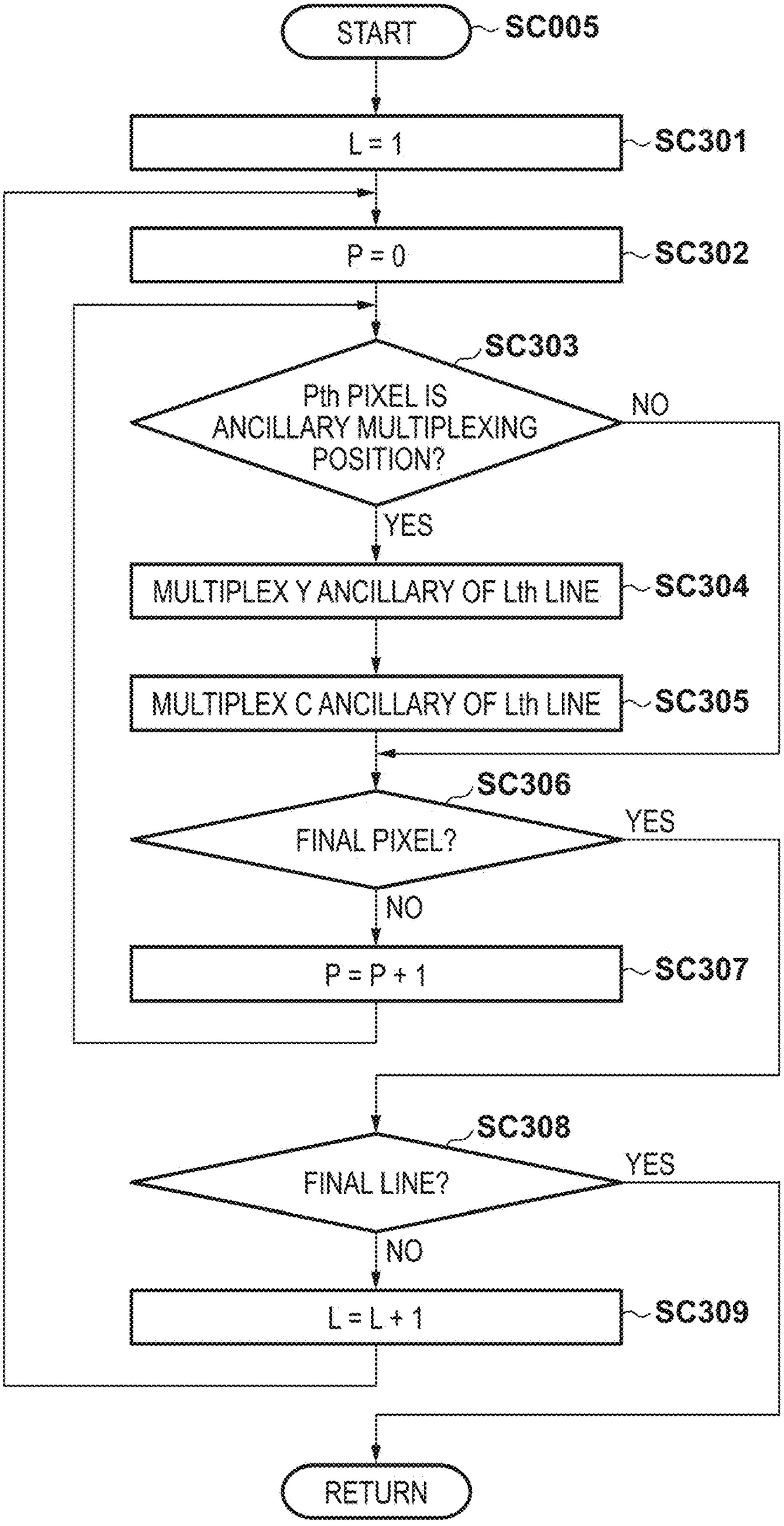
FIG. 69 is a flowchart illustrating details of the processing of step SC005 according to Embodiment C0.

The processing for multiplexing the ancillary packets will be described next with reference to the flowchart in FIG. 69. In step SC301, the CPU 102 sets the internal variable L to 1. In step SC302, the CPU 102 sets the internal variable P to 0.

In step SC303, the CPU 102 determines whether the Pth pixel is a position where an ancillary packet is multiplexed. For example, the ancillary can be multiplexed from the 1,928th pixel in FIG. 65. When the Trimap data is packed at 5 pixels per word, the ancillary packets are 203 words, and thus the multiplexed position will be from the 1,928 to the 2,130th pixels. In other words, the CPU 102 determines whether the internal variable P is within the range from 1928 to 2130. If the position is determined to be a position for multiplexing ancillary packets, the processing moves to step SC304, and if not, the processing moves to step SC306.

In step SC304, the CPU 102 reads out the data to be multiplexed on the Pth pixel in the Y ancillary packet of the Lth line from the RAM 104 and multiplexes that data. In step SC305, the CPU 102 reads out the data to be multiplexed on the Pth pixel in the C ancillary packet of the Lth line from the RAM 104 and multiplexes that data.

Next, in step SC306, the CPU 102 determines whether the current pixel (the Pth pixel) is the final pixel. In other words, the number of pixels in one line is 2,200, and thus the CPU 102 determines whether the internal variable P is 2099. If it is determined in step SC306 that the pixel is not the final pixel, the processing moves to step SC307. In step SC307, the CPU 102 increments the value of the internal variable P by 1, and returns the processing to step SC303.

On the other hand, if it is determined in step SC306 that the pixel is the final pixel, the processing moves to step SC308. In step SC308, the CPU 102 determines whether the current line (an Lth line) is the final line. For example, for a progressive image, the number of valid image lines is 1,080, and thus the CPU 102 determines whether the internal variable L is 1,080. If it is determined that the line is not the final line, the processing moves to step SC309. In step SC309, the CPU 102 increments the value of the internal variable L by 1, and returns the processing to step SC302.

On the other hand, if the line is determined to be the final line in step SC308, the processing of this flowchart ends.

As described above, according to Embodiment C0, Trimap data can be output from SDI by packing the Trimap data and generating and multiplexing SDI ancillary packets.

Embodiment C1

Embodiment C0 has a problem in that when attempting to output a plurality of pieces of Trimap data, the auxiliary region will be insufficient and the data cannot be transmitted. In light of the above problem, the present embodiment will describe processing for mapping a plurality of pieces of Trimap data such that the prohibited code is not produced.

A structure of a 3G-SDI data stream when the framerate is 29.97 fps will be described. In the present embodiment, the image processing apparatus 100 transmits moving image data according to the SDI standard. Specifically, the image processing apparatus 100 complies with SMPTE ST 425-1 and allocates each instance of pixel data by applying the R'G'B'+A 10-bit multiplexing structure of SMPTE ST 372. Any desired data may be multiplexed on the A channel, and thus in the present embodiment, the image processing apparatus 100 multiplexes and transmits a plurality of pieces of Trimap data.

Figure 72A:
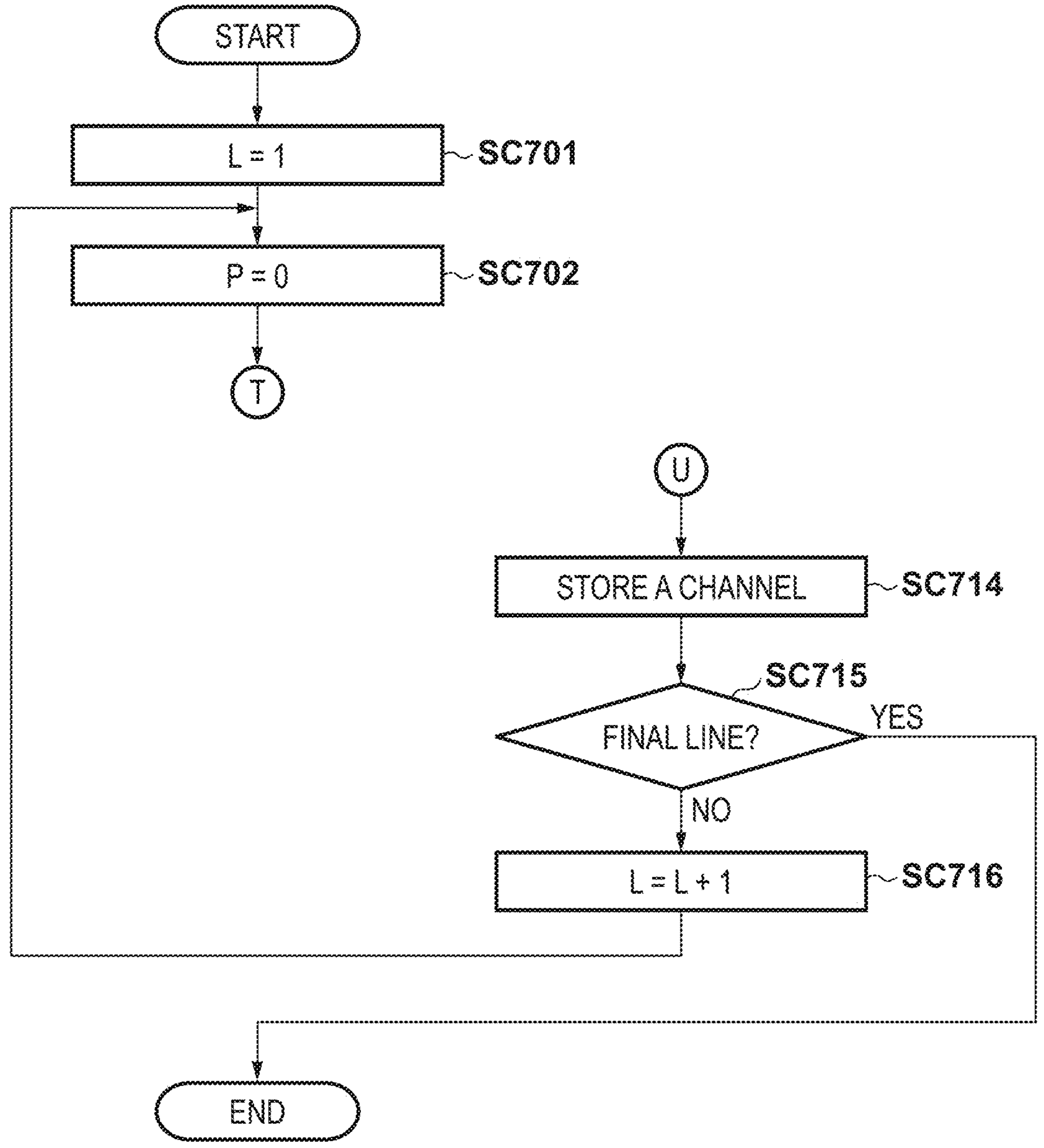
FIG. 72A is a flowchart illustrating details of the processing of step SC002 according to Embodiment C1.
Figure 72B:
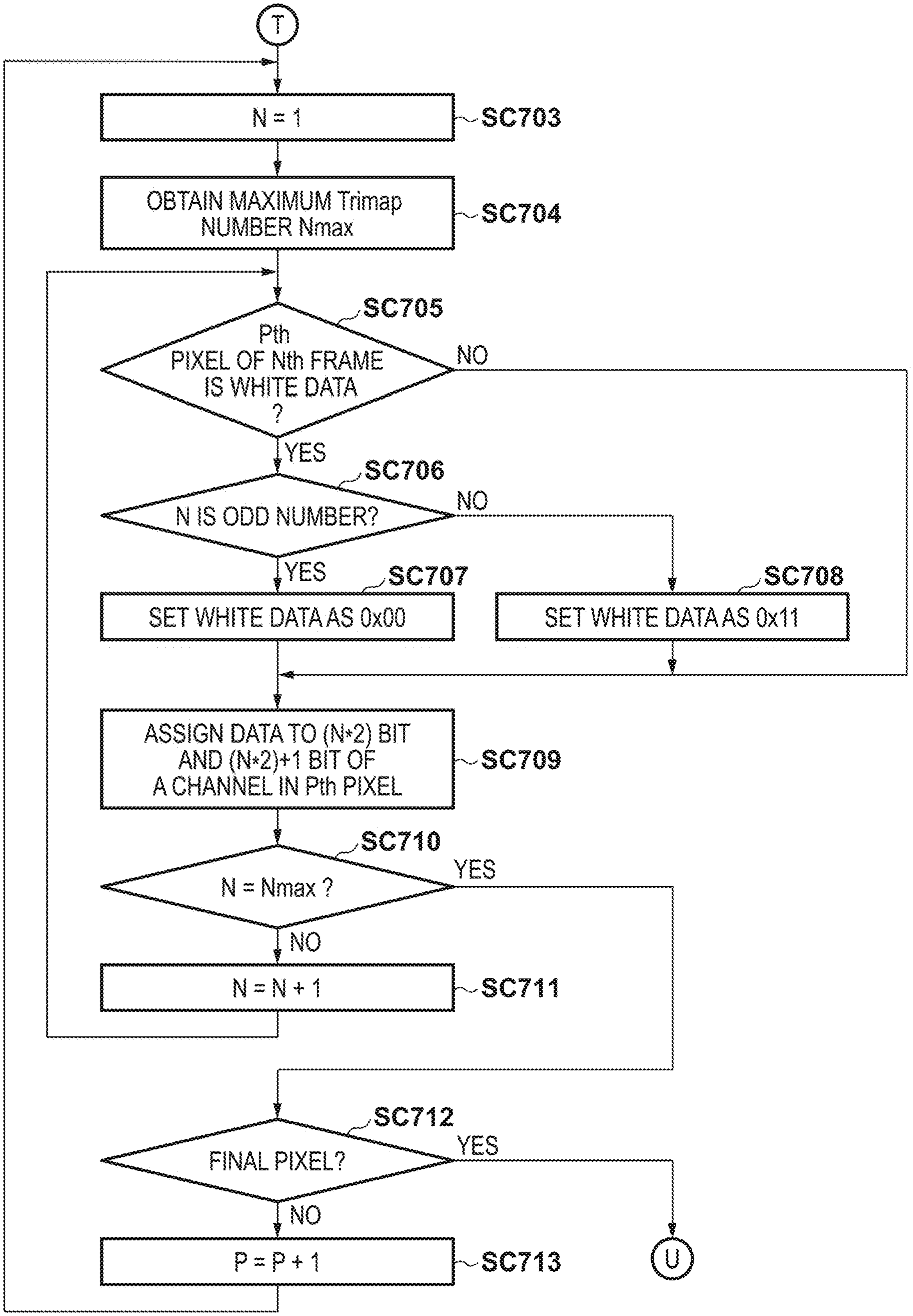
FIG. 72B is a flowchart illustrating data packing processing according to Embodiment C1.

The processing according to Embodiment C1 will be described next with reference to the flowcharts in FIGS. 72A and 72B. The flowcharts in FIGS. 72A and 72B illustrate processing for packing a plurality of pieces of Trimap data into the A channel.

In step SC701, the CPU 102 sets the internal variable L for counting lines to 1. In step SC702, the CPU 102 sets the internal variable P for counting pixels to 0. In step SC703, the CPU 102 sets the internal variable N for counting the Trimap to 1. In step SC704, the CPU 102 obtains a Trimap maximum number Nmax.

In step SC705, the CPU 102 determines whether the Trimap data of a Pth pixel in the Nth frame is white data. If it is determined that the Trimap data is white data, the processing moves to step SC706, and if not, the processing moves to step SC709. In step SC706, the CPU 102 determines whether the internal variable N is an odd number. If the value is determined to be an odd number, the processing moves to step SC707. In step SC707, the CPU 102 sets the white data to 0x00.

On the other hand, if the internal variable N is determined to be an even number in step SC706, the processing moves to step SC708. In step SC708, the CPU 102 sets the white data to 0x11.

Next, in step SC709, the CPU 102 assigns data to the (N*2) bit and (N*2)+1 bit of the A channel of the Pth pixel. In step SC710, the CPU 102 determines whether the internal variable N is equal to Nmax. If it is determined that N is not equal to Nmax, the processing moves to step SC711. In step SC711, the CPU 102 increments the value of the internal variable N by 1, and returns the processing to step SC705.

On the other hand, if it is determined in step SC710 that N is equal to Nmax, the processing moves to step SC712. In step SC712, the CPU 102 determines whether the current pixel (the Pth pixel) is the final pixel. In other words, the number of pixels in the valid image is 1,920, and thus the CPU 102 determines whether the internal variable P is 1919. If it is determined in step SC712 that the pixel is not the final pixel, the processing moves to step SC713. In step SC713, the CPU 102 increments the value of the internal variable P by 1, and returns the processing to step SC703.

On the other hand, if it is determined in step SC712 that the pixel is the final pixel, the processing moves to step SC714. In step SC714, the CPU 102 stores the A channel. In step SC715, the CPU 102 determines whether the current line (an Lth line) is the final line. For example, for a progressive image, the number of valid image lines is 1,080, and thus the CPU 102 determines whether the internal variable L is 1,080. If it is determined that the line is not the final line, the processing moves to step SC716. In step SC716, the CPU 102 increments the value of the internal variable L by 1, and returns the processing to step SC702.

On the other hand, if the line is determined to be the final line in step SC715, the processing of this flowchart ends.

In the present embodiment too, the CPU 102 may also generate the ancillary packets described in Embodiment C0. In the present embodiment, the CPU 102 multiplexes the packed Trimap data onto the A channel, and there is thus no need to include TrimapData in the ancillary packets. Additionally, for ancillary packets, the CPU 102 only needs to multiplex one ancillary packet anywhere in the region where an ancillary can be multiplexed.

Note that although the present embodiment describes a case of a single transmission path, the configuration is not limited thereto, and a configuration in which a plurality of transmission paths are prepared and the Trimap data is output using a different transmission path than that used for the image may be employed. Additionally, the transmission technique is not limited to SDI, and may be any transmission technique capable of image transmission, such as HDMI (registered trademark), DisplayPort (registered trademark), USB, or LAN, and a plurality of transmission paths may be prepared by combining these techniques.

Note that when a reduced Trimap is generated, the CPU 102 may output the reduced data, or the same data may be duplicated multiple times in the SDI format size.

As described above, according to Embodiment C1, a plurality of pieces of Trimap data can be output from SDI by packing the plurality of pieces of Trimap data and multiplexing the data on the A channel of SDI.

The foregoing embodiments are merely specific examples, and different embodiments can be combined as appropriate. For example, Embodiment 1 to Embodiment C1 can be partially combined and carried out in such a form. The configuration may also be such that the user is allowed to select a function from a menu display in the image processing apparatus 100 to execute the control.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-040695, filed Mar. 12, 2021 which is hereby incorporated by reference herein in its entirety.

What is claimed is:

1. An image processing apparatus comprising at least one processor and/or at least one circuit which functions as:

an obtainment unit configured to obtain a captured image and a plurality of parallax images generated through shooting using an image sensor in which a plurality of photoelectric conversion units are arranged, each photoelectric conversion unit receiving a light flux passing through a different partial pupil region of an imaging optical system;

a generation unit configured to generate a background separation image in which regions of the captured image are classified as a foreground region, a background region, and an unknown region, based on distance distribution information obtained from the plurality of parallax images; and an output unit configured to output the captured image and the background separation image, wherein the generation unit generates the background separation image by dividing a distance range with respect to the distance distribution information into (1) a range corresponding to the background region, (2) a range corresponding to the unknown region, (3) a range corresponding to the foreground region, (4) a range corresponding to the unknown region, and (5) a range corresponding to the background region, in this order, such that (1) a region in which a distance in the distance distribution information obtained from the plurality of parallax images is within a first range is classified as the foreground region, the first range being a range between a threshold Th2 and a threshold Th3, (2) a region in which a distance in the distance distribution information obtained from the plurality of parallax images is outside a second range is classified as the background region, the second range being a range between a threshold Th1 and a threshold Th4, where Th1<Th2<Th3<Th4, and (3) a region in which a distance in the distance distribution information obtained from the plurality of parallax images is outside the first range and inside the second range is classified as the unknown region.

2. The image processing apparatus according to claim 1, wherein the at least one processor and/or the at least one circuit further functions as:

a first display control unit configured to display the background separation image in a display; and a recording control unit configured to record the background separation image into a storage medium.

3. The image processing apparatus according to claim 1, wherein the at least one processor and/or the at least one circuit further functions as:

an input unit configured to accept an input from a user; and a first setting unit configured to set at least one of the first range and the second range based on the input accepted by the input unit.

4. The image processing apparatus according to claim 1, wherein the at least one processor and/or the at least one circuit further functions as:

a second display control unit configured to display the captured image in a display, wherein based on the background separation image, the second display control unit displays the captured image in a state in which the foreground region, the background region, and the unknown region can be identified.

5. The image processing apparatus according to claim 4, wherein based on the background separation image, the second display control unit displays, superimposed on the captured image, a boundary line between the foreground region and the unknown region, and a boundary line between the unknown region and the background region.

6. The image processing apparatus according to claim 5, wherein the second display control unit detects the boundary line between the foreground region and the unknown region and the boundary line between the unknown region and the background region by extracting a high-frequency component in the background separation image using a high-pass filter having a predetermined cutoff frequency.

7. The image processing apparatus according to claim 4, wherein the at least one processor and/or the at least one circuit further functions as:

a second setting unit configured to set a transparency of the foreground region, the background region, and the unknown region in the background separation image, wherein the second display control unit displays the background separation image superimposed over the captured image at the set transparency.

8. The image processing apparatus according to claim 1, wherein the at least one processor and/or the at least one circuit further functions as:

a third display control unit configured to display a histogram of a distance indicated by the distance distribution information in a display, wherein the third display control unit displays the histogram such that the first range and the second range can be identified.

9. The image processing apparatus according to claim 1, wherein the at least one processor and/or the at least one circuit further functions as:

a fourth display control unit configured to display, in a display, a bird's-eye view expressing a relationship between a horizontal coordinate of the captured image and a distance, based on the distance distribution information, wherein the fourth display control unit displays the bird's-eye view such that the first range and the second range can be identified.

10. The image processing apparatus according to claim 1, wherein the generation unit detects an edge from the captured image and generates the background separation image based on the edge detected.

11. The image processing apparatus according to claim 1, wherein the generation unit detects an object from the captured image and generates the background separation image based on a region where the object detected is present.

12. The image processing apparatus according to claim 1, wherein the generation unit determines at least one of the first range and the second range such that a range of a distance corresponding to the unknown region changes according to an aperture value used when performing the shooting pertaining to the captured image.

13. The image processing apparatus according to claim 1, wherein the generation unit generates the background separation image by determining the foreground region, the background region, and the unknown region according to information of a focal position used when performing shooting the pertaining to the captured image.

14. The image processing apparatus according to claim 1, wherein the at least one processor and/or the at least one circuit further functions as:

an object detection unit configured to detect a plurality of objects, wherein the generation unit generates the background separation image for each of the plurality of objects detected by the object detection unit.

15. The image processing apparatus according to claim 14, wherein the generation unit further generates a single background separation image by compositing a plurality of the background separation images.

16. The image processing apparatus according to claim 14, wherein the at least one processor and/or the at least one circuit further functions as:

a selection unit configured to select at least one of the plurality of objects detected by the object detection unit, wherein the generation unit generates at least one background separation image based on selecting of an object by the selection unit.

17. The image processing apparatus according to claim 1, wherein the output unit adds the background separation image to a data stream configured in N-bit units ($N \geq 10$) and outputs the data stream with the captured image.

18. The image processing apparatus according to claim 17, wherein the output unit adds the background separation image to the data stream such that data is inverted on a pixel-by-pixel basis.

19. The image processing apparatus according to claim 17, wherein the output unit outputs the data stream to a transmitter that transmits through SDI.

20. The image processing apparatus according to claim 1, further comprising the image sensor.

21. An image processing method executed by an image processing apparatus, the method comprising:

obtaining a captured image and a plurality of parallax images generated through shooting using an image sensor in which a plurality of photoelectric conversion units are arranged, each photoelectric conversion unit receiving a light flux passing through a different partial pupil region of an imaging optical system;

generating a background separation image in which regions of the captured image are classified as a foreground region, a background region, and an unknown region, based on distance distribution information obtained from the plurality of parallax images; and outputting the captured image and the background separation image, wherein the background separation image is generated by dividing a distance range with respect to the distance distribution information into (1) a range corresponding to the background region, (2) a range corresponding to the unknown region, (3) a range corresponding to the foreground region, (4) a range corresponding to the unknown region, and (5) a range corresponding to the background region, in this order, such that (1) a region in which a distance in the distance distribution information obtained from the plurality of parallax images is within a first range is classified as the foreground region, the first range being a range between a threshold Th2 and a threshold Th3, (2) a region in which a distance in the distance distribution information obtained from the plurality of parallax images is outside a second range is classified as the background region, the second range being a range between a threshold Th1 and a threshold Th4, where Th1<Th2<Th3<Th4, and (3) a region in which a distance in the distance distribution information obtained from the plurality of parallax images is outside the first range and inside the second range is classified as the unknown region.

22. A non-transitory computer-readable storage medium which stores a program for causing a computer to execute an image processing method, the method comprising:

obtaining a captured image and a plurality of parallax images generated through shooting using an image sensor in which a plurality of photoelectric conversion units are arranged, each photoelectric conversion unit receiving a light flux passing through a different partial pupil region of an imaging optical system;

generating a background separation image in which regions of the captured image are classified as a foreground region, a background region, and an unknown region, based on distance distribution information obtained from the plurality of parallax images; and outputting the captured image and the background separation image, wherein the background separation image is generated by dividing a distance range with respect to the distance distribution information into (1) a range corresponding to the background region, (2) a range corresponding to the unknown region, (3) a range corresponding to the foreground region, (4) a range corresponding to the unknown region, and (5) a range corresponding to the background region, in this order, such that (1) a region in which a distance in the distance distribution information obtained from the plurality of parallax images is within a first range is classified as the foreground region, the first range being a range between a threshold Th2 and a threshold Th3, (2) a region in which a distance in the distance distribution information obtained from the plurality of parallax images is outside a second range is classified as the background region, the second range being a range between a threshold Th1 and a threshold Th4, where Th1<Th2<Th3<Th4, and (3) a region in which a distance in the distance distribution information obtained from the plurality of parallax images is outside the first range and inside the second range is classified as the unknown region.

* * * * *